United States Patent [19]

Natori

[11] Patent Number: 5,795,945

[45] Date of Patent: Aug. 18, 1998

[54] POLYMER CONTAINING A CYCLIC OLEFIN MONOMER UNIT

[75] Inventor: Itaru Natori, Yokohama, Japan

[73] Assignee: Asahi Kasei Kogyo Kabushiki Kaisha, Osaka, Japan

[21] Appl. No.: 576,684

[22] Filed: Dec. 21, 1995

Related U.S. Application Data

[63] Continuation-in-part of Ser. No. 513,957, Sep. 7, 1995, abandoned.

[30] Foreign Application Priority Data

Jun. 16, 1993 [JP] Japan .................................. 5-168341

[51] Int. Cl.$^6$ .................................................. C08F 32/02
[52] U.S. Cl. .................. 526/309; 526/180; 526/260; 526/266; 526/286; 526/308; 526/335; 526/337; 526/339; 526/340.4
[58] Field of Search .......................... 526/308, 337, 526/180, 266, 260, 286, 309, 335, 339, 340.4

[56] References Cited

U.S. PATENT DOCUMENTS

| | | |
|---|---|---|
| 4,020,251 | 4/1977 | Hsieh . |
| 4,051,199 | 9/1977 | Udipi et al. . |
| 4,113,930 | 9/1978 | Moczygemba . |
| 4,127,710 | 11/1978 | Hsieh . |
| 4,131,653 | 12/1978 | Hsieh et al. . |
| 4,138,536 | 2/1979 | Hsieh et al. . |
| 4,153,773 | 5/1979 | Buckley et al. . |
| 4,179,480 | 12/1979 | Hsieh . |
| 4,223,116 | 9/1980 | Moczygemba et al. . |
| 4,237,246 | 12/1980 | Hsieh . |
| 5,422,409 | 6/1995 | Brekner .................................. 526/281 |

FOREIGN PATENT DOCUMENTS

| | | |
|---|---|---|
| 2848964 | 5/1980 | Germany . |
| 0378193 | 7/1962 | Japan . |
| 1042625 | 9/1966 | United Kingdom . |
| 2044277 | 10/1980 | United Kingdom . |

OTHER PUBLICATIONS

Ind. Eng. Chem., vol. 48, No. 4, pp. 784–791, 1956.
Journ. Polym. Sci.: Polym. Chem. Ed., vol. 18, pp. 3345–3357, 1980.
Sci. Sinica, vol. 23, No. 6, pp. 734–743, 1980.
Makromol. Chem. Suppl., vol. 4, pp. 61–72, 1981.
Rubber Chem. Technol., vol. 58, No. 1, pp. 117–145, 1985.
Agnew. Makromol. Chem., vol. 94, pp. 119–146, 1981.
Macromolecules, vol. 15, pp. 230–233, 1982.
J. Am. Chem. Soc., vol. 81, pp. 448–453, 1959.
J. Polym. Sci., Pt. A, vol. 2, pp. 3277–3295, 1964.
J. Polym. Sci., Pt. A, vol. 3, pp. 1553–1565, 1965.
Polym. Prepr. (Amer. Chem. Soc., Div. Polym. Chem.), vol. 12, No. 2, pp. 402–409, 1971.
Die Makromolekulare Chemie., Vol. 163, pp. 13–36, 1973.
European Polymer J., vol. 9, pp. 895–908, 1973.
J. Polym. Sci., Polym. Chem. Ed., vol. 20, pp. 901–915, 1982.
Makromol. Chem., vol. 191, pp. 2743–2753, 1990.
N.Y. Acad. Sci., Series II, vol. 27, pp. 741–747, 1964–65.
Nagai et al., Copolymerization of 1,3-Cyclohexadiene and Acrylonitrile in the Presence of Zinc Chloride, *Kobunshi Ronbun-shu*, vol. 34, No. 5, pp. 333–340, (May 1977).

*Primary Examiner*—Fred Zitomer
*Attorney, Agent, or Firm*—Birch, Stewart, Kolasch & Birch, LLP

[57] ABSTRACT

Disclosed is a polymer containing a cyclic olefin monomer unit, comprising a main chain represented by the formula:

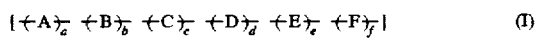

(I)

wherein A to F are monomer units constituting the main chain in which A to F are arranged in any order, and a to f are, respectively, weight percentages of A to F, based on the total weight of A to F; A to F are selected from cyclic olefin monomer units, cyclic conjugated diene monomer units, chain conjugated diene monomer units, vinyl aromatic monomer units, polar monomer units, and an ethylene monomer unit and α-olefin monomer units, respectively; and a to f satisfy the following requirements: $0.001 \leq a \leq 100$, and $0 \leq b, c, d, e, f \leq 100$, with the proviso that monomer unit A is present in an amount of from 0.1 to 100 mole %, based on the total number of moles of the monomer units A and B, wherein when a=100, depending on whether the A monomer units are comprised of same or different cyclic olefin monomer units, the polymer has a number average molecular weight ($\overline{Mn}$) of from 10,000 to 5,000,000 or from 1,000 to 5,000,000, and wherein when $0.001 \leq a+b<100$, the polymer has an $\overline{Mn}$ of from 500 to 5,000,000. This polymer has excellent thermal and mechanical properties. The polymer can be advantageously produced by a method in which a cyclic conjugated diene polymer is synthesized, preferably using a specific polymerization catalyst, and the obtained polymer is subjected to an addition reaction to thereby convert a cyclic conjugated diene monomer unit to a cyclic olefin monomer unit.

17 Claims, 4 Drawing Sheets

POLYMER CONTAINING A CYCLIC OLEFIN MONOMER UNIT

This application is a continuation-in-part of application Ser. No. 08/513,957 filed on Sep. 7, 1995, abandoned, the entire contents of which are hereby incorporated by reference.

BACKGROUND OF THE INVENTION

1. Technical Field

The present invention relates to a novel polymer containing a cyclic olefin monomer unit and a method for producing the same. More particularly, the present invention is concerned with a novel polymer comprising at least one type of cyclic olefin monomer unit, or comprising at least one type of cyclic olefin monomer unit and a monomer unit derived from at least one type of monomer other than the above-mentioned cyclic olefin monomer, which other monomer is copolymerizable with the cyclic olefin monomer, and wherein the polymer containing a cyclic olefin monomer unit has a high number average molecular weight and/or a desired, arbitrarily predesigned polymeric molecular chain structure, so that it has not only excellent thermal properties in respect of, for example, a glass transition temperature and a heat distortion temperature, but also excellent mechanical properties, such as high tensile modulus and high flexural modulus, and is also concerned with a method for producing such an excellent polymer containing a cyclic olefin monomer unit. Such a polymer of the present invention can be obtained by polymerizing or copolymerizing at least one cyclic conjugated diene monomer, or at least one cyclic conjugated diene monomer and at least one comonomer copolymerizable therewith, preferably in the presence of a catalyst comprised of a complex of at least one organometallic compound containing a metal belonging to Group IA of the Periodic Table with at least one complexing agent, to thereby obtain a cyclic conjugated diene polymer, and subjecting the obtained cyclic conjugated diene polymer to an addition reaction, wherein the addition reaction is performed at a carbon-to-carbon double bond of the cyclic conjugated diene monomer unit, to thereby convert the cyclic conjugated diene monomer unit to a cyclic olefin monomer unit.

2. Prior Art

In recent years, polymer chemistry has continuously made progress through various innovations in order to meet commercial demands which have been increasingly diversified. Especially, in the field of polymer materials to be used as commercially important materials, extensive and intensive studies have been made toward developing polymers having more excellent thermal and mechanical properties. Various proposals have been made with respect to such polymers and methods for the production thereof.

For example, various proposals have been made with respect to conjugated diene polymers. Some of the conjugated diene polymers produced by the techniques of such proposals have been widely used as commercially important materials.

Representative examples of known conjugated diene polymers include homopolymers, such as a polybutadiene and a polyisoprene; copolymers of block, graft, taper and random configurations, such as a butadiene-isoprene copolymer, a styrene-butadiene copolymer, a propylene-butadiene copolymer, a styrene-isoprene copolymer, an α-methylstyrene-butadiene copolymer, an α-methylstyrene-isoprene copolymer, an acrylonitrile-butadiene copolymer, an acrylonitrile-isoprene copolymer, a butadiene-methyl methacrylate copolymer and an isoprene-methyl methacrylate copolymer; and hydrogenated polymers derived therefrom. These polymers have been used for various purposes in various fields. For example, these conventional polymers have been used as plastics; fibers; sheets; films; elastomers; materials for machine parts, construction materials, parts for medical equipment, containers for food, general packaging materials, tires and belts; insulating materials; bonding agents; adhesives; modifiers for other resins; and the like.

In the field of thermoplastic elastomers, it has conventionally been practiced to produce a conjugated diene block copolymer having at both terminals thereof polymer blocks each having a glass transition temperature (Tg) higher than room temperature (which serve as agglomeration phases i.e., hard segments) and a polymer block having a Tg lower than room temperature (which serves as an elastomer phase i.e., a soft segment), which is positioned between the above-mentioned polymer blocks serving as agglomeration phases. Representative examples of such conjugated diene block copolymer include a styrene-butadiene (isoprene)-styrene block copolymer or a hydrogenated product thereof.

Such a styrene-butadiene (isoprene)-styrene block copolymer and/or a hydrogenated product thereof has been widely used in the form of a composition obtained by mixing such a block copolymer and/or a hydrogenated product with other polymers (such as a polystyrene, a polyolefin, a polyphenylene ether, a styrene-butadiene diblock copolymer, or the like) or a hydrogenated product thereof, as an industrial material improved in respect of various properties, such as heat resistance, flowability and adhesive properties.

On the other hand, various proposals have been made with respect to methods for producing a conjugated diene polymer, which are also very important from a commercial point of view.

Particularly, various studies have been made with a view toward developing a polymerization catalyst capable of providing conjugated diene polymers having a high cis-1, 4-bond content, for the purpose of obtaining conjugated diene polymers having improved thermal and mechanical properties.

For example, a catalyst system comprised mainly of a compound of an alkali metal, such as lithium or sodium, and a composite catalyst system comprised mainly of a compound of a transition metal, such as nickel, cobalt or titanium, have been proposed. Some of these catalyst systems have already been employed for a commercial scale practice of polymerization of butadiene, isoprene and the like (see, for example, Ing. End. Chem., 48, 784 (1956) and Examined Japanese Patent Application Publication No. 37-8193).

On the other hand, for achieving a further increased cis-1,4-bond content and an excellent polymerization activity, a number of studies have been made toward developing a composite catalyst system comprised of a rare earth metal compound and an organometallic compound containing a metal belonging to Group I, II or III of the Periodic Table. Further, in connection with the study of such a catalyst system, intensive studies have also been made with respect to highly stereospecific polymerization [see, for example, J. Polym. Sci., Polym. Chem. Ed., 18, 3345 (1980); Sci. Sinica., 2/3, 734 (1980); Makromol. Chem. Suppl., 4, 61 (1981); German Patent Application No. 2,848, 964; Rubber Chem. Technol., 58, 117 (1985)].

Among these composite catalyst systems, a composite catalyst comprised mainly of a neodymium compound and an organoaluminum compound has been confirmed to have not only the ability to provide a desired polymer having a high cis-1,4-bond content, but also exhibits an excellent polymerization activity. Accordingly, this type of composite catalyst has already been commercially used as a catalyst for the polymerization of butadiene or the like [see, for example, Angew. Makromol. Chem., 94, 119 (1981); Macromolecules, 15, 230 (1982)].

However, in accordance with recent remarkable progress of the techniques in this field, there has been a strong demand for the development of polymer materials having further improved properties, particularly excellent thermal properties (such as melting temperature, glass transition temperature and heat distortion temperature) and excellent mechanical properties (such as tensile modulus and flexural modulus).

As one of the most practical means for meeting such a demand, it has been attempted to produce polymer materials having excellent thermal and mechanical properties by homopolymerizing or copolymerizing not only a monomer having a relatively small steric hindrance, e.g., butadiene or isoprene, but also a monomer having a large steric hindrance, e.g., a cyclic conjugated diene monomer and then subjecting the resultant polymer to hydrogenation to thereby form a cyclic olefin monomer unit in the main chain of the polymer.

With respect to the homopolymerization or copolymerization of a monomer having a relatively small steric hindrance, e.g., butadiene or isoprene, catalyst systems having a polymerization activity which is satisfactory to a certain extent have been successfully developed. However, a catalyst system which exhibits a satisfactory polymerization activity in the homopolymerization or copolymerization of monomers having a large steric hindrance, e.g., a cyclic conjugated diene monomer, has not yet been developed.

That is, by conventional techniques, even homopolymerization of a cyclic conjugated diene is difficult, so that a homopolymer having a desired high molecular weight cannot be obtained. Furthermore, an attempt to copolymerize a cyclic conjugated diene with a monomer other than the cyclic conjugated diene, for the purpose of obtaining a polymer having optimized thermal and mechanical properties in order to meet a wide variety of commercial needs, has been unsuccessful with the result that the product obtained is only a mixture of oligomers having a low molecular weight and that a polymer having a desired polymeric main chain structure cannot be obtained.

Further, with respect to saturation of such cyclic conjugated diene polymers which are only oligomers having a low molecular weight, the conventional techniques, in which an insoluble solid catalyst is used for saturation, have serious problems. That is, even if, for the purpose of obtaining such polymer materials having excellent thermal and mechanical properties, it is attempted to form a cyclic olefin monomer unit in the polymer chain of a polymer containing an cyclic conjugated diene monomer unit by hydrogenation using an insoluble solid catalyst, the rate of hydrogenation of a carbon-to-carbon double bond in the cyclic conjugated diene monomer unit is very slow, so that it has been very difficult to introduce a cyclic olefin monomer unit into the polymer.

As is apparent from the above, in any of the conventional techniques, it has been impossible to obtain a polymer, containing a cyclic olefin monomer unit, which has satisfactory properties. Therefore, it has been strongly desired to develop a high molecular weight polymer, containing a cyclic olefin monomer unit, which can satisfy the commercial demand.

J. Am. Chem. Soc., 81, 448 (1959) discloses a cyclohexadiene homopolymer and a polymerization method therefor, which homopolymer is obtained by polymerizing 1,3-cyclohexadiene (typical example of cyclic conjugated diene monomer), using a composite catalyst comprised of titanium tetrachloride and triisobutylaluminum.

However, the polymerization method disclosed in this prior art document is disadvantageous in that the use of a large amount of the catalyst is necessary, and the polymerization reaction must be conducted for a prolonged period of time, and that the obtained polymer has only an extremely low molecular weight. Therefore, the polymer obtained by the technique of this prior art document is of no commercial value. Further, this prior art document has no teaching or suggestion about introduction of a cyclic olefin monomer unit into the polymer.

Further, J. Polym. Sci., Pt. A, 2, 3277 (1964) discloses methods for producing a cyclohexadiene homopolymer, in which the polymerization of 1,3-cyclohexadiene is conducted by various polymerization methods, such as radical polymerization, cationic polymerization, anionic polymerization and coordination polymerization. In any of the methods disclosed in this prior art document, however, the polymers obtained have only an extremely low molecular weight. Therefore, the polymers obtained by the techniques of this prior art document are of no commercial value. Further, this prior art document has no teaching or suggestion about introduction of a cyclic olefin monomer unit into the polymers.

British Patent Application No. 1,042,625 discloses a method for producing a cyclohexadiene homopolymer, in which the polymerization of 1,3-cyclohexadiene is conducted using a large amount of an organolithium compound as a catalyst.

In the polymerization method disclosed in British Patent Application No. 1,042,625, the catalyst must be used in an amount as large as 1 to 2 wt %, based on the total weight of the monomers. Therefore, this method is economically disadvantageous. Further, the polymer obtained by this method has only an extremely low molecular weight. Moreover, in this prior art document, there is no teaching or suggestion of obtaining a copolymer. Furthermore, the method of this prior art document has disadvantages in that the polymer obtained contains a large amount of catalyst residue, which is very difficult to remove from the polymer, so that the polymer obtained by this method is of no commercial value. Further, this prior art document has no teaching or suggestion about introduction of a cyclic olefin monomer unit into the polymer.

J. Polym. Sci., Pt. A, 3, 1553 (1965) discloses a cyclohexadiene homopolymer, which is obtained by polymerizing 1,3-cyclohexadiene using an organolithium compound as a catalyst. In this prior art document, the polymerization reaction must be continued for a period as long as 5 weeks, however, the polymer obtained has a number average molecular weight of only 20,000 or less. Further, this prior art document has no teaching or suggestion about introduction of a cyclic olefin monomer unit into the polymer.

Polym. Prepr. (Amer. Chem. Soc., Div. Polym. Chem.) 12, 402 (1971) teaches that when the polymerization of 1,3-cyclohexadiene is conducted using an organolithium compound as a catalyst, the cyclohexadiene homopolymer is obtained. However, the number average molecular weight of the cyclohexadiene homopolymer obtained is only from 10,000 to 15,000. Further, this document teaches that the reason for such a small molecular weight resides in that, concurrently with the polymerization reaction, not only a transfer reaction, which is caused by the abstraction of a lithium cation present in the polymer terminal, but also a reaction of elimination of lithium hydride occurs. Further, this prior art document has no teaching or suggestion about introduction of a cyclic olefin monomer unit into the polymer.

Die Makromolekulare Chemie., 163, 13 (1973) discloses a cyclohexadiene homopolymer which is obtained by polymerizing 1,3-cyclohexadiene using a large amount of an organolithium compound as a catalyst.

However, the polymer obtained in this prior art document is an oligomer having a number average molecular weight of only 6,500.

This prior art document also discloses a hydrogenated cyclohexadiene homopolymer (polycyclohexane oligomer) which is obtained by hydrogenating a cyclohexadiene polymer by use of p-toluenesulfonylhydrazide in large excess relative to the amount of a carbon-to-carbon double bond of the cyclic conjugated diene monomer units constituting the polymer.

However, the hydrogenated polymer disclosed in this prior art document has only an extremely low molecular weight. The disclosed method for hydrogenation is economically disadvantageous because the hydrogenation of this method is a stoichiometric reaction, in which a large excess of the hydrogenating agent is required. Therefore, the disclosed method is of no commercial value. The polymer obtained by this method is also of no commercial value.

European Polymer J., 9, 895 (1973) discloses a copolymer which is obtained by copolymerizing 1,3-cyclohexadiene with butadiene and/or isoprene, using a π-allylnickel compound as a polymerization catalyst.

However, the polymer obtained in this prior art document is an oligomer having an extremely low molecular weight. Further, it has been reported that the polymer of this prior art document has a single glass transition temperature, which suggests that the polymer has a random copolymer structure. Further, this prior art document has no teaching or suggestion about introduction of a cyclic olefin monomer unit into the polymer.

Kobunshi Ronbun-shu (Collection of theses concerning polymers), Vol. 34, No. 5, 333 (1977) discloses a method for synthesizing a copolymer of 1,3-cyclohexadiene and acrylonitrile using zinc chloride as a polymerization catalyst. However, the alternating copolymer obtained in this prior art document is an oligomer having an extremely low molecular weight. Further, this prior art document has no teaching or suggestion about introduction of a cyclic olefin monomer unit into the copolymer.

J. Polym. Sci., Polym. Chem. Ed., 20, 901 (1982) discloses a cyclohexadiene homopolymer which is obtained by polymerizing 1,3-cyclohexadiene using an organosodium compound as a catalyst. In this prior art document, the organosodium compound used is sodium naphthalene, and a radical anion derived from the sodium naphthalene forms a dianion which functions as a polymerization initiation site.

This means that although the cyclohexadiene homopolymer reported in this document has an apparent number average molecular weight of 38,700, this homopolymer is actually only a combination of two polymeric molecular chains, each having a number average molecular weight of 19,350, which chains respectively extend from the polymerization initiation site in two different directions.

Further, in the polymerization method disclosed in this document, the polymerization reaction needs to be conducted at an extremely low temperature. Therefore, the technique of this prior art document is of no commercial value. Furthermore, this prior art document has no teaching or suggestion about introduction of a cyclic olefin monomer unit into the homopolymer.

Makromol. Chem., 191, 2743 (1990) discloses a method for polymerizing 1,3-cyclohexadiene using a polystyryllithium as a polymerization initiator. In this prior art document, it is described that concurrently with the polymerization reaction, not only does a transfer reaction occur, which is caused by the abstraction of a lithium cation present in the polymer terminal, but also a reaction of elimination of lithium hydride vigorously occurs. Further, it is reported that even though the polymerization is conducted using a polystyryllithium as a polymerization initiator, a styrene-cyclohexadiene block copolymer cannot be obtained at room temperature, but the product obtained is only a cyclohexadiene homopolymer.

Further, in this prior art document, it is reported that when the polymerization reaction is conducted at −10° C., a styrene-cyclohexadiene block copolymer having a molecular weight of about 20,000 is obtained in extremely low yield, together with a cyclohexadiene homopolymer.

However, the content of cyclohexadiene blocks in the obtained copolymer is extremely low. Further, this prior art document has no teaching or suggestion about not only a block copolymer of cyclohexadiene with a chain conjugated diene monomer, but also a multiblock cyclohexadiene copolymer having an at least-tri-block configuration, or a radial block copolymer of cyclohexadiene. Further, this prior art document has no teaching or suggestion about introduction of a cyclic olefin monomer unit into the copolymer.

As can be easily understood from the above, in any of the conventional techniques, it has been impossible to obtain a homopolymer or a copolymer containing a cyclic olefin monomer unit, which has excellent properties so that it can be satisfactorily used as an industrial material. Needless to say, a production process for such a homopolymer or a copolymer containing a cyclic olefin monomer unit or a method for introducing a cyclic olefin monomer unit into such a homopolymer or a copolymer is not known.

SUMMARY OF THE INVENTION

In these situations, the present inventors have made extensive and intensive studies with a view toward developing a novel polymer comprising at least one type of cyclic olefin monomer unit, or comprising at least one type of cyclic olefin monomer unit and a monomer unit derived from at least one type of monomer other than the above-mentioned cyclic olefin monomer, which other monomer is copolymerizable with the cyclic olefin monomer, and wherein the polymer containing a cyclic olefin monomer unit has a high number average molecular weight and/or a desired, arbitrarily predesigned polymeric molecular chain structure, so that it has not only excellent thermal properties in respect of, for example, a glass transition temperature and a heat distortion temperature, but also excellent mechanical properties, such as high tensile modulus and high flexural modulus, and a method for producing such an excellent polymer containing a cyclic olefin monomer unit. As a result, the present inventors have found a method for producing such a novel excellent polymer containing a cyclic olefin monomer unit. The method consists in polymerizing or copolymerizing at least one cyclic conjugated diene monomer, or at least one cyclic conjugated diene monomer and at least one comonomer copolymerizable therewith, preferably in the presence of a catalyst comprised of a complex of at least one organometallic compound containing a metal belonging to Group IA of the Periodic Table with at least one complexing agent, to thereby obtain a cyclic conjugated diene polymer, and subjecting the obtained cyclic conjugated diene polymer to an addition reaction, wherein the addition reaction is performed at a carbon-to-carbon double bond of the cyclic conjugated diene monomer unit, to thereby convert the cyclic conjugated diene monomer unit to a cyclic olefin monomer unit. With such a novel method for producing a polymer of the present invention, it has for the first time become possible to synthesize a novel polymer, containing a cyclic olefin monomer unit, which has never been reported. In addition, a new technique to obtain a polymer containing a cyclic olefin monomer unit has been developed, in which monomer units derived from cyclic olefin monomers are introduced, in a desired proportion and in a desired configuration, as a part or all of monomer units constituting a main chain of the polymer. The present invention has been completed, based on these novel findings.

Accordingly, it is an object of the present invention to provide a novel cyclic olefin polymer comprising at least one type of cyclic olefin monomer unit, or comprising at least one type of cyclic olefin monomer unit and a monomer unit derived from at least one type of monomer other than the above-mentioned cyclic olefin monomer, which other monomer is copolymerizable with the cyclic olefin monomer, and wherein the cyclic olefin polymer has a high number average molecular weight and/or a desired, arbitrarily predesigned polymeric main chain structure, so that it has not only excellent thermal properties in respect of, for example, a glass transition temperature and a heat distortion temperature, but also excellent mechanical properties, such as high tensile modulus and high flexural modulus.

It is another object of the present invention to provide a method for effectively and efficiently producing such a novel polymer as mentioned above.

In one aspect of the present invention, there is provided a novel polymer, containing a cyclic olefin monomer unit, comprising a main chain represented by the following formula (I):

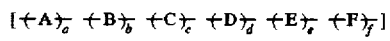  (I)

wherein A to F are monomer units constituting the main chain in which monomer units A to F are arranged in any order, and a to f are, respectively, weight percentages of monomer units A to F, based on the total weight of monomer units A to F;
wherein:
A is selected from the class consisting of cyclic olefin monomer units,
B is selected from the class consisting of cyclic conjugated diene monomer units,
C is selected from the class consisting of chain conjugated diene monomer units,
D is selected from the class consisting of vinyl aromatic monomer units,
E is selected from the class consisting of polar monomer units, and
F is selected from the class consisting of an ethylene monomer unit and α-olefin monomer units; and
wherein:
a to f satisfy the following requirements:

$a+b+c+d+e+f=100$,
$0.001 \leq a \leq 100$,
$0 \leq b < 100$,
$0 \leq c < 100$,
$0 \leq d < 100$,
$0 \leq e < 100$, and
$0 \leq f < 100$.

with the proviso that the monomer unit A is present in an amount of from 0.1 to 100 mole %, based on the total number of moles of the monomer units A and B, with the proviso that when a=100 and the A monomer units are comprised of cyclic olefin monomer units which are the same, the polymer has a number average molecular weight of from 10,000 to 5,000,000, that when a=100 and the A monomer units are comprised of cyclic olefin monomer units which are different, the polymer has a number average molecular weight of from 1,000 to 5,000,000, and that when $0.001 \leq a+b<100$, the polymer has a number average molecular weight of from 500 to 5,000,000.

In another aspect of the present invention, there is provided a method for producing a polymer, containing a cyclic olefin monomer unit, which comprises a main chain represented by the above formula (I), which comprises the steps of:

(1) polymerizing at least one cyclic conjugated diene monomer, or at least one cyclic conjugated diene monomer and at least one comonomer copolymerizable therewith, the at least one comonomer being selected from the class consisting of chain conjugated diene monomers, vinyl aromatic monomers, polar monomers, an ethylene monomer, and α-olefin monomers, thereby obtaining a cyclic conjugated diene polymer comprising a main chain represented by the following formula (I');

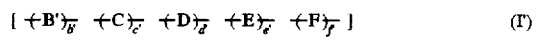  (I')

wherein B', C, D, E and F are monomer units constituting the main chain of formula (I') in which monomer units B' to F are arranged in any order, and b' to f' are, respectively, weight percentages of monomer units B' to F, based on the total weight of monomer units B' to F;
wherein:
B' has the same meaning as defined for B of formula (I), and C, D, E and F, respectively, having the same meanings as defined for formula (I); and
wherein:
b' to f' satisfy the following requirements:

$b'+c'+d'+e'+f'=100$,
$0.001 \leq b' \leq 100$,
$0 \leq c' < 100$,
$0 \leq d' < 100$,
$0 \leq e' < 100$, and
$0 \leq f' < 100$; and (2) subjecting the cyclic conjugated diene polymer to an addition reaction selected from the group consisting of hydrogenation, halogenation, hydrohalogenation, alkylation and arylation, wherein the addition reaction is performed at a carbon-to-carbon double bond of the B' monomer unit to the extent that 0.1 to 100 mole %, based on the number of moles of the B' monomer unit, of said B' monomer unit are saturated, to thereby convert 0.1 to 100 mole % of the B' monomer unit to the A monomer unit.

DETAILED DESCRIPTION OF THE INVENTION

Figure 1:
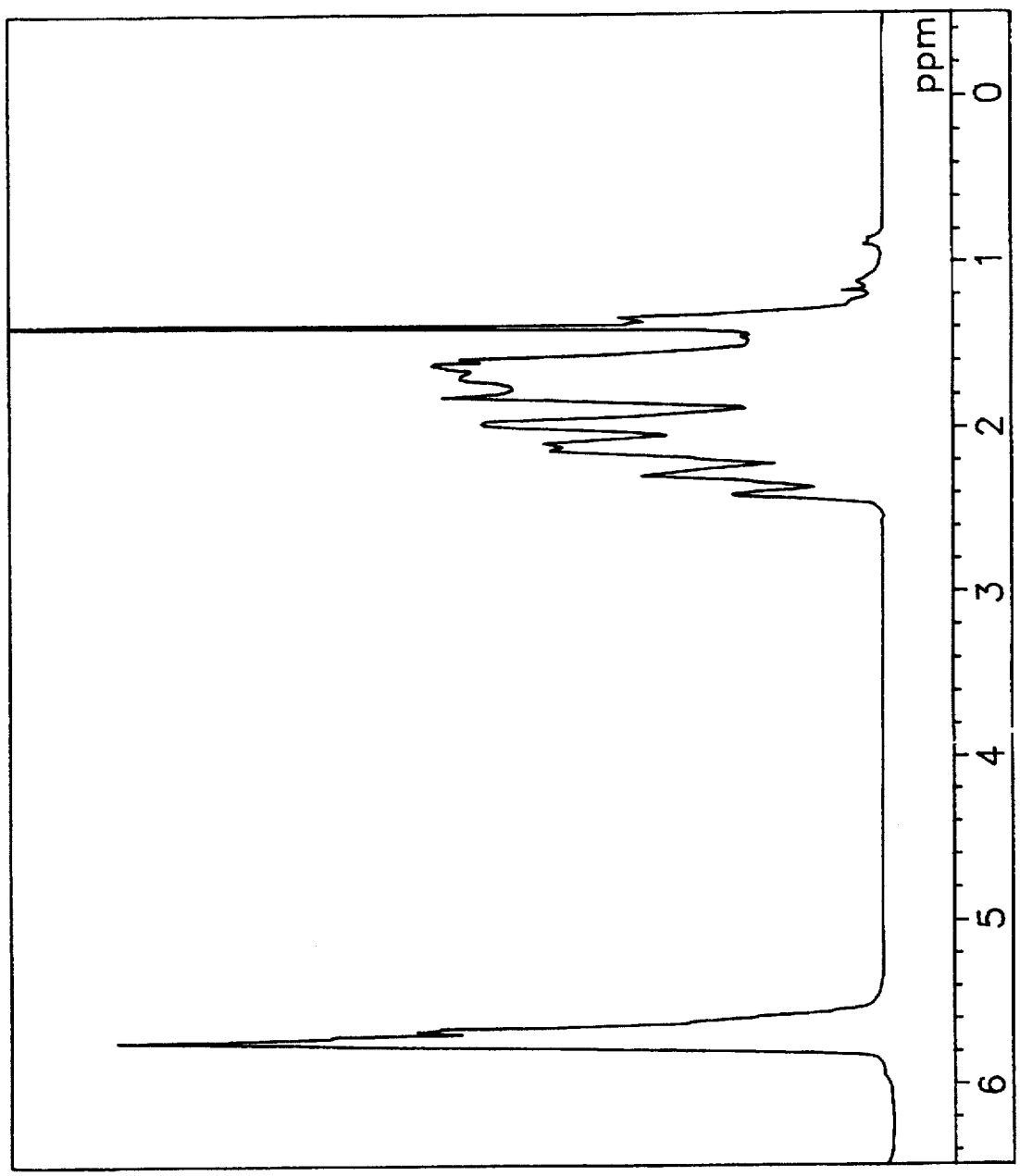
FIG. 1 is a chart showing the $^1$H-NMR spectrum of the cyclic conjugated diene homopolymer to be subjected to hydrogenation, obtained in Example 1.
Figure 2:
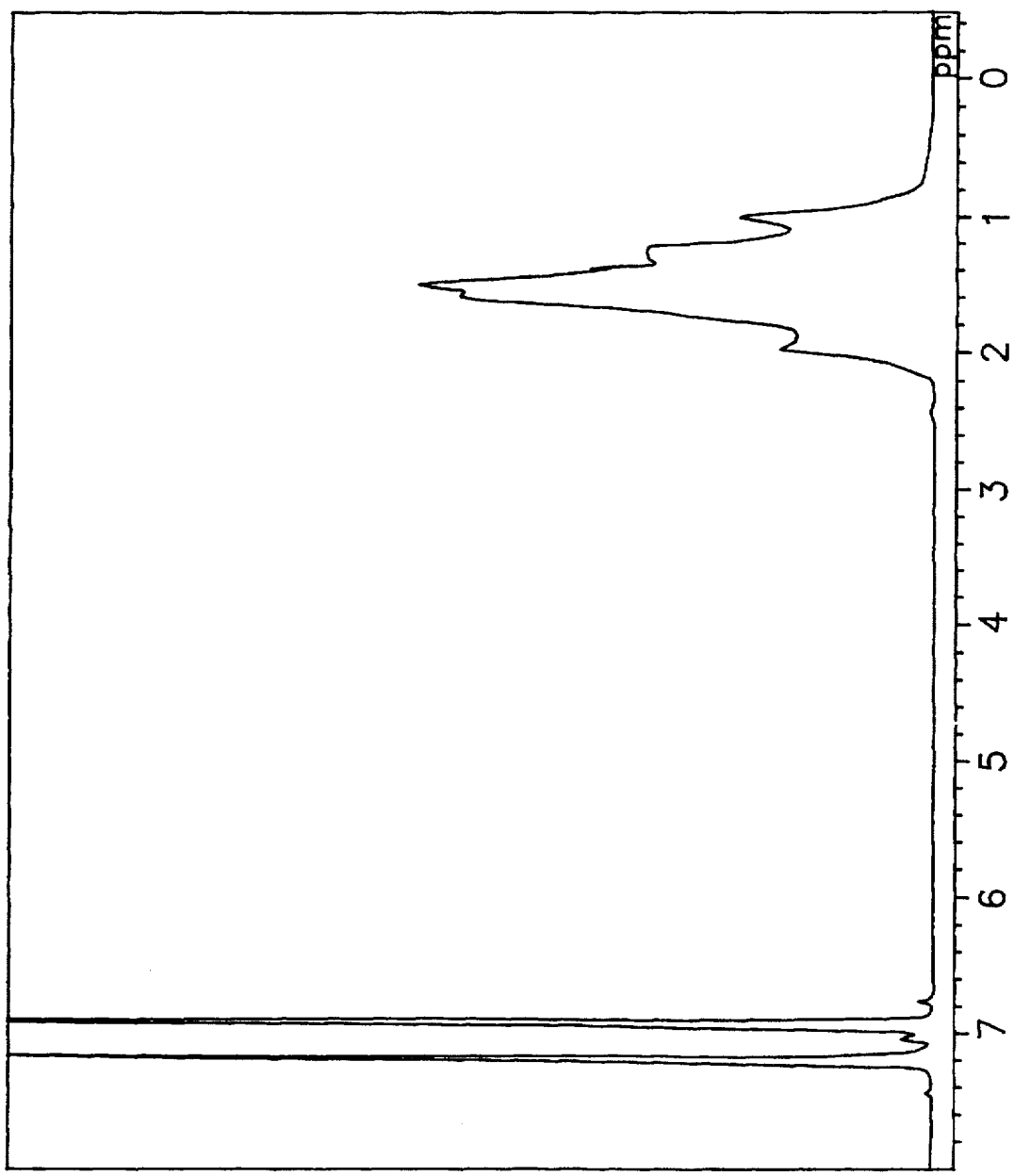
FIG. 2 is a chart showing the $^1$H-NMR spectrum of the hydrogenated cyclic conjugated diene homopolymer, obtained in Example 1.
Figure 3:
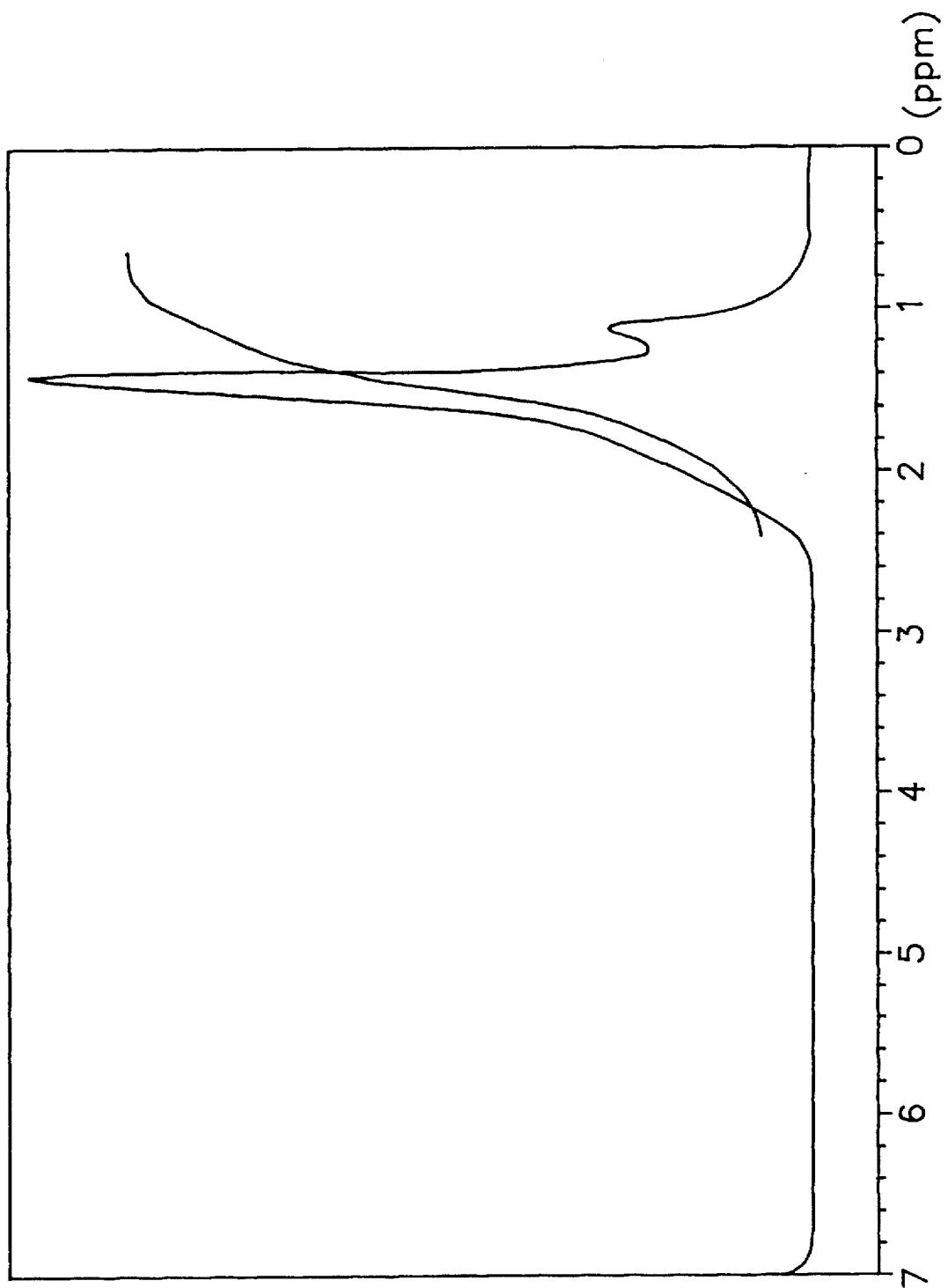
FIG. 3 is a chart showing the $^1$H-NMR spectrum of the hydrogenated polybutadiene-polycyclohexadiene diblock copolymer, obtained in Example 36.
Figure 4:
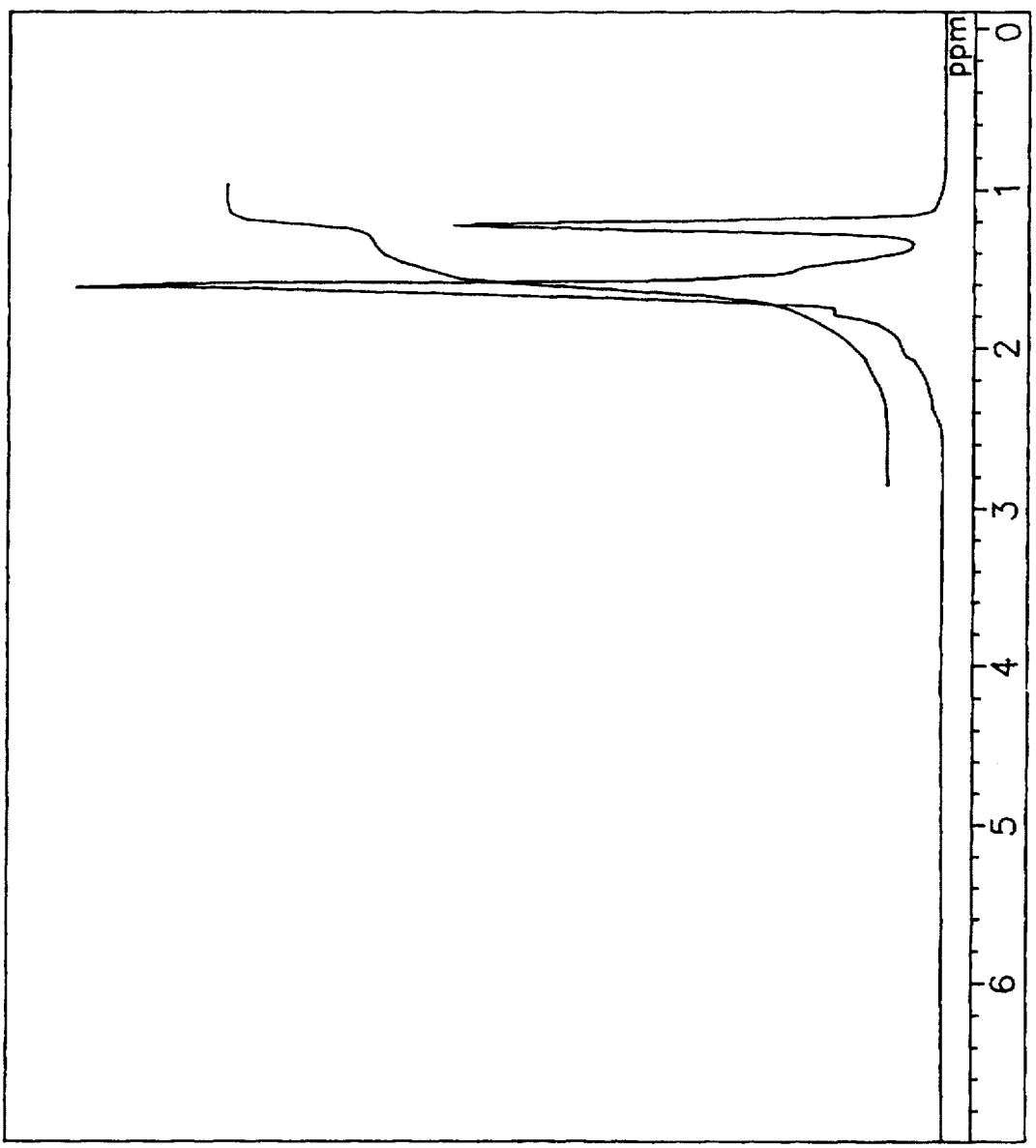
FIG. 4 is a chart showing the $^1$H-NMR spectrum of the hydrogenated polycyclohexadiene-polybutadiene-polycyclohexadiene triblock copolymer, obtained in Example 48.

For easy understanding of the present invention, the essential features and various embodiments of the present invention are enumerated below.

1. A polymer containing a cyclic olefin monomer unit, comprising a main chain represented by the following formula (I):

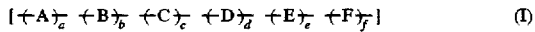

$$[-(A)_a-(B)_b-(C)_c-(D)_d-(E)_e-(F)_f-] \quad (I)$$

wherein A to F are monomer units constituting the main chain in which monomer units A to F are arranged in any order, and a to f are, respectively, weight percentages of monomer units A to F, based on the total weight of monomer units A to F;

wherein:
- A is selected from the class consisting of cyclic olefin monomer units,
- B is selected from the class consisting of cyclic conjugated diene monomer units,
- C is selected from the class consisting of chain conjugated diene monomer units,
- D is selected from the class consisting of vinyl aromatic monomer units,
- E is selected from the class consisting of polar monomer units, and
- F is selected from the class consisting of an ethylene monomer unit and α-olefin monomer units; and wherein:
a to f satisfy the following requirements:
a+b+c+d+e+f=100,
$0.001 \leq a \leq 100$,
$0 \leq b < 100$,
$0 \leq c < 100$,
$0 \leq d < 100$,
$0 \leq e < 100$, and
$0 \leq f < 100$, with the proviso that the monomer unit A is present in an amount of from 0.1 to 100 mole %, based on the total number of moles of the monomer units A and B, with the proviso that when a=100 and the A monomer units are comprised of cyclic olefin monomer units which are the same, the polymer has a number average molecular weight of from 10,000 to 5,000,000, that when a=100 and the A monomer units are comprised of cyclic olefin monomer units which are different, the polymer has a number average molecular weight of from 1,000 to 5,000,000, and that when $0.001 \leq a+b < 100$, the polymer has a number average molecular weight of from 500 to 5,000,000.

2. The polymer according to item 1 above, wherein a+b=100 and 0<b, and wherein the A monomer units are comprised of cyclic olefin monomer units which are the same or different, and the B monomer units are comprised of cyclic conjugated diene monomer units which are the same or different.

3. The polymer according to item 1 above, wherein a=100, and wherein the A monomer units are comprised of cyclic olefin monomer units which are the same or different.

4. The polymer according to item 1 above, wherein $0.001 \leq (a+b) < 100$ and $0.001 \leq a < 100$, and wherein the A monomer units are comprised of cyclic olefin monomer units which are the same or different, and the B monomer units are comprised of cyclic conjugated diene monomer units which are the same or different.

5. The polymer according to item 1 above, which is a random copolymer having a number average molecular weight of 1,000 to 5,000,000.

6. The polymer according to item 1 above, which is an alternating copolymer having a number average molecular weight of 1,000 to 5,000,000.

7. The polymer according to item 1 above, which is a block copolymer having at least one polymer block containing at least one A monomer unit and having a number average molecular weight of from 500 to 5,000,000.

8. The polymer according to item 7 above, wherein the polymer block consists of at least two A monomer units.

9. The polymer according to item 7 above, wherein the polymer block further contains at least one B monomer unit.

10. The polymer according to item 9 above, wherein the polymer block consists of at least one A monomer unit and at least one B monomer unit.

11. The polymer according to item 7 above, which is an at least-tri-block copolymer.

12. The polymer according to item 7 above, which is a block copolymer having at least two polymer blocks each containing at least one A monomer unit.

13. The polymer according to item 7 above, which is a block copolymer having at least two polymer blocks each containing at least one A monomer unit and at least one B monomer unit.

14. The polymer according to item 7 above, which is a block copolymer having at least two polymer blocks each consisting of at least two A monomer units.

15. The polymer according to item 7 above, which is a block copolymer having at least two polymer blocks each consisting of at least one A monomer unit and at least one B monomer unit.

16. The polymer according to item 7 above, which is an at least-di-block copolymer comprising at least one X polymer block containing at least one A monomer unit, and at least one Y polymer block comprised mainly of monomer units of at least one type selected from the C to the F, wherein the weight ratio of the X block to the Y block is from 1/99 to 99/1.

17. The polymer according to item 7 above, which is an at least-tri-block copolymer comprising at least two X blocks each containing at least one A monomer unit, and at least one Y block comprised mainly of monomer units of at least one type selected from the C to the F, wherein the weight ratio of the at least two X blocks to the at least one Y block is from 1/99 to 99/1.

18. The polymer according to item 7 above, which is a triblock copolymer comprising two X blocks each containing at least one A monomer unit, and one Y block

11 comprised mainly of monomer units of at least one type selected from the C to the F, wherein the weight ratio of the at least two X blocks to the at least one Y block is from 1/99 to 99/1.

19. The polymer according to item 17 above, wherein the at least-tri-block copolymer has a configuration represented by a formula selected from the group consisting of $X-(Y-X)_p$, $(X-Y)_q$, $Y-(X-Y)_q$, $|(X-Y)_p\frac{1}{2}|$, $|(Y-X)_p\frac{1}{q}|$, $|(X-Y)_p-X\frac{1}{q}|$, and $|(Y-X)_p-Y\frac{1}{q}|$ in which X and Y are as defined above, p is an integer of 1 or more, and q is an integer of 2 or more.

20. The polymer according to any one of items 1 to 19 above, wherein the A monomer units are comprised of at least one cyclic olefin monomer unit selected from the class consisting of units represented by the following formula (II):

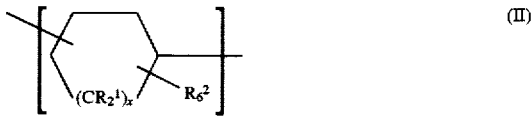

wherein each $R^1$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, and x is an integer of from 1 to 4, and each $R^2$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, or each $R^2$ independently represents a bond or a group such that two $R^2$ groups together form a bridge represented by formula $-(CR_2^3)_y$ in which $R^3$ has the same meaning as defined for $R^1$ and y is an integer of from 1 to 10, and wherein the B monomer units are comprised of at least one cyclic conjugated diene monomer unit selected from the class consisting of units represented by the following formula (III):

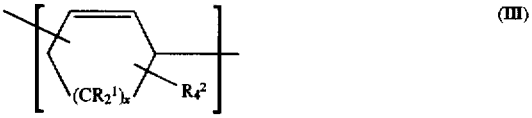

wherein each $R^1$, $R^2$ and x is as defined for formula (II).

21. The polymer according to item 20 above, wherein the at least one cyclic olefin monomer unit A is represented by the following formula (IV):

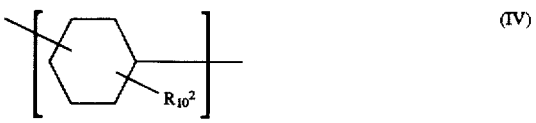

wherein each $R^2$ is as defined for formula (II), and wherein the at least one cyclic conjugated diene monomer unit B is represented by the following formula (V):

wherein each $R^2$ is as defined for formula (II).

22. A method for producing a polymer comprising a main chain represented by the following formula (I):

12

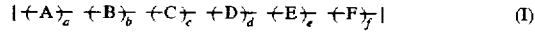  (I)

wherein A to F are monomer units constituting the main chain in which monomer units A to F are arranged in any order, and a to f are, respectively, weight percentages of monomer units A to F, based on the total weight of monomer units A to F;

wherein:

A is selected from the class consisting of cyclic olefin monomer units,

B is selected from the class consisting of cyclic conjugated diene monomer units, C is selected from the class consisting of chain conjugated diene monomer units, D is selected from the class consisting of vinyl aromatic monomer units, E is selected from the class consisting of polar monomer units, and F is selected from the class consisting of an ethylene monomer unit and α-olefin monomer units; and wherein:

a to f satisfy the following requirements:

a+b+c+d+e+f=100, $0.001 \leq a \leq 100$, $0 \leq b < 100$, $0 \leq c < 100$, $0 \leq d < 100$, $0 \leq e < 100$, and $0 \leq f < 100$, with the proviso that the monomer unit A is present in an amount of from 0.1 to 100 mole %, based on the total number of moles of the monomer units A and B, which comprises the steps of:

(1) polymerizing at least one cyclic conjugated diene monomer, or at least one cyclic conjugated diene monomer and at least one comonomer copolymerizable therewith, the at least one comonomer being selected from the class consisting of chain conjugated diene monomers, vinyl aromatic monomers, polar monomers, an ethylene monomer, and α-olefin monomers, thereby obtaining a cyclic conjugated diene polymer comprising a main chain represented by the following formula (I');

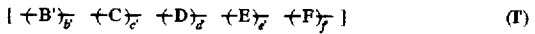  (I')

wherein B', C, D, E and F are monomer units constituting the main chain of formula (I') in which monomer units B' to F are arranged in any order, and b' to f' are, respectively, weight percentages of monomer units B' to F, based on the total weight of monomer units B' to F;

wherein:

B' has the same meaning as defined for B of formula (I), and C, D, E and F, respectively, having the same meanings as defined for formula (I); and wherein:

b' to f' satisfy the following requirements:

b'+c'+d'+e'+f'=100, $0.001 \leq b' < 100$, $0 \leq c' < 100$, $0 \leq d' < 100$, $0 \leq e' < 100$, and $0 \leq f' < 100$; and (2) subjecting the cyclic conjugated diene polymer to an addition reaction selected from the group consisting of hydrogenation, halogenation, hydrohalogenation, alkylation and arylation, wherein the addition reaction is performed at a carbon-to-carbon double bond of the B' monomer unit to the extent that 0.1 to 100 mole %, based on the number of moles of the B' monomer unit, of the B' monomer unit are saturated, to thereby convert 0.1 to 100 mole % of the B' monomer unit to the A monomer unit.

23. The method according to item 22 above, wherein the addition reaction in step (2) is a hydrogenation reaction.

24. The method according to item 22 above, wherein in step (1), the copolymerization of at least one cyclic conjugated diene monomer and at least one comonomer is conducted to thereby produce a block copolymer.

25. The method according to item 22 above, wherein the at least one cyclic conjugated diene monomer unit B' is selected from the class consisting of units represented by the following formula (III):

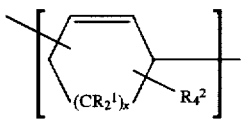

wherein each $R^1$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, and x is an integer of from 1 to 4, and each $R^2$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, or each $R^2$ independently represents a bond or a group such that two $R^2$ groups together form a bridge represented by formula $-(CR_2^3)_y-$ in which $R^3$ has the same meaning as defined for $R^1$ and y is an integer of from 1 to 10, thereby producing a polymer comprising a main chain represented by formula (I) wherein the A monomer unit is selected from the class consisting of units represented by the following formula (II):

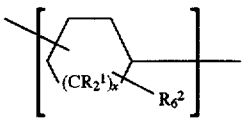

wherein each $R^1$, each $R^2$ and x are as defined for formula (III).

26. The method according to item 24 above, wherein the at least one cyclic conjugated diene monomer unit B' is represented by the following formula (V):

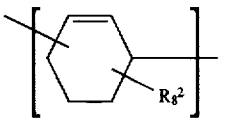

wherein each $R^2$ is as defined for formula (III), thereby producing a polymer comprising a main chain represented by formula (I) wherein the A monomer unit is represented by the following formula (IV):

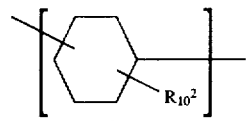

wherein each $R^2$ is as defined for formula (III).

27. The method according to any one of items 22 to 26 above, wherein the polymerization in step (1) is performed in the presence of a catalyst comprised of a complex of at least one organometallic compound containing a metal belonging to Group IA of the Periodic Table with at least one complexing agent.

28. The method according to item 27 above, wherein the at least one complexing agent comprises an amine.

29. The method according to item 27 above, wherein the at least one complexing agent is an aliphatic amine.

30. The method according to item 27 above, wherein the at least one complexing agent is a diamine.

31. The method according to item 27 above, wherein the at least one completing agent is an aliphatic diamine.

32. The method according to item 27 above, wherein the at least one complexing agent is a tertiary amine.

33. The method according to item 30 above, wherein the diamine is at least one member selected from the group consisting of tetramethylethylenediamine (TMEDA) and 1,4-diazabicyclo[2,2,2]-octane (DABCO).

34. The method according to item 27 above, wherein the at least one organometallic compound containing a metal belonging to Group IA of the Periodic Table is an organolithium compound.

35. The method according to item 27 above, wherein the at least one organometallic compound containing a metal belonging to Group IA of the Periodic Table is an organolithium compound selected from the group consisting of normal butyllithium (n-BuLi), secondary butyllithium (s-BuLi) and tertiary butyllithium (t-BuLi), and the at least one completing agent is selected from the group consisting of tetramethylethylenediamine (TMEDA) and 1,4-diazabicyclo[2,2,2]-octane (DABCO).

36. The method according to any one of items 27 to 35 above, wherein the polymerization is a homopolymerization of one cyclic conjugated diene monomer, thereby producing a cyclic conjugated diene homopolymer.

37. The method according to any one of items 27 to 35 above, wherein the polymerization is a copolymerization of at least two cyclic conjugated diene monomers or a copolymerization of at least one cyclic conjugated diene monomer and at least one comonomer, thereby producing a cyclic conjugated diene copolymer.

38. The method according to item 27 above, wherein the complex is formed prior to the polymerization of the at least one cyclic conjugated diene monomer.

In the present invention, the monomer units of the polymer are named in accordance with a nomenclature such that the names of the original monomers from which the monomer units are derived, as such, are used with the term "unit" attached thereto. For example, the term "cyclic olefin monomer unit" means a monomer unit which is formed in a polymer obtained by the polymerization of a cyclic olefin monomer and which has a molecular structure such that a cycloalkane corresponding to the cyclic olefin monomer is bonded at two carbon atoms of a skeleton thereof. Further, the term "cyclic conjugated diene monomer unit" means a monomer unit which is formed in a polymer obtained by the polymerization of a cyclic conjugated diene monomer and which has a molecular structure such that a cycloolefin corresponding to the cyclic conjugated diene monomer is bonded at two carbon atoms of a skeleton thereof.

The novel polymer of the present invention is a polymer comprising a main chain which is comprised partly or entirely of a cyclic olefin monomer unit. Specifically, the polymer of the present invention is a polymer, containing a cyclic olefin monomer unit, which comprises a main chain represented by the above-mentioned formula (I).

Representative examples of such a novel polymers of the present invention include a polymer comprising a main chain which is comprised solely of at least one monomer unit selected from the class consisting of cyclic olefin monomer units, and a polymer comprising a main chain which is comprised of at least one monomer unit selected from the class consisting of cyclic olefin monomer units and a monomer unit derived from at least one comonomer copolymerizable with the cyclic olefin monomer.

More specifically, the polymer of the present invention is a polymer comprising a main chain which is comprised partly or entirely of cyclic olefin monomer units of an at least-5-membered carbocyclic structure which are linked at the 1- and 2-positions thereof, 1- and 4-positions thereof or like.

More preferably, the polymer of the present invention is a polymer comprising a main chain which is comprised partly or entirely of cyclic olefin monomer units of a 5 to 8-membered carbocyclic structure which are linked at the 1- and 2-positions thereof, 1- and 4-positions thereof or like.

Specific examples of such a polymer of the present invention include those which are obtained by subjecting a homopolymer of a cyclic conjugated diene monomer, a copolymer of at least two types of cyclic conjugated diene monomers, or a copolymer of a cyclic conjugated diene monomer and a comonomer copolymerizable with the cyclic conjugated diene monomer, to an addition reaction, wherein the addition reaction is performed at a carbon-to-carbon double bond or bonds of a part or all of the cyclic conjugated diene monomer units, to thereby convert the cyclic conjugated diene monomer unit to a cyclic olefin monomer unit.

Preferred examples of polymers of the present invention include those which are obtained by subjecting a homopolymer of a cyclic conjugated diene monomer, a copolymer of at least two types of cyclic conjugated diene monomers, or a copolymer of a cyclic conjugated diene monomer and a comonomer copolymerizable with the cyclic conjugated diene monomer, to hydrogenation, wherein the hydrogenation is performed at a carbon-to-carbon double bond or bonds of a part or all of the cyclic conjugated diene monomer units.

More preferred examples of polymers of the present invention include those which comprise a main chain which is comprised of cyclic olefin monomer units having a cyclohexane ring in a molecular structure thereof.

There is no particular limitation with respect to a method for producing a novel polymer of the present invention, as long as the polymer contains a cyclic olefin monomer unit and has a number average molecular weight falling within the range specified in the present invention.

As a method for producing a novel polymer of the present invention, there can be mentioned a method which comprises polymerizing or copolymerizing cyclic conjugated diene monomers to thereby obtain a cyclic conjugated diene polymer, and subjecting the obtained cyclic conjugated diene polymer to an addition reaction, wherein the addition reaction is performed at a carbon-to-carbon double bond or bonds in a part or all of the cyclic conjugated diene monomer units contained in the cyclic conjugated diene polymer, to thereby convert the cyclic conjugated diene monomer unit to the cyclic olefin monomer unit; and a method which comprises polymerizing or copolymerizing a cyclic olefin monomer to thereby obtain a polymer containing a cyclic olefin monomer unit.

From a commercial point of view, it is preferred to employ a method which comprises polymerizing or copolymerizing cyclic conjugated diene monomers to thereby obtain a cyclic conjugated diene polymer, and subjecting the obtained cyclic conjugated diene polymer to hydrogenation reaction, wherein the hydrogenation reaction is preformed at a carbon-to-carbon double bond or bonds in a part or all of the cyclic conjugated diene monomer units contained in the cyclic conjugated diene polymer, to thereby convert the cyclic conjugated diene monomer unit to a cyclic olefin monomer unit.

It is preferred that the cyclic olefin monomer unit be a molecular unit represented by the following formula (II), namely, a cyclic olefin monomer unit having a 5 to 8-membered carbocyclic ring structure formed by carbon-to-carbon single bonds:

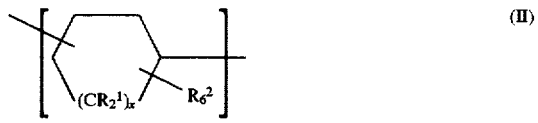

wherein each $R^1$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, and x is an integer of from 1 to 4, and each $R^2$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group, or a 5 to 10-membered heterocyclic group having at least one nitrogen, oxygen or sulfur atom as a heteroatom, or each $R^2$ independently represents a bond or a group such that two $R^2$ groups together form a bridge represented by formula $-(CR_2^3)_y-$ in which $R^3$ has the same meaning as defined for $R^1$ and y is an integer of from 1 to 10.

It is especially preferred that the cyclic olefin monomer unit be a molecular unit, represented by the following formula (IV), which has a 6-membered carbocyclic structure formed by carbon-to-carbon single bonds:

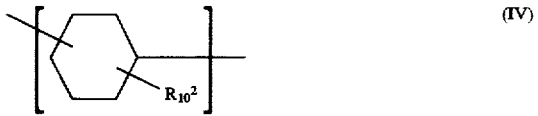

wherein each $R^2$ is as defined for formula (II).

In the present invention, as represented by the above formulae (II) and (IV), the cyclic olefin monomer unit may be comprised solely of carbon atoms and hydrogen atoms, or may contain a halogen atom, such as a fluorine atom, a chlorine atom, a bromine atom or an iodine atom; and/or one or more of at least one type of organic substituent, such as an alkyl group, an aryl group and/or the like.

Further, with respect to $R^1$ of formula (II), it is preferred that the alkyl group have 2 to 10 carbon atoms, the aliphatic hydrocarbon group have 2 to 10 carbon atoms, the aryl group have 5 to 10 carbon atoms, the cycloalkyl group have 5 to 10 carbon atoms, the cyclodienyl group have 5 to 10 carbon atoms, and the heterocyclic group be a 5 to 8-membered heterocyclic group.

Examples of such organic substituents include an aliphatic group, such as a methyl group, an ethyl group, an n-propyl group, an isopropyl group, an n-butyl group, a sec-butyl group, a tert-butyl, a pentyl group, a hexyl group, and a cyclohexyl group and a vinyl group; or a cyclic alkyl group represented by the formula $-(CH_2)_n$ (wherein n is a positive integer); and an aromatic group, such as a phenyl group, a tolyl group, a naphthyl group, a cyclopentadienyl group, an indenyl group, a pyridyl group and a piperidyl group. These organic substituents may be used individually or in combination.

In the present invention, it is preferred that the cyclic olefin monomer unit be a cyclic olefin monomer unit which is composed solely of carbon atoms and hydrogen atoms and has a 5 to 8-membered carbocyclic structure. It is most preferred that the cyclic olefin monomer unit be a cyclic olefin monomer unit which is composed solely of carbon atoms and hydrogen atoms and has a 6-membered carbocyclic structure, namely, a cyclohexane ring.

In the novel polymer of the present invention, the cyclic olefin monomer units are linked at the 1- and 2-positions thereof and/or 1- and 4-positions thereof. In the present invention, it is preferred that such cyclic olefin monomer units be linked at the 1- and 2-positions thereof and 1- and 4-positions thereof.

The novel polymer of the present invention may contain a cyclic conjugated diene monomer unit in an amount represented by the formula $0 \leq b < 100$, wherein b represents a weight percentage of the cyclic conjugated diene monomer, based on the weight of the main chain of the polymer. In the present invention, it is preferred that the cyclic conjugated diene monomer unit be a monomer unit derived from a cyclic conjugated diene having an at least-5-membered carbocyclic structure.

It is more preferred that the cyclic conjugated diene monomer unit be a monomer unit derived from a cyclic conjugated diene having a 5 to 8-membered carbocyclic structure, represented by the following formula (III):

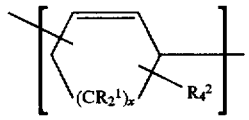

wherein each $R^1$, $R^2$ and x is as defined for formula (II).

It is especially preferred that the cyclic conjugated diene monomer unit be a monomer unit derived from a cyclic conjugated diene having a 6-membered carbocyclic structure, represented by the following formula (V):

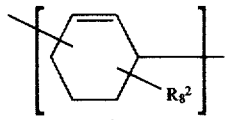

wherein each $R^2$ is as defined for formula (II).

Specific examples of cyclic conjugated diene monomer units include monomer units derived from 1,3-cyclopentadiene, 1,3-cyclohexadiene, 1,3-cycloheptadiene, 1,3-cyclooctadiene, and derivatives thereof. Preferred examples of cyclic conjugated diene monomer units include monomer units derived from 1,3-cyclohexadiene and 1,3-cyclohexadiene derivatives. Of these, a monomer unit derived from 1,3-cyclohexadiene is most preferred.

In the present invention, examples of comonomer units copolymerizable with the cyclic conjugated diene monomer unit include chain conjugated diene monomers, such as 1,3-butadiene, isoprene, 2,3-dimethyl-1,3-butadiene, 1,3-pentadiene, 1,3-hexadiene and derivatives thereof; vinyl aromatic monomers, such as styrene, α-methylstyrene, o-methylstyrene, p-methylstyrene, p-tert-butylstyrene, 1,3-dimethylstyrene, divinylbenzene, vinylnaphthalene, vinylanthracene, 1,1-diphenylethylene, m-diisopropenylbenzene, vinylpyridine and derivatives thereof; polar vinyl monomers, such as methyl methacrylate, methyl acrylate, acrylonitrile, methyl vinyl ketone, methyl α-cyanoacrylate and derivatives thereof; polar monomers, such as ethylene oxide, propylene oxide, cyclohexene oxide, lactone, lactam, cyclosiloxane and derivatives thereof; ethylene monomer and derivatives thereof; and α-olefin monomers and derivatives thereof. Each of these monomers can be used individually or in combination.

In the present invention, a copolymer of the cyclic conjugated diene monomer with the above-mentioned comonomer may be of any configuration.

For example, the copolymer may be a block copolymer, such as a diblock, a triblock, a tetrablock, a multiblock, a radial block, an asymmetry radial block, a graft block, a star block or a comb block copolymer, a graft copolymer, a taper copolymer, a random copolymer or an alternating copolymer.

In the cyclic conjugated diene polymer of the present invention, the content of the cyclic olefin monomer unit is not particularly limited and may vary depending on the intended use of the polymer. However, the content of the cyclic olefin monomer unit is generally within the range of from 0.001 to 100 wt %, preferably from 0.01 to 100 wt %, more preferably from 0.1 to 100 wt %, based on the weight of the main chain of the cyclic conjugated diene polymer.

Further, for obtaining a novel polymer of the present invention which can be used in a field where the polymer is required to have high thermal and mechanical properties, it is recommended that the content of the cyclic olefin monomer unit in the polymer be within the range of from 1 to 100 wt %, more preferably from 2 to 100 wt %, most preferably from 5 to 100 wt %, based on the weight of the main chain of the polymer.

In the novel polymer of the present invention, the cyclic olefin monomer unit is present in an amount of from 0.1 to 100 mole %, based on the total number of moles of the cyclic olefin monomer unit and the cyclic conjugated diene monomer unit.

Further, for obtaining a novel polymer of the present invention which can be used in a field where the polymer is required to have particularly high thermal and mechanical properties, it is recommended that the cyclic olefin monomer unit be present in an amount of from 50 to 100 mole %, preferably from 70 to 100 mole %, most preferably 90 mole % or more, based on the total number of moles of the cyclic olefin monomer unit and the cyclic conjugated diene monomer unit.

With respect to the novel polymer of the present invention, the molecular weight thereof can be appropriately controlled according to the intended use of the polymer. However, the number average molecular weight of the polymer is generally controlled within the range of from 500 to 5,000,000.

From the viewpoint of productivity in the commercial scale production of such a polymer, it is recommended that the number average molecular weight of the polymer be within the range of from 1,000 to 5,000,000, more preferably within the range of from 1,000 to 4,000,000, still more preferably from 1,500 to 3,000,000. The most preferred range is from 2,000 to 2,000,000.

For example, when the polymer is used as a functional material, the number average molecular weight of the polymer is within the range of from 500 to 2,000,000, preferably from 1,000 to 1,000,000, more preferably from 2,000 to 800,000, most preferably from 3,000 to 500,000.

On the other hand, when the polymer is used as a structural material, the number average molecular weight of the polymer is generally within the range of from 20,000 to 5,000,000, preferably from 25,000 to 4,000,000, more preferably from 30,000 to 3,000,000, still more preferably from 35,000 to 3,000,000, most preferably from 40,000 to 2,000,000.

When the novel polymer of the present invention is a homopolymer comprising a main chain which is comprised of only one type of cyclic olefin monomer unit, it is preferred that the number average molecular weight of the polymer be 10,000 or more in terms of the value obtained using a calibration curve of a standard polystyrene.

From the viewpoint of productivity in the commercial scale production of such a homopolymer, the number average molecular weight of the homopolymer is preferably within the range of from 10,000 to 5,000,000, more preferably from 20,000 to 4,000,000, still more preferably from 30,000 to 3,000,000, further more preferably from 40,000 to 2,000,000. The most preferred range is from 40,000 to 1,000,000.

When the number average molecular weight of such a homopolymer is less than 10,000, the homopolymer is likely to become markedly brittle, so that the commercial value of the homopolymer as a structural material becomes extremely low.

On the other hand, when the number average molecular weight of such a homopolymer is more than 5,000,000, the homopolymer is disadvantageous in various aspects from the commercial viewpoint. For example, a homopolymer having such a high molecular weight has disadvantages in that a prolonged period of time is needed for the polymerization reaction, and that the melt viscosity of the homopolymer obtained becomes high.

With respect to the novel polymer of the present invention which is comprised only of cyclic olefin monomer units which are different, there is no particular limitation with respect to the molecular weight thereof, and the molecular weight of the polymer can be appropriately selected according to the intended use of the polymer. However, the number average molecular weight of such a polymer in terms of the value obtained using a calibration curve of a standard polystyrene is generally within the range of from 1,000 to 5,000,000, preferably from 2,000 to 4,000,000, more preferably from 3,000 to 3,000,000, still more preferably from 3,500 to 2,000,000, further more preferably from 4,000 to 2,000,000. The most preferred range is from 4,000 to 1,000,000.

When the number average molecular weight of such a polymer is less than 1,000, the polymer is likely to become thermally unstable, so that the commercial value of the polymer as an industrial material becomes extremely low.

On the other hand, when the number average molecular weight of such a polymer is more than 5,000,000, the polymer is disadvantageous in various aspects from a commercial viewpoint. For example, a novel copolymer having such a high molecular weight has disadvantages in that a prolonged period of time is needed for the polymerization reaction, and the melt viscosity of the polymer obtained becomes high.

With respect to the novel polymer of the present invention which is a copolymer comprising at least one monomer unit selected from the class consisting of cyclic olefin monomer units and a monomer unit derived from at least one comonomer copolymerizable with the cyclic olefin monomer, there is no particular limitation with respect to the molecular weight thereof, and the molecular weight of the copolymer can be appropriately selected according to the intended use of the copolymer. However, the number average molecular weight of such a copolymer in terms of the value obtained using a calibration curve of a standard polystyrene is generally within the range of from 500 to 5,000,000, preferably 1,000 to 4,000,000, more preferably from 2,000 to 3,000,000, still more preferably from 3,000 to 2,000,000, still more preferably from 3,500 to 2,000,000. The most preferred range is from 4,000 to 1,000,000.

When such a copolymer is of a configuration other than block configuration (such as a random or alternating configuration), the number average molecular weight of such a copolymer is generally from 1,000 to 5,000,000, preferably 10,000 to 5,000,000, most preferably from 25,000 to 5,000,000.

When the number average molecular weight of such a copolymer is less than 1,000, the copolymer is likely to become thermally unstable, so that the commercial value of the copolymer as an industrial material becomes low.

On the other hand, when the number average molecular weight of such a copolymer is more than 5,000,000, the polymer is disadvantageous in various aspects from the commercial viewpoint. For example, a cyclic conjugated diene copolymer having such a high molecular weight has disadvantages in that a prolonged period of time is needed for the polymerization reaction, and that the melt viscosity of the copolymer obtained becomes high.

Further, when such a copolymer is a block copolymer having at least one (especially, at least two) polymer block containing at least one cyclic olefin monomer unit, there is no particular limitation with respect to the molecular weight thereof, and the molecular weight of the block copolymer can be appropriately selected according to the intended use of the block copolymer. However, the number average molecular weight of such a block copolymer in terms of the value obtained using a calibration curve of a standard polystyrene is generally within the range of from 500 to 5,000,000, preferably from 1,000 to 4,000,000, more preferably from 2,000 to 3,000,000, still more preferably from 3,000 to 2,000,000. The most preferred range is from 4,000 to 1,000,000.

When the number average molecular weight of such a block copolymer is less than 500, the block copolymer is likely to become thermally unstable, so that the commercial value of the block copolymer as an industrial material becomes low.

On the other hand, when the number average molecular weight of such a block copolymer is more than 5,000,000, the block copolymer is disadvantageous in various aspects from the commercial viewpoint. For example, a block copolymer having such a high molecular weight has disadvantages in that a prolonged period of time is needed for the polymerization reaction, and that the melt viscosity of the block copolymer obtained becomes high.

With respect to the novel polymer of the present invention, for controlling the molecular weight of the polymer or for obtaining it in the form of a star shaped polymer, it can assume a configuration such that the terminals of a plurality of polymeric molecular chains are bonded using a conventional at least-bi-functional coupling agent, such as dimethyldichlorosilane, methyltrichlorosilane, dimethyldibromosilane, methyltribromosilane, titanocene dichloride, methylene chloride, methylene bromide, chloroform, carbon tetrachloride, silicon tetrachloride, titanium tetrachloride, tin tetrachloride, an epoxidized soybean oil, or an ester.

In the present invention, the number average molecular weight ($\overline{Mn}$) is measured by gel permeation chromatography, using a calibration curve obtained with respect to a standard polystyrene samples.

In the present invention, the $\overline{Mw}/\overline{Mn}$ value (criterion of the molecular weight distribution) of the cyclic conjugated diene polymer is within the range of from 1.01 to 10, preferably from 1.03 to 7.0, more preferably from 1.05 to 5.0, most preferably from 1.05 to 2.0.

When the novel polymer of the present invention is a block copolymer containing in a part of the polymeric molecular chain thereof a polymer block containing a cyclic olefin monomer unit, or a polymer block being constituted only of cyclic olefin monomer units, examples of polymer blocks include a polymer block comprised of monomer units derived solely from at least one type of cyclic olefin monomer, a polymer block comprised of a monomer unit derived from at least one type of cyclic olefin monomer and a monomer unit derived from at least one type of comonomer copolymerizable with the cyclic olefin monomer, or a polymer block comprised of monomer units derived solely from at least one comonomer copolymerizable with the cyclic olefin monomer. For attaining various purposes, various types of polymer blocks can be designed and polymerized. By an appropriate choice and combination of such polymer blocks, a block copolymer having suitable properties for the intended use can be obtained.

In the present invention, when a part or all of a polymer block is comprised of monomer units selected from the class consisting of cyclic olefin monomer units, it is necessary that the polymer block contain at least 1 cyclic olefin monomer unit. Further, for obtaining a block copolymer having excellent thermal and mechanical properties, it is recommended that the polymer block contain a contiguous arrangement of at least 2 cyclic olefin monomer units, preferably 5 or more cyclic olefin monomer units, more preferably 10 or more cyclic olefin monomer units, from the viewpoint of improvement of thermal and mechanical properties of the block copolymer of the present invention.

When the novel polymer of the present invention is a copolymer comprising a polymer block comprised only of a cyclic olefin monomer unit, or comprising a polymer block comprised of a cyclic olefin monomer unit and a monomer unit derived from at least one type of comonomer copolymerizable with the cyclic olefin monomer, the method of producing the novel polymer comprises preparing a block unit polymer comprised of monomer units derived from at least one type of cyclic conjugated diene monomer, a block unit polymer comprised of monomer units derived from at least one cyclic conjugated diene monomer and a monomer unit derived from at least one type of comonomer copolymerizable with the cyclic conjugated diene monomer, and a block unit polymer comprised of monomer units derived from at least one type of comonomer copolymerizable with the cyclic conjugated diene monomer; choosing an appropriate combination of these block unit polymers; polymerization-bonding the combination of block unit polymers together; and subjecting the resultant cyclic conjugated diene block copolymer to an addition reaction (preferably, a hydrogenation reaction).

Specific examples of preferred modes of the method for producing the block copolymer include the following modes.

One mode of the method comprises the steps of forming by polymerization a block unit polymer containing a monomer unit derived from at least one type of cyclic conjugated diene monomer, or a block unit polymer derived solely from the cyclic conjugated diene monomer; polymerizing the block unit polymer with at least one type of comonomer copolymerizable with the cyclic conjugated diene monomer, wherein the comonomer is successively bonded to one or both terminals of the block unit polymer by polymerization; and subjecting the resultant block copolymer to an addition reaction.

Another mode of the method comprises the steps of polymerizing at least one type of comonomer copolymerizable with a cyclic conjugated diene monomer to obtain a block unit polymer; polymerizing the block unit polymer with at least one cyclic conjugated diene monomer, and optionally with at least one type of comonomer copolymerizable with the cyclic conjugated diene monomer, wherein the cyclic conjugated diene monomer and the optional comonomer are successively bonded to one or both terminals of the block unit polymer by polymerization; and subjecting the resultant block copolymer to an addition reaction.

A further mode of the method comprises the steps of forming by polymerization a block unit polymer containing a monomer unit derived from at least one cyclic conjugated diene monomer, or a block unit polymer derived solely from the cyclic conjugated diene monomer; polymerizing the block unit polymer with at least one type of comonomer copolymerizable with the cyclic conjugated diene monomer to obtain a polymer; successively bonding to the polymer by polymerization a block unit polymer containing a monomer unit derived from at least one cyclic conjugated diene monomer or a block unit polymer derived solely from the cyclic conjugated diene monomer; and subjecting the resultant block copolymer to an addition reaction.

Still a further mode of the method comprises the steps of polymerizing at least one type of comonomer copolymerizable with the cyclic conjugated diene monomer to obtain a block unit polymer; polymerizing the block unit polymer with a block unit polymer containing a monomer unit derived from at least one cyclic conjugated diene monomers or a block unit polymer derived solely from the cyclic conjugated diene polymer; successively bonding to the resultant polymer by polymerization at least one type of comonomer copolymerizable with the cyclic conjugated diene monomer; and subjecting the resultant block copolymer to an addition reaction.

Still a further mode of the method comprises polymerizing at least one cyclic conjugated diene monomer with at least one type of comonomer copolymerizable with the cyclic conjugated diene monomer, wherein the at least one comonomer has a different polymerization rate from that of the cyclic conjugated diene monomer, to thereby obtain a taper block copolymer; and subjecting the obtained taper block copolymer to an addition reaction.

Still a further mode of the method comprises the steps of forming by polymerization a block unit polymer containing a monomer unit derived from at least one cyclic conjugated diene monomer or a block unit polymer derived only from the cyclic conjugated diene monomer; polymerizing the block unit polymer with at least one type of comonomer copolymerizable with the cyclic conjugated diene monomer to obtain a polymer; bonding the terminals of the polymeric molecular chain of the polymer using a conventional at least-bi-functional coupling agent (such as dimethyldichlorosilane, methyltrichlorosilane, dimethyldibromosilane, methyltribromosilane, titanocene dichloride, methylene chloride, methylene bromide, chloroform, carbon tetrachloride, silicon tetrachloride, titanium tetrachloride, tin tetrachloride, an epoxidized soybean oil, or an ester); and subjecting the resultant block copolymer to an addition reaction.

Still a further mode of the method comprises the steps of forming by polymerization a block unit polymer containing a monomer unit derived from at least one cyclic conjugated diene monomer or a block unit polymer derived only from the cyclic conjugated diene monomer; introducing a functional group to one or both terminals of the block unit polymer using a terminal modifier, to obtain a functional block unit polymer; subjecting the obtained functional block unit polymer to an addition reaction; and bonding the resultant functional block unit polymer to another polymer having a functional group which can be bonded to the functional group of the above-obtained functional block unit polymer.

Still a further mode of the method comprises steps of forming by polymerization a block unit polymer containing a monomer unit derived from at least one cyclic conjugated diene monomer or a block unit polymer derived only from the cyclic conjugated diene monomer; polymerizing the block unit polymer with at least one type of comonomer copolymerizable with the cyclic conjugated diene monomer to obtain a polymer; introducing a functional group to one or both terminals of the thus obtained polymer using a terminal modifier to obtain a functional polymer; subjecting the functional polymer to an addition reaction; and bonding the resultant functional polymer to another polymer having a functional group which can be bonded to the functional group of the above functional polymer.

Still a further mode of the method comprises polymerizing a cyclic conjugated diene monomer and at least one type of comonomer copolymerizable with the cyclic conjugated diene monomer, wherein the ratio of the cyclic conjugated diene monomer to the at least one comonomer is not unity; and subjecting the resultant block copolymer to an addition reaction.

Still a further mode of the method comprises the steps of forming by polymerization a block unit polymer containing a monomer unit derived from at least one cyclic conjugated diene monomer or a block unit polymer derived only from the cyclic conjugated diene monomer, wherein the polymerization is conducted until a desired certain conversion is achieved, so that a certain amount of a cyclic conjugated diene monomer remains unreacted; polymerizing the block unit polymer with at least one type of comonomer copolymerizable with the cyclic conjugated diene monomer to obtain a polymer; polymerizing the polymer with the above-mentioned certain amount of the unreacted cyclic conjugated diene monomer, to thereby obtain a block copolymer; and subjecting the resultant block copolymer to an addition reaction.

In the present invention, the block unit polymer comprised of at least one monomer unit selected from the class consisting of cyclic conjugated diene monomer units may further comprise a monomer unit derived from at least one comonomer copolymerizable with the cyclic conjugated diene monomer.

Further, in the present invention, the block unit polymer comprised of a monomer unit derived from at least one comonomer copolymerizable with the cyclic conjugated diene monomer may further comprise at least one monomer unit selected from the class consisting of cyclic conjugated diene monomer units.

In the present invention, with respect to polymer blocks comprising a cyclic conjugated diene monomer unit, it is most preferred to use a polymer block comprising or consisting of monomer units comprising a cyclohexene ring.

In the novel polymer of the present invention, with respect to polymer blocks comprising a cyclic olefin monomer unit, it is most preferred to use a polymer block comprising or consisting of monomer units comprised of a cyclohexane ring, wherein the polymer block comprising the cyclohexane ring is obtained by subjecting a polymer block comprising the cyclohexene ring to an addition reaction.

In the present invention, the above-mentioned addition reaction is at least one reaction selected from the group consisting of hydrogenation, halogenation, hydrohalogenation, alkylation and arylation, wherein the addition reaction is effected on a cyclic conjugated diene monomer unit and, optionally, on a monomer unit other than the cyclic conjugated diene monomer unit.

In the present invention, for obtaining a block copolymer which has an elastomeric properties (rubber elasticity), it is necessary that the block copolymer be comprised of at least two polymer blocks having a glass transition temperature (Tg) higher than room temperature (agglomeration phases i.e., hard segments) and at least one polymer block having a Tg lower than room temperature (an elastomer phase, i.e., a soft segment), and that these two types of blocks form a microdomain structure.

In the polymeric molecular chain of such a block copolymer, the agglomeration phase functions as a physical crosslinking site at a temperature lower than Tg, so that the block copolymer has elastomeric properties.

On the other hand, at Tg or a temperature higher than Tg, the agglomeration phase becomes fluid, so that the block copolymer is imparted with flowability. Therefore, in this case, it becomes possible to perform a melt molding (such as injection molding, blow molding or extrusion molding) or a cast molding (such as cast film molding).

In the present invention, it is possible to cross-link the polymeric molecular chain of the block copolymer, so as to impart the block copolymer with elastomeric properties (rubber elasticity).

Hereinbelow, the preferred embodiments of the block copolymer of the present invention are enumerated.

(1) A block copolymer, which has at least one polymer block containing at least one A monomer unit.
(2) A block copolymer, which has at least one polymer block consisting of at least two A monomer units.
(3) A block copolymer, which has at least one polymer block containing at least one A monomer unit and at least one B monomer unit.
(4) A block copolymer, which has at least one polymer block consisting of at least one A monomer unit and at least one B monomer unit.
(5) A block copolymer, which is an at least-tri-block copolymer.
(6) A block copolymer, which has at least two polymer blocks each containing at least one A monomer unit.
(7) A block copolymer, which has at least two polymer blocks each containing at least one A monomer unit and at least one B monomer unit.
(8) A block copolymer, which has at least two polymer blocks each consisting of at least two A monomer units.
(9) A block copolymer, which has at least two polymer blocks each consisting of at least one A monomer unit and at least one B monomer unit.
(10) An at least-di-block copolymer, which comprises at least one X polymer block containing at least one A monomer unit, and at least one Y polymer block comprised mainly of monomer units of at least one type selected from the C to the F, wherein the weight ratio of the X block to the Y block is from 1/99 to 99/1.
(11) An at least-tri-block copolymer, which comprises at least two X blocks each containing at least one A monomer unit, and at least one Y block comprised mainly of monomer units of at least one type selected from the C to the F, wherein the weight ratio of the at least two X blocks to the at least one Y block is from 1/99 to 99/1.

(12) A triblock copolymer, which comprises two X blocks each containing at least one A monomer unit, and one Y block comprised mainly of monomer units of at least one type selected from the C to the F, wherein the weight ratio of the at least two X blocks to the at least one Y block is from 1/99 to 99/1.

(13) An at least-tri-block copolymer, which has a configuration represented by a formula selected from the group consisting of X—(Y—X)$_p$, (X—Y)$_q$, Y—(X—Y)$_q$, |(X—Y)$_p$⫿$_q$, |(Y—X)$_p$⫿$_q$, |(X—Y)$_p$—X⫿$_q$, and |(Y—X)$_p$—Y⫿$_q$ in which X and Y are as defined above, p is an integer of 1 or more, and q is an integer of 2 or more.

For obtaining a block copolymer having elastomeric properties (rubber elasticity), it is preferred that the block copolymer contain at least two X blocks, each comprised mainly of at least one type of cyclic olefin monomer unit (in an amount of at least 50 wt %, based on the total weight of the monomer units constituting the X block), or consisting of at least one type of cyclic olefin monomer unit and at least one monomer unit selected from the group consisting of cyclic conjugated diene monomer unit and vinyl aromatic monomer unit, and at least one Y block comprised mainly of at least one type of monomer unit selected from the group consisting of chain conjugated diene monomer unit, ethylene monomer unit and α-olefin monomer unit (in an amount of at least 50 wt %, based on the total weight of the monomer units constituting the Y block). It is more preferred that the block copolymer contain at least two X blocks, each consisting of at least one type of cyclic olefin monomer unit, or at least one type of cyclic olefin monomer unit and at least one monomer unit selected from the group consisting of cyclic conjugated diene monomer unit and vinyl aromatic monomer unit, and at least one Y block comprised mainly of at least one type monomer unit selected from the group consisting of chain conjugated diene monomer unit, ethylene monomer unit and α-olefin monomer unit, (in an amount of at least 50 wt %, based on the total weight of the monomer units constituting the Y block). It is especially preferred that the block copolymer contain at least two X blocks, each consisting of at least one type of cyclic olefin monomer unit, or at least one type of cyclic olefin monomer unit and at least one monomer unit selected from the group consisting of cyclic conjugated diene monomer unit and vinyl aromatic monomer unit, and at least one Y block consisting of at least one type of monomer unit selected from the group consisting of chain conjugated didne monomer unit, ethylene monomer unit and α-olefin monomer unit. It is most preferred that the block copolymer contain at least two X blocks, each consisting of at least one. type of cyclic olefin monomer unit, or at least one type of cyclic olefin monomer unit and at least one type of cyclic olefin monomer unit and at least one type of cyclic conjugated diene monomer unit, and at least one Y block consisting of at least one type of monomer unit selected from the group consisting of chain conjugated didne monomer unit, ethylene monomer unit and α-olefin monomer unit.

When the cyclic conjugated diene block copolymer of the present invention is used as an industrial material, it is preferred that the monomer units constituting the X block be saturated products of monomer units derived from 1,3-cyclohexadiene, saturated products of monomer units derived from 1,3-cyclohexadiene, styrene and/or α-methylstyrene, and that the monomer units constituting the Y block be saturated products of monomer units derived from 1,3-butadiene and/or isoprene.

When the Y block is a saturated product of a polymer block formed by polymerization of 1,3-butadiene monomer and/or isoprene monomer, the vinyl bond content of the polymer block prior to saturation can be appropriately controlled without particular limitation. However, for obtaining a block copolymer having excellent low temperature properties, the vinyl bond content is preferably within the range of from 10 to 90 mol %, more preferably from 20 to 80 mol %, based on the total mol of cis- and trans-1,4-bonds and the vinyl bond, which are present in the polymer block.

In the present invention, for obtaining block copolymers having elastomeric properties (rubber elasticity), for example, it is preferred that the block copolymers be linear block copolymers respectively represented by the formulae (IV) and radial block copolymers respectively represented by the formulae (V):

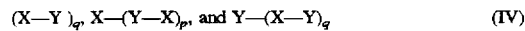

(IV)

wherein p is an integer of 1 or more, and each q is an integer of 2 or more; and

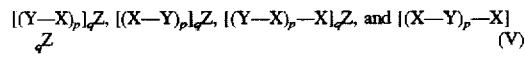

(V)

wherein each p and each q are as defined above; and each Z independently represents a residue of a multifunctional coupling agent, such as dimethyldichlorosilane, methylene chloride, silicon tetrachloride, tin tetrachloride or an epoxidized soybean oil, or a residue of a polymerization initiator, such as a multifunctional organometallic compound containing a metal belonging to Group IA of the Periodic Table.

Representative examples of block copolymers of the present invention, which have thermoplastic elastomeric properties, include a block copolymer which is a triblock copolymer represented by the formula: X—Y—X, wherein the X block is present in an amount of from 10 to 60 wt %, preferably from 15 to 50 wt %, and the Y block is present in an amount of from 90 to 40 wt %, preferably from 85 to 50 wt %, and wherein the triblock copolymer has a number average molecular weight of from 1,000 to 200,000.

On the other hand, representative examples of block copolymers of the present invention, which can be employed as a tough plastic material, include a block copolymer which is a triblock copolymer represented by the formula: X—Y—X, wherein the X block is present in an amount of from 40 to 90 wt %, preferably from 45 to 85 wt %, and the Y block is present in an amount of from 60 to 10 wt %, preferably from 55 to 15 wt %, and wherein the triblock copolymer has a number average molecular weight of from 1,000 to 200,000.

In the present invention, it is most preferred that the above-mentioned block copolymer having elastomeric properties be a polymer which is obtained by the steps comprising forming a cyclic conjugated diene block copolymer, and subjecting the block copolymer to hydrogenation reaction.

A preferred method for producing the polymer (containing a cyclic olefin monomer unit) of the present invention comprises the steps of:

(1) polymerizing at least one cyclic conjugated diene monomer, or at least one cyclic conjugated diene monomer and at least one comonomer copolymerizable therewith (the at least one comonomer being selected from the class consisting of chain conjugated diene monomers, vinyl aromatic monomers, polar monomers, an ethylene monomer, and α-olefin monomers) thereby obtaining a cyclic conjugated diene polymer comprising a main chain represented by the following formula (I');

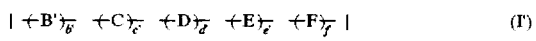
(I')

wherein B', C, D, E and F are monomer units constituting the main chain of formula (I') in which monomer units B' to F are arranged in any order, and b' to f' are, respectively, weight percentages of monomer units B' to F, based on the total weight of monomer units B' to F;

wherein:

B' has the same meaning as defined for B of formula (I), and C, D, E and F, respectively, having the same meanings as defined for formula (I); and wherein:

b' to f' satisfy the following requirements:

b'+c'+d'+e'+f'=100,
0.001≦b'≦100,
0≦c'<100,
0≦d'<100,
0≦e'<100, and
0≦f'<100; and (2) subjecting the cyclic conjugated diene polymer to an addition reaction selected from the group consisting of hydrogenation, halogenation, hydrohalogenation, alkylation and arylation, wherein the addition reaction is performed at a carbon-to-carbon double bond of the B' monomer unit to an extent that 0.1 to 100 mole % (based on the number of moles of the B' monomer unit), of the B' monomer unit are saturated, to thereby convert 0.1 to 100 mole % of the B' monomer unit to the A monomer unit.

In the present invention, the term "cyclic conjugated diene monomer" means a cyclic conjugated diene having an at least-5-membered carbocyclic structure.

It is preferred that the cyclic conjugated diene monomer be a cyclic conjugated diene having a 5 to 8-membered carbocyclic structure.

It is more preferred that the cyclic conjugated diene monomer be a cyclic conjugated diene having a 6-membered carbocyclic structure.

Examples of cyclic conjugated diene monomers include 1,3-cyclopentadiene, 1,3-cyclohexadiene, 1,3-cyclooctadiene, and derivatives thereof. Preferred examples of cyclic conjugated diene monomers include 1,3-cyclohexadiene, a 1,3-cyclohexadiene derivative. Of these, 1,3-cyclohexadiene is most preferred.

In the present invention, as examples of comonomers copolymerizable with the cyclic conjugated diene monomer, there can be mentioned monomers which can be polymerized by anionic polymerization.

Examples of such monomers include chain conjugated diene monomers, such as 1,3-butadiene, isoprene, 2,3-dimethyl-1,3-butadiene, 1,3-pentadiene, 1,3-hexadiene and derivatives thereof; vinyl aromatic monomers, such as styrene, α-methylstyrene, o-methylstyrene, p-methylstyrene, p-tert-butylstyrene, 1,3-dimethylstyrene, divinylbenzene, vinylnaphthalene, vinylanthracene, 1,1-diphenylethylene, m-diisopropenylbenzene, vinylpyridine and derivatives thereof; polar vinyl monomers, such as methyl methacrylate, methyl acrylate, acrylonitrile, methyl vinyl ketone, methyl α-cyanoacrylate and derivatives thereof; polar monomers, such as ethylene oxide, propylene oxide, lactone, lactam, cyclosiloxane and derivatives thereof; ethylene monomer and derivatives thereof; and α-olefin monomers and derivatives thereof. Each of these monomers can be used individually or in combination.

In the present invention, a copolymer of the cyclic conjugated diene monomer with the above-mentioned comonomer may be of any configuration. For example, the copolymer may be a block copolymer, such as a diblock, a triblock, a tetrablock, a multiblock, a radial block, an asymmetry radial block, a graft block, a star block or a comb block copolymer, a graft copolymer, a taper copolymer, a random copolymer or an alternating copolymer.

In the present invention, the monomer unit derived from comonomers copolymerizable with the cyclic conjugated diene monomer may be subjected to an addition reaction, such as hydrogenation, alkylation or halogenation.

When the novel polymer, which contains a cyclic olefin molecular unit, of the present invention is a polymer obtained by subjecting a cyclic conjugated diene polymer to an addition reaction, the content of the cyclic conjugated diene monomer unit in the cyclic conjugated diene polymer as a starting material is not specifically limited and may be appropriately controlled depending on the intended use of the polymer. However, the content of the cyclic conjugated diene monomer unit is generally within the range of from 0.001 to 100 wt %, preferably from 0.01 to 100 wt %, more preferably from 0.1 to 100 wt %.

Especially for obtaining the novel polymer (containing a cyclic olefin monomer unit) of the present invention which can be used in a field where the polymer is required to have high thermal and mechanical properties, it is recommended that the content of the cyclic conjugated diene monomer unit in the cyclic conjugated diene polymer as a starting material be within the range of from 5 to 100 wt %, more preferably from 10 to 100 wt %, most preferably from 15 to 100 wt %.

In the method for producing the novel polymer (containing a cyclic olefin monomer unit) of the present invention, which involves step (1) of polymerizing a cyclic conjugated diene monomer to form a cyclic conjugated diene polymer comprising a main chain represented by the above-mentioned formula (I'), it is preferred that a polymerization catalyst having an anionic polymerization activity, particularly a living anionic polymerization activity, be used in the polymerization step (1).

The polymerization catalyst which is preferably used in the present invention is a complex comprising at least one organometallic compound containing a metal belonging to Group IA of the Periodic Table (Group IA metal) with at least one complexing agent. With respect to the above-mentioned complex as a polymerization catalyst, it is preferred that the Group IA metal be present in the complex in the form of association of 2 metal atoms or more.

Generally, in the field of organometallic chemistry, it has been well known that an organometallic compound containing Group IA metal, and a complexing agent, such as an amine, an ether and a metal alkoxide, together form a highly reactive complex. Therefore, such a complex has been used as an effective reaction reagent in organic synthesis of monomers.

Among these complexes of organometallic compounds containing a Group IA metal, particularly with respect to a complex of an alkyllithium (R—Li) with TMEDA (tetramethylethylenediamine) as a complexing agent, extensive studies have been made.

N.Y. Acad. Sci. 27, 741 (1965) teaches that such a complex as a polymerization active species has a mononuclear alkyllithium—TMEDA complex structure represented by the formula (VI) shown below, which is characterized by containing one metal atom in one complex.

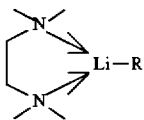

(VI)

wherein R represents a $C_1$–$C_{20}$ alkyl group.

With respect to such a complex, it has been generally considered that, when a complexing agent is added to a system of associated molecules of a Group IA metal-containing organometallic compound, the complexing agent reacts with the organometallic compound to form a complex, thereby destroying the association of the organometallic compound molecules, so that a mononuclear complex is formed, which exhibits a high polymerization activity.

However, generally, in the field of polymer chemistry, it has been considered that a complex of an organometallic compound containing a Group IA metal is not preferable for use in a polymerization reaction, because the reactivity of the complex is likely to be extremely enhanced by ionization of the organometallic compound containing a Group IA metal, or by degradation of the association of the Group IA metal atoms, thus leading to an occurrence of disadvantageous side reactions, such as metalation and abstraction of an acidic proton.

In these situations, the present inventor has made extensive and intensive studies toward developing an excellent polymerization catalyst which not only has a high polymerization activity, but also is free from occurrence of the above-mentioned disadvantageous side reactions.

As a result, the present inventor has found a surprising fact which is contrary to the conventional recognition of a living anionic polymerization catalyst. That is, the present inventors have surprisingly, unexpectedly found that, with respect to a complex of an organometallic compound containing a Group IA metal with a complexing agent, a complex structure capable of well self-stabilizing an association of the molecules of the organometallic compound containing a Group IA metal is most effective for providing an excellent polymerization active species, so that a complex having such a structure can be used as a stable polymerization catalyst which has high polymerization activity and does not cause disadvantageous side reactions, such as metalation and abstraction of an acidic proton, during polymerization. Based on this novel finding, the polymerization catalyst of the present invention has been successfully developed.

With respect to the polymerization catalyst to be used in the present invention, it is preferred that the metal belonging to Group IA of the Periodic Table be present in the complex in the form of an association of 2 metal atoms or more, so as to achieve excellent polymerization activity.

In this case, the association form of the atoms may be varied depending on the respective types of the organometallic compound and the complexing agent, and the intended use of the complex as long as two or more atoms of the Group IA metal are associated together, and a most stable association form can be appropriately selected.

By using such a catalyst for polymerization of at least one type of cyclic conjugated diene monomer, or for polymerization of at least one type of cyclic conjugated diene monomer and at least one comonomer copolymerizable with the cyclic conjugated diene monomer (selected from the class consisting of chain conjugated diene monomers, vinyl aromatic monomers, polar monomers, an ethylene monomer, and α-olefin monomer), the cyclic conjugated diene polymer can be synthesized by anion polymerization, especially by living anion polymerization, from cyclic conjugated diene monomers under commercially advantageous temperature conditions, to thereby obtain a cyclic conjugated diene polymer having a desired configuration and a desired molecular weight distribution.

Examples of metals belonging to Group IA of the Periodic Table (hereinafter, frequently simply referred to as "Group IA metals") which can be used in the above-mentioned polymerization step (1) of the production method of the present invention include lithium, sodium, potassium, rubidium, cesium and francium. Among these, lithium, sodium and potassium are preferred. Of these, lithium and sodium are especially preferred, and lithium is most preferred.

In the present invention, examples of organometallic compounds containing a Group IA metal include an organometallic compound containing lithium, sodium, potassium, rubidium, cesium or francium.

Among these, an organometallic compound containing lithium, sodium or potassium is preferred.

Of these, an organometallic compound containing lithium or sodium is especially preferred, and an organometallic compound containing lithium is most preferred.

Preferable examples of organometallic compounds to be used in the present invention include an organolithium compound, an organosodium compound and an organopotassium compound.

Among these, an organolithium compound and an organosodium compound are especially preferred, and an organolithium compound is most preferred.

The organolithium compound, which is preferably used in the above-mentioned polymerization step (1) of the production method of the present invention, is an organic compound having a structure such that at least one lithium atom (or lithium ion) is bonded to an organic molecule containing at least one carbon atom or an organic polymer having a structure such that at least one lithium atom (or lithium ion) is bonded to an organic polymer.

Examples of organic molecules include a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group and the like.

Examples of organic polymers include polybutadiene, polyisoprene, polystyrene, poly-α-methylstyrene, polyethylene and the like.

Examples of organolithium compounds usable in the present invention include methyllithium, ethyllithium, n-propyllithium, isopropyllithium, n-butyllithium, sec-butyllithium, tert-butyllithium, pentyllithium, hexyllithium, allyllithium, cyclohexyllithium, phenyllithium, hexamethylenedilithium, cyclopentadienyllithium, indenyllithium, 9-fluorenyllithium, 9-anthrylmethyllithium, 1,1-diphenyl-n-hexyllithium, 1,1-diphenyl-3-methylpentyllithium, lithiumnaphtalene, butadienyldilithium, and isoprenyldilithium. Further, known oligomeric or polymeric organolithium compounds, each containing a lithium atom in a polymeric molecular chain thereof, such as polybutadienyllithium, polybutadienyldilithium, polyisoprenyllithium, polyisoprenyldilithium, polystyryllithium, polystyryldilithium, and poly-α-methyldilithium can also be used.

There is no particular limitation with respect to the type of the organolithium compound, as long as a stable complex can be formed. Representative examples of such an organolithium compound include methyllithium, ethyllithium, n-propyllithium, iso-propyllithium, n-butyllithium, sec-butyllithium, tert-butyllithium, and cyclohexyllithium.

From the commercial point of view, preferable examples of organolithium compounds include n-butyllithium (n-BuLi), sec-butyllithium (s-BuLi), and tert-butyllithium (t-BuLi), and of these, n-butyllithium (n-BuLi) is most preferred.

In the present invention, each of the above-mentioned organometallic compounds containing a Group IA metal can be used individually or, if desired, in combination.

As mentioned above, the polymerization catalyst of the present invention comprises a complex of at least one Group IA metal-containing organometallic compound with at least one complexing agent.

There is no particular limitation with respect to the type of the complexing agent. However, it is preferred that the complexing agent be an organic compound having an element which has a non-covalent electron pair capable of coordinating with a metal atom or metal ion in an organometallic compound containing the above-mentioned Group IA metal. Examples of such organic compounds include an organic compound containing at least one element selected from the group consisting of oxygen (O), nitrogen (N), sulfur (S) and phosphorus (P).

Preferred examples of such organic compounds include an ether, a metal alkoxide, an amine, and a thioether. Especially preferred examples of organic compounds include a cyclic ether, such as tetrahydrofuran, crown ether or the like, a metal alkoxide, and an amine. Of these, an amine is most preferred.

Specifically, examples of such amines include an organic amine or an organic polymeric amine, which contains at least one $R^1R^2N$— group (wherein each of $R^1$ and $R^2$ independently represents an alkyl group, an aryl group, or a hydrogen atom) which is a polar group having a non-covalent electron pair capable of coordinating with the organometallic compound containing a Group IA metal to thereby form a complex.

Among these amines, a tert-amine is especially preferred, and a tert-diamine is most preferred.

Specific examples of complexing agents usable in the present invention include diethyl ether, dibutyl ether, 1,2-dimethoxyethane, tetrahydrofuran, 2-methyltetrahydrofuran, tetrahydropyran, 18-crown-6, dibenzo-18-crown-6, 15-crown-5, dibenzo-24-crown-8, cryptand, lithium-t-butoxide, potassium-t-butoxide di-t-butoxybarium, porphyrin, 1,2-dipiperazinoethane, trimethylamine, triethylamine, tri-n-butylamine, quinuclidine, pyridine, 2-methylpyridine, 2,6-dimethylpyridine, dimethylaniline, diethylaniline, tetramethyldiaminomethane, tetramethylethylenediamine, tetramethyl-1,3-propanediamine, tetramethyl-1,3-butanediamine, tetramethyl-1,4-butanediamine, tetramethyl-1,6-hexanediamine, tetramethyl-1,4-phenylenediamine, tetramethyl-1,8-naphthalenediamine, tetramethylbenzidine, tetraethylethylenediamine, tetraethyl-1,3-propanediamine, tetramethyldiethylenetriamine, tetraethyldiethylenetriamine, pentamethyldiethylenetriamine, pentaethyldiethylenetriamine, 1,4-diazabicyclo|2.2.2| octane, 1,5-diazabicyclo[4.3.0]-5-nonene, 1,8-diazabicyclo [5.4.0]-7-undecene, 1,4,8,11-tetramethyl- 1,4,8,11-tetraazacyclotetradecane, tetrakis(dimethylamino)ethylene, tetraethyl-2-butene-1,4-diamine, (−)-2,3-dimethoxy-1,4-bis (dimethylamino)butane (DDB), (+)-1-(2-pyrrolidinylmethyl)pyrrolidine, 2,2'-bipyridyl, 4,4'-bipyridyl, 1,10-phenanthroline, hexamethylphosphoramide (HMPA), and hexamethylphosphoric triamide (HMPT).

Preferred examples of tert-amines usable in the present invention include trimethylamine, triethylamine, tri-n-butylamine, quinuclidine, pyridine, 2-methylpyridine, 2,6-dimethylpyridine, dimethylaniline, diethylaniline, tetramethyldiaminomethane, tetramethylethylenediamine, tetramethyl-1,3-propanediamine (tetramethylpropyrenediamine), tetramethyl-1,3-butanediamine, tetramethyl-1,4-butanediamine (tetramethylbutylenediamine), tetramethyl-1,6-hexanediamine (tetramethylhexanediamine), tetramethyl-1,4-phenylenediamine, tetramethyl-1,8-naphthalenediamine, tetramethylbenzidine, tetraethylethylenediamine, tetraethyl-1,3-propanediamine, tetramethyldiethylenetriamine, tetraethyldiethylenetriamine, pentamethyldiethylenetriamine, pentaethyldiethylenetriamine, 1,4-diazabicyclo|2.2.2| octane, 1,5-diazabicyclo[4.3.0]-5-nonene, 1,8-diazabicyclo [5.4.0]-7-undecene, 1,4,8,11-tetramethyl- 1,4,8,11-tetraazacyclotetradecane, tetrakis(dimethylamino)ethylene, tetraethyl-2-butene-1,4-diamine, (−)-2,3-dimethoxy-1,4-bis (dimethylamino)butane (DDB), (+)-1-(2-pyrrolidinylmethyl)pyrrolidine, 2,2'-bipyridyl, 4,4'-bipyridyl, 1,10-phenanthroline, hexamethylphosphoramide (HMPA), and hexamethylphosphoric triamide (HMPT).

Especially preferred examples of complexing agents usable in the present invention include aliphatic amines, and of these, an aliphatic diamine is most preferred.

Most preferred examples of aliphatic diamines include tetramethylmethylenediamine (TMMDA), tetraethylmethylenediamine (TEMDA), tetramethylethylenediamine (TMEDA), tetraethylethylenediamine (TEEDA), tetramethyl-1,3-propanediamine (TMPDA), tetraethyl-1,3-propanediamine (TEPDA), tetramethylbutylenediamine (TMBDA), tetraethylbutylenediamine (TEBDA), tetramethylpentanediamine, tetraethylpentanediamine, tetramethyl-1,6-hexanediamine (TMHDA), tetraethyl-1,6-hexanediamine (TEHDA), and 1,4-diazabicyclo[2.2.2] octane (DABCO).

From the commercial point of view, it is most preferred to use an aliphatic diamine represented by formula (VI) shown below, which forms a stable complex in cooperation with an organolithium compound:

$$R^1R^2N(CH_2)_nNR^3R^4 \qquad \text{(VI)}$$

wherein each of $R^1$, $R^2$, $R^3$ and $R^4$ independently represents a $C_1$–$C_{20}$ alkyl group, and n represents an integer of from 1 to 20.

It is preferred that such an aliphatic diamine be a diamine having, between two nitrogen atoms thereof, 1 to 6 carbon atoms, preferably 1 to 3 carbon atoms, most preferably 2 carbon atoms.

Especially preferred examples of complexing agents usable in the present invention include tetramethylethylenediamine (TMEDA) and 1,4-diazabicyclo[2.2.2]octane (DABCO). Of these, tetramethylethylenediamine (TMEDA) is most preferred.

The above-mentioned complexing agents, preferably amines, may be used individually or, if desired, in combination.

From the commercial point of view, it is preferred that the catalyst to be used in the present invention be one which is prepared from an organometallic compound (especially an organolithium compound), containing at least one Group IA metal, selected from the group consisting of methyllithium (MeLi), ethyllithium (EtLi), n-propyllithium (n-PrLi), iso-propyllithium (i-PrLi), n-butyllithium (n-BuLi), sec-butyllithium (s-BuLi), tert-butyllithium (t-BuLi), and cyclohexyllithium, and at least one complexing agent (especially an amine) selected from the group consisting of tetramethylmethylenediamine (TMMDA), tetramethylethylenediamine (TMEDA), tetramethyl-1,3-propanediamine (TMPDA), tetramethyl-1,6-hexanediamine (TMHDA), and 1,4-diazabicyclo[2.2.2]octane (DABCO).

In the present invention, it is most preferred that the catalyst be one which is prepared from an organolithium compound selected from the group consisting of n-butyllithium (n-BuLi), sec-butyllithium (s-BuLi), and tert-butyllithium (t-BuLi), and at least one amine selected from the group consisting of tetramethylethylenediamine (TMEDA) and 1,4-diazabicyclo[2.2.2]octane (DABCO).

In the present invention, there is no particular limitation with respect to the method of synthesizing the complex. The synthesis can be conducted by conventional techniques.

Examples of such conventional techniques include a method comprising dissolving the organometallic compound containing a Group IA metal in an organic solvent in an atmosphere of a dried inert gas, and adding thereto a solution of the complexing agent, and a method comprising dissolving the complexing agent in an organic solvent in an atmosphere of a dried inert gas, and adding thereto a solution of the organometallic compound containing a Group IA metal. Of these methods, a preferable method can be appropriately selected.

With respect to the above-mentioned organic solvent, it is preferred that an organic solvent to be used be appropriately selected depending on the type and amount of the organometallic compound and the type and amount of the complexing agent, and be well deaerated and dried prior to use. Further, it is preferred that such organic solvent be inert to the Group IA metal-containing organometallic compound and the complexing agent.

Preferable examples of organic solvents include aliphatic hydrocarbons, such as butane, n-pentane, n-hexane, n-heptane, n-octane, iso-octane, n-nonane and n-decane; alicyclic hydrocarbons, such as cyclopentane, methylcyclopentane, cyclohexane, methylcyclohexane, ethylcyclohexane, cycloheptane, cyclooctane, decalin, and norbornane; aromatic hydrocarbons, such as benzene, toluene, xylene, ethylbenzene, and cumene; and ethers, such as diethyl ether, tetrahydrofuran, and tetrahydropyran. An appropriate solvent can be selected according to the reaction conditions and the like.

These organic solvents may be used individually or, if desired, in combination.

Preferred examples of organic solvents include aliphatic hydrocarbons, alicyclic hydrocarbons, and aromatic hydrocarbons.

Most preferred organic solvents are aliphatic hydrocarbons, alicyclic hydrocarbons, and a combination of these solvents.

Specific examples of most preferred organic solvents usable in the present invention include n-hexane, cyclohexane and methylcyclohexane. These solvents can be used alone or in combination.

Further, it is preferred that the reaction for obtaining the complex of at least one organometallic compound with at least one complexing agent be conducted at −100° to 100° C. From the commercial point of view, it is preferred that the reaction for obtaining the complex be conducted at −20° C. to 80° C., more preferably from −10° C. to 60° C.

Examples of inert gases include helium, nitrogen and argon. Of these, from the commercial point of view, nitrogen and argon are preferred.

In the present invention, the above-mentioned complex is formed by reacting at least one Group IA metal-containing organometallic compound with at least one complexing agent.

Further, in the present invention, it is preferred that the Group IA metal in the complex be present in the form of an association of at least 2 metal atoms, more preferably, 2 to 10 metal atoms, still more preferably 2 to 8 metal atoms, still more preferably 2 to 6 metal atoms, most preferably 2 or 4 metal atoms.

In the present invention, the above-mentioned complex may be in the form of a condensation product of a plurality of complexes.

With respect to the above-mentioned complex of at least one Group IA metal-containing organometallic compound with at least one complexing agent, structural composition thereof may vary depending on the types of the Group IA metal-containing compound, the complexing agent and the monomers to be used. However, for obtaining a stable complex, so as to achieve a high polymerization activity, it is preferred that the complex have the following molar ratio of the Group IA metal contained in the organometallic compound to the complexing agent. The molar ratio is:

generally,
$A/B=60/1$ to $1/60$,
preferably,
$A/B=50/1$ to $1/50$,
more preferably,
$A/B=30/1$ to $1/30$,
still more preferably,
$A/B=20/1$ to $1/20$,
most preferably,
$A/B=10/1$ to $1/10$, wherein A is the molar amount of the Group IA metal contained in the organometallic compound, and B is the molar amount of the complexing agent.

The catalyst satisfying the above-mentioned molar ratio $A/B$ can be advantageously used for producing a polymer or a copolymer in high yield.

When the molar ratio $A/B$ is outside the range as defined above, various disadvantages are likely to be caused in that the production process for the complex becomes costly, and that the complex becomes unstable, so that concurrently with the polymerization reaction, an undesirable side reaction, such as a transfer reaction or an unintended termination of the polymerization, is likely to occur.

Representative examples of polymerization catalysts of the present invention include a catalyst comprising a complex of $A_1$ mol of an organolithium compound selected from the group consisting of methyllithium (MeLi), ethyllithium (EtLi), n-propyllithium (n-PrLi), iso-propyllithium (i-PrLi), n-butyllithium (n-BuLi), sec-butyllithium (s-BuLi), tert-butyllithium (t-BuLi), and cyclohexyllithium, with $B_1$ mol of at least one amine selected from the group consisting of tetramethylmethylenediamine (TMMDA), tetramethylethylenediamine (TMEDA), tetramethyl-1,3-propanediamine (TMPDA), tetramethyl-1,6-hexanediamine (TMHDA), and 1,4-diazabicyclo[2.2.2]octane (DABCO), wherein the molar ratio is:

generally,
$A_1/B_1=10/1$ to $1/10$,
preferably,
$A_1/B_1=8/1$ to $1/8$,
more preferably,
$A_1/B_1=6/1$ to $1/6$,
most preferably,
$A_1/B_1=4/1$ to $1/4$.

In the preparation of the above-mentioned complex of at least one Group IA metal-containing organometallic compound with at least one complexing agent, it is preferred to employ the following molar ratio of the Group IA metal contained in the organometallic compound to the complexing agent. The molar ratio is:

generally,
A/B=1000/1 to 1/1000,
preferably,
A/B=100/1 to 1/100,
more preferably,
A/B=60/1 to 1/60,
still more preferably,
A/B=50/1 to 1/50,
further more preferably,
A/B=30/1 to 1/30,
most preferably,
A/B=20/1 to 1/20 wherein A is the molar amount of the Group IA metal contained in the organometallic compound, and B is the molar amount of the first complexing agent.

The catalyst satisfying the above-mentioned molar ratio A/B can be advantageously used not only for producing a polymer or a copolymer in high yield, but also for producing a polymer or copolymer having a desired molecular weight, molecular weight distribution and molecular structure.

When the molar ratio A/B is outside the range as defined above, various disadvantages are likely to be caused in that the production process for the complex becomes costly, and that the complex becomes unstable, so that concurrently with the polymerization reaction, an undesirable side reaction, such as a transfer reaction or an unintended termination of the polymerization reaction, is likely to occur.

In the present invention, for example, a preferred form of the complex has a structure which can be represented, for example, by the following formula (VII):

wherein G represents at least one type of organometallic compound containing a Group IA metal; J represents at least one type of the first complexing agent; and each of g, j and k is an integer of 1 or more.

The complex obtained by any of the above-mentioned methods is thermally stable. Therefore, by the use of such a catalyst, it has become possible to perform a living anionic polymerization of the cyclic conjugated diene monomer even under relatively high temperature conditions, such as room temperature or more, especially 30° C. or more. Furthermore, by the use of such a catalyst, it has become possible to produce a cyclic conjugated diene polymer having a narrow molecular weight distribution even under relatively high temperature conditions, such as room temperature or more.

The above-mentioned polymerization catalyst in the above-mentioned polymerization step (1) of the production method of the present invention can be used not only for polymerization of cyclic conjugated diene monomers, but also for polymerization of other monomers which can be polymerized by anionic polymerization.

Examples of other monomers than the cyclic conjugated diene monomers include chain conjugated diene monomers, such as 1,3-butadiene, isoprene, 2,3-dimethyl-1,3-butadiene, 1,3-pentadiene, 1,3-hexadiene and derivatives thereof; vinyl aromatic monomers, such as styrene, α-methylstyrene, o-methylstyrene, p-methylstyrene, p-tert-butylstyrene, 1,3-dimethylstyrene, divinylbenzene, vinylnaphthalene, vinylanthracene, 1,1-diphenylethylene, m-diisopropenylbenzene, vinylpyridine and derivatives thereof; polar vinyl monomers, such as methyl methacrylate, methyl acrylate, acrylonitrile, methyl vinyl ketone, methyl α-cyanoacrylate and derivatives thereof; polar monomers, such as ethylene oxide, propylene oxide, cyclohexene oxide, a lactone, a lactam, a cyclic siloxane and derivatives thereof; ethylene and derivatives thereof; and α-olefin monomers and derivatives thereof. The above-mentioned monomers may be used individually or, if desired, in combination.

With respect to the configuration of a polymer obtained using the above-mentioned polymerization catalyst in the above-mentioned polymerization step (1) of the production method of the present invention, there is no particular limitation, and the configuration of the polymer may be appropriately selected. Examples of polymer configurations include a homopolymer; a block copolymer, such as a diblock, a triblock, a tetrablock, a multiblock, a radial block, an asymmetry radial block, a graft block, a star block or a comb block copolymer, a graft copolymer, a taper copolymer, a random copolymer or an alternating copolymer.

The polymerization step (1) of the production method of the present invention can be conducted in various manners, and an appropriate manner can be selected. Examples of such manners include a gaseous phase polymerization, a bulk polymerization and a solution polymerization.

The polymerization reactions can be conducted in various manners, such as a batchwise, a semi-batchwise or a continuous manner.

The reactor for conducting the polymerization can also be appropriately selected according to the properties of the polymer to be obtained, the reaction conditions and the like. Examples of reactors include an autoclave, a coil reactor, a tube reactor, a kneader, and an extruder.

In the polymerization method of the present invention, the polymerization of a cyclic conjugated diene polymer in step (1) can be conducted preferably by bulk polymerization or solution polymerization in the presence of the above-mentioned polymerization catalyst, namely, a complex of at least one Group IA metal-containing organometallic compound with at least one complexing agent.

When the polymerization step (1) of the production method of the present invention is conducted by solution polymerization, suitable examples of polymerization solvents to be used include aliphatic hydrocarbons, such as butane, n-pentane, n-hexane, n-heptane, n-octane, iso-octane, n-nonane and n-decane; alicyclic hydrocarbons, such as cyclopentane, methylcyclopentane, cyclohexane, methylcyclohexane, ethylcyclohexane, cycloheptane, cyclooctane, decalin, and norbornane; aromatic hydrocarbons, such as benzene, toluene, xylene, ethylbenzene, and cumene; and ethers, such as diethyl ether, tetrahydrofuran, and tetrahydropyran. An appropriate solvent can be selected according to the properties of the polymer to be obtained, the reaction conditions and the like.

These polymerization solvents may be used individually or, if desired, in combination.

Preferred examples of polymerization solvents include aliphatic hydrocarbons, alicyclic hydrocarbons, and aromatic hydrocarbons.

Most preferred polymerization solvents are aliphatic hydrocarbons, alicyclic hydrocarbons, and a combination of these solvents.

Specific examples of most preferred polymerization solvents to be used in the above-mentioned polymerization step (1) of the production method of the present invention include at least one polymerization solvent selected from n-hexane, cyclohexane and methylcyclohexane.

In the polymerization method of the present invention, the amount of the polymerization catalyst is not specifically limited, and may vary depending on the intended use of the polymer to be produced. However, the polymerization catalyst is generally used in an amount of from $1 \times 10^{-6}$ mol to $5 \times 10^{-1}$ mol, preferably from $5 \times 10^{-6}$ mol to $1 \times 10^{-1}$ mol, in terms of the molar amount of metal atom per mol of the monomer or monomers.

In the polymerization step (1) of the production method of the present invention, the above-mentioned catalysts may be used individually or, if desired, in combination.

In the polymerization step (1) of the production method of the present invention, the polymerization reaction temperature may vary according to the other polymerization reaction conditions. However, the polymerization reaction temperature is generally from $-100°$ to $150°$ C., preferably from $-80°$ to $120°$ C., more preferably from $-30°$ to $110°$ C., and most preferably from $0°$ to $100°$ C.

Further, from a commercial point of view, it is advantageous that the polymerization reaction temperature be from room temperature to $90°$ C., more preferably from $30°$ to $85°$ C., and most preferably from $40°$ to $80°$ C.

In the polymerization method of the present invention, the polymerization reaction time is not specifically limited, and the polymerization reaction time may vary depending on the intended use of the polymer and the other polymerization reaction conditions. However, from a commercial point of view, the polymerization reaction time is generally not longer than 48 hours, more preferably for 0.5 to 24 hours, and most preferably for 1 to 10 hours.

Further, it is preferred that the polymerization reaction be conducted in an atmosphere of an inert gas, such as helium, nitrogen or argon. It is especially preferred to use a highly purified, well dried inert gas containing impurities, such as oxygen and carbon dioxide, in an amount as small as possible.

From a commercial point of view, it is preferred to use highly purified, well dried nitrogen or argon, and it is most preferred to use highly purified and well-dried nitrogen.

With respect to the pressure in the polymerization reaction system, there is no particular limitation, and a widely varied pressure can be chosen as long as the pressure is sufficient to maintain the monomer or monomers and the solvent at a liquid state at a polymerization temperature within the above-mentioned range.

Further, it is preferred that care be taken to prevent the intrusion of impurities, which deactivate the polymerization catalyst or the growing (active) terminals of the polymer being formed, such as water, oxygen and carbon dioxide, into the polymerization reaction system.

In the polymerization method of the present invention for producing a cyclic conjugated diene polymer, it is preferred that a partial or entire amount of each of the components for the catalyst be subjected to a preliminary reaction to each other (and, optionally aging) to synthesize a complex to be used as the polymerization catalyst prior to the initiation of the polymerization reaction.

Particularly, in the polymerization method of the present invention, it is most preferred that the complex be formed prior to the polymerization of the cyclic conjugated diene monomer.

When the complex is formed prior to the polymerization of the cyclic conjugated diene monomer, various advantages are achieved such that occurrence of side reactions is suppressed, that the polymerization activity of the catalyst is improved, and that the polymer obtained has a narrow molecular weight distribution.

In the polymerization method of the present invention for producing the cyclic conjugated diene polymer, the above-mentioned polymerization catalysts may be used individually or, if desired, in combination.

For example, for the purpose of improving a flowability or the like of the polymer, the above-mentioned catalyst may be used in combination with a Group IA metal-containing organometallic compound which is not complexed with a complexing agent. Further, if desired, the polymerization catalyst of the present invention may be supported by an inorganic compound, such as silica or a zeolite.

In the polymerization step (1) of the production method of the present invention for producing the cyclic conjugated diene polymer, when a predetermined (intended) polymerization degree has been reached, conventional additives may be added to the polymerization reaction system. Examples of such conventional additives include a terminal modifier, a terminal-branching agent, a coupling agent, and a polymerization terminator.

With respect to the polymerization terminator, any conventional polymerization terminator can be used as long as it can deactivate the polymerization active species of the polymerization catalyst of the present invention. Preferable examples of polymerization terminators include water, a $C_1$–$C_{10}$ alcohol, a ketone, a polyhydric alcohol (such as ethylene glycol, propylene glycol, or glycerol), a phenol, a carboxylic acid, and a halogenated hydrocarbon.

The polymerization terminator is generally used in an equimolar amount (or in a slightly excess molar amount) relative to the total of the active metals present in the catalyst and the growing polymer terminals. The polymerization terminator may be added before or simultaneously with the addition of a stabilizer and/or an antioxidant. Alternatively, the active terminals of the polymer may be deactivated by contacting the active terminals with a molecular hydrogen.

The novel polymer of the present invention can be obtained by subjecting a cyclic conjugated diene polymer to an addition reaction after a predetermined polymerization degree has been reached in the polymerization reaction for obtaining the cyclic conjugated diene polymer.

In the present invention, an addition reaction is performed at a carbon-to-carbon double bond of a cyclic conjugated diene monomer unit, using conventional techniques. Examples of such addition reactions include an addition of hydrogen (hydrogenation), an addition of a halogen (halogenation), an addition of a hydrogen halogenide (hydrohalogenation), an addition of an alkyl group (alkylation) and an addition of an aryl group (arylation).

Of these, preferred are hydrogenation, halogenation and alkylation. Hydrogenation and halogenation are more preferred.

In the present invention, the most preferable addition reaction is an addition reaction of hydrogen to the carbon-to-carbon double bonds, namely, hydrogenation.

In the present invention, the hydrogenation reaction is generally conducted by a method in which a polymer solution is maintained at a predetermined temperature in an atmosphere of hydrogen gas or an inert gas, and a hydrogenation catalyst is added to the polymer solution while agitating or not agitating. After maintaining the solution at a reaction temperature, hydrogen gas is introduced into the reaction system until a predetermined level of pressure is reached.

A specific example of methods for producing a hydrogenated cyclic conjugated diene polymer is as follows. A polymerization reaction for obtaining a polymer comprising or consisting essentially of cyclic conjugated diene monomer units is conducted, and after a predetermined (intended) polymerization degree has been reached, the polymerization reaction is terminated. Then, a hydrogenation catalyst is added to a reactor containing the obtained cyclic conjugated diene polymer, and hydrogen gas is introduced to the reactor thereby effecting a hydrogenation reaction of the polymer to thereby obtain a hydrogenated cyclic conjugated diene polymer.

More specifically, there can be mentioned a method in which the polymerization reaction is terminated by a conventional method, and then a hydrogenation catalyst is added to and hydrogen gas is introduced to the same reactor as used in the polymerization reaction, thereby producing a hydrogenated polymer in a batchwise manner.

There can also be mentioned a method in which the polymerization reaction is terminated by a conventional method, the reaction mixture is transferred to another reactor, and a hydrogenation catalyst is added to and hydrogen gas is introduced to the reactor containing the reaction mixture, thereby producing a hydrogenated polymer in a semi-batchwise manner.

Further, a hydrogenated polymer may be produced in a continuous manner by performing the polymerization reaction and hydrogenation reaction consecutively in a tubular reactor or a coil reactor.

An appropriate method can be selected from these methods according to the objective and needs.

With respect to the polymer of the present invention which is obtained by subjecting a cyclic conjugated diene polymer to an addition reaction to saturate the double bonds in the polymer, the degree of saturation, which is defined as the ratio (mole %) of saturation of the carbon-to-carbon double bonds contained in the cyclic conjugated diene monomer units in the cyclic conjugated diene polymer, is not particularly limited and may vary depending on the amount of cyclic olefin monomer unit required for the polymer according to the intended use thereof. However, the degree of saturation is generally within the range of from 0.1 to 100 mole %, preferably from 1 to 100 mole %, more preferably from 5 to 100 mole %, especially preferably from 10 to 100 mole %, based on the total number of moles of the carbon-to-carbon double bonds in the original cyclic conjugated diene polymer.

Further, especially when the polymer of the present invention is for use in a field where the polymer is required to have high thermal and mechanical properties, it is recommended that the degree of saturation be within the range of from 50 to 100 mole %, more preferably from 70 to 100 mole %, most preferably 90 mole % or more.

Among the polymers of the present invention, most preferred are those which are obtained by conducting a polymerization reaction for obtaining a cyclic conjugated diene polymer until a predetermined degree of polymerization has been reached, and then subjecting the obtained cyclic conjugated diene polymer to a hydrogenation reaction to saturate the double bonds in the polymer.

Such a polymer of the present invention which has been obtained by subjecting a cyclic conjugated diene polymer to a hydrogenation reaction to saturate the double bonds in the polymer, is most preferable from the viewpoint of improvement in thermal and mechanical properties.

With respect to the polymer of the present invention which is obtained by subjecting a cyclic conjugated diene polymer to a hydrogenation reaction to saturate the double bonds in the polymer, the degree of hydrogenation, which is defined as the ratio (mole %) of hydrogenation of the carbon-to-carbon double bonds contained in the cyclic conjugated diene monomer units in the cyclic conjugated diene polymer, is not particularly limited and may vary depending on the amount of cyclic olefin monomer unit required for the polymer according to the intended use thereof. However, the degree of hydrogenation is generally within the range of from 0.1 to 100 mole %, preferably from 1 to 100 mole %, more preferably from 5 to 100 mole %, still more preferably from 10 to 100 mole %, based on the total number of moles of the carbon-to-carbon double bonds in the original cyclic conjugated polymer.

Further, especially when the novel polymer of the present invention is for use in a field where the polymer is required to have high thermal and mechanical properties, it is recommended that the degree of hydrogenation be within the range of from 50 to 100 mole %, more preferably from 70 to 100 mole %, most preferably from 90 to 100 mole %.

When the novel polymer of the present invention is a partially hydrogenated polymer in which a carbon-to-carbon double bond remains unhydrogenated, the carbon-to-carbon double bond can be a site for a chemical reaction with a crosslinking agent or a compound having a functional group.

The type and amount of the hydrogenation catalyst to be used in the present invention are not particularly limited as long as the catalyst used can provide a desired degree of hydrogenation such that the intended amount of a cyclic olefin monomer unit can be introduced. However, practically, the hydrogenation catalyst to be used in the present invention can be selected from a homogeneous catalyst (e.g., an organometallic compound, an organometallic complex) and a heterogeneous catalyst (e.g., a solid catalyst, a catalyst supported by a carrier) each of which contains at least one member selected from the group consisting of metals belonging to Groups IV A to VIII of the Periodic Table and rare earth metals.

A most preferred hydrogenation catalyst in the present invention is a homogeneous hydrogenation catalyst, i.e., an organometallic compound or complex which contains at least one member selected from the group consisting of Group IV A to VIII metals and rare earth metals, or a carrier-supported catalyst containing a Group VIII metal (a solid catalyst).

These organometallic compounds or complexes as homogeneous hydrogenation catalysts can be supported by an inorganic or organic compound, such as silica, a zeolite or a crosslinked polystyrene.

Examples of metals contained in the hydrogenation catalyst to be used in the present invention include titanium, zirconium, hafnium, chromium, molybdenum, tungsten, manganese, rhenium, iron, cobalt, nickel, ruthenium, rhodium, palladium, osmium, iridium, platinum, lanthanum, cerium, praseodymium, neodymium, promethium, samarium, europium, gadolinium, terbium, dysprosium, holmium, erbium, thulium, ytterbium and lutetium. Among these, titanium, zirconium, hafnium, rhenium, cobalt, nickel, ruthenium, rhodium, palladium, cerium, neodymium, samarium, europium, gadolinium and ytterbium are preferred.

From a commercial point of view, titanium, cobalt, nickel, ruthenium, rhodium and palladium are especially preferred.

In the present invention, titanium, cobalt and ruthenium are commercially most preferred.

In order for organometallic compounds or complexes, which contain the above-mentioned metals, to be soluble in a solvent used, it is requisite that a ligand, such as hydrogen, a halogen, a nitrogen compound or an organic compound, be coordinated with or bonded to such metals. These ligands can be used individually or in combination. When these ligands are used in combination, it is preferred that an appropriate combination of ligands be selected so that the resultant organometallic compound or complex becomes soluble in the solvent used.

Examples of ligands include hydrogen; fluorine; chlorine; bromine; nitrogen monoxide; carbon monoxide; an organic compound containing a functional group, such as a hydroxyl group, an ether group, an amino group, a thiol group, a phosphine group, a carbonyl group, an olefin group or a diene group, or a non-polar organic compound containing no functional group.

Examples of organic ligands include aldehydes, such as salicylaldehyde, 2-hydroxy-1-naphthalaldehyde and 2-hydroxy-3-naphthalaldehyde; hydroxyphenones, such as 2'-hydroxyacetophenone, 2'-hydroxybutyrophenone and 2'-hydroxypropiophenone; diketones, such as acetylacetone, benzoylacetone, propionylacetone, isobutylacetone, valerylacetone and ethylacetylacetone; carboxylic acids, such as isovaleric acid, caprylic acid, octanoic acid, lauric acid, myristic acid, palmitic acid, stearic acid, isostearic acid, oleic acid, linoleic acid, cyclopentanecarboxylic acid, naphthenic acid, ethylhexanoic acid, pivalic acid, Versatic acid (synthetic acid comprising a mixture of isonomers of $C_{10}$ monocarboxylic acids, manufactured and sold by Shell Chemical Co.), phenylacetic acid, benzoic acid, 2-naphthoic acid, maleic acid, succinic acid, hexanethiol acid, 2,2-dimethylbutane thionic acid, decane thionic acid and thiobenzoic acid; organic phosphoric acids, such as dibutyl phosphate, dipentyl phosphate, dihexyl phosphate, diheptyl phosphate, dioctyl phosphate, bis(2-ethylhexyl)phosphate, bis(1-methylheptyl)phosphate, dilauryl phosphate, dioleyl phosphate, diphenyl phosphate, bis(p-nonylphenyl) phosphate, bis[poly(ethylene glycol)-p-nonylphenyl] phosphate, (butyl)(2-ethylhexyl)phosphate, (1-methylheptyl)(2-ethylhexyl)phosphate, (2-ethylhexyl)(p-nonylphenyl)phosphate, monobutyl 2-ethylhexylphosphonate, mono-2-ethylhexyl 2-ethylhexylphosphonate, mono-2-ethylhexyl phenylphosphonate, mono-p-nonylphenyl 2-ethylhexyl phosphonate, mono-2-ethylhexyl phosphonate, mono-1-methylheptyl phosphonate, mono-p-nonylphenyl phosphonate, dibutyl phosphinic acid, bis(2-ethylhexyl) phosphenic acid, bis(1-methylheptyl)phosphinic acid, dilauryl phosphinic acid, dioleyl phosphinic acid, diphenyl phosphinic acid, bis(p-nonylphenyl)phosphinic acid, butyl(2-ethylhexyl)phosphinic acid, (2-ethylhexyl)(1-methylheptyl) phosphinic acid, (2-ethylhexyl)(p-nonylphenyl)phosphinic acid, butyl phosphinic acid, 2-ethylhexyl phosphinic acid, 1-methylheptyl phosphinic acid, oleyl phosphinic acid, lauryl phosphinic acid, phenyl phosphinic acid, and p-nonylphenyl phosphinic acid; alcohols, phenols and thiols, such as ethyl alcohol, n-propyl alcohol, iso-propyl alcohol, tert-butyl alcohol, tert-amyl alcohol, n-hexyl alcohol, cyclohexyl alcohol, allyl alcohol, 2-butenyl alcohol, 3-hexenyl alcohol, 2,5-decadienyl alcohol, benzyl alcohol, phenol, catechol, 1-naphthol, 2-naphthol, 2,6-di-tert-butylphenol, 2,6-di-tert-butyl-4-methylphenol, 2,4,6-tri-tert-butylphenol, 4-phenylphenol, ethanethiol, 1-butanethiol, 2-pentanethiol, 2-iso-butanethiol, thiophenol, 2-naphthalenethiol, cyclohexanethiol, 3-methyl cyclohexanethiol, benzene methanethiol, and 2-naphthalene methanethiol; tetrahydrofuran, diethyl ether, dimethyl sulfoxide, pyridine, ethylene diamine, dimethyl formamide, triphenyl phosphine, a cyclopentadienyl group, a substituted cyclopentadienyl group, an indenyl group, a fluorenyl group, a π-allyl group, a substituted allyl group, a cyclooctadienyl group, a methyl group, an ethyl group, a butyl group, a phenyl group and a tolyl group.

These ligands can be used individually or in combination. When these ligands are used in combination, it is especially preferred that an appropriate combination of ligands be selected so that the resultant organometallic compound or complex becomes soluble in the solvent used.

Various types of hydrogenation catalysts can be used individually or, if desired, in combination.

Further, from a commercial point of view, it is most preferred that, as a hydrogenation catalyst, use be made of a combination of an organometallic compound or complex which contains at least one member selected from the group consisting of Group IV A to VIII metals and rare earth metals, and at least one organometallic compound containing a metal selected from the group consisting of Group IA to IIA metals and Group IIIB metals, such as alkyllithium, alkylmagnesium, and alkylaluminum.

Specific examples of organometallic compound containing a metal selected from the group consisting of Group IA to IIA metals and Group IIIB metals include an alkyllithium, such as methyllithium, ethyllithium, n-propyllithium, isopropyllithium, n-butyllithium, sec-butyllithium, tert-butyllithium, pentyllithium, hexyllithium, phenyllithium, or cyclopentadienyllithium; an alkylmagnesium, such as dimethylmagnesium, diethylmagnesium or dibutylmagnesium; and alkylaluminum, such as trimethylaluminum, triethylaluminum, triisopropylaluminum, tri-n-butylaluminum, triisobutylaluminum, trihexylaluminum, tricyclohexylaluminum, diethylaluminum hydride, diisobutylaluminum hydride, methylaluminoxane or ethylaluminoxane. These organometallic compounds can be used individually or in combination.

With respect to further details of hydrogenation catalysts usable in the present invention, which comprise an organometallic compound or complex, reference can be made to, for example, J. Am. Chem. Soc., 85, 4014 (1963).

When the hydrogenation catalyst is a solid catalyst, the above-mentioned metals can be used as they are. However, generally, it is preferred that the metals to be used as a catalyst are in a state in which they are supported by a carrier such as carbon, alumina, silica or barium sulfate.

Preferred examples of solid catalysts include carrier-supported catalysts containing at least one metal selected from rhenium, iron, cobalt, nickel, ruthenium, rhodium, palladium and platinum. Especially preferred examples of solid catalysts include carrier-supported catalysts containing at least one metal selected from ruthenium, rhodium and palladium.

These catalysts can be used individually or in combination.

The amount of hydrogenation catalyst to be used for a hydrogenation reaction can be appropriately determined depending on the type (e.g., a structure of the main chain and molecular weight) of the polymer to be hydrogenated, or the hydrogenation reaction conditions (e.g., solvent, temperature, concentration, and viscosity of the solution). However, the amount of the hydrogenation catalyst is generally within the range of from 0.1 to 100,000 ppm, preferably from 1 to 50,000 ppm, more preferably from 5 to 10,000 ppm, and most preferably from 10 to 10,000 ppm, in terms of the concentration of metal atoms, based on the amount of the polymer to be hydrogenated.

When the amount of the hydrogenation catalyst is extremely small, a satisfactory rate of hydrogenation reaction cannot be obtained. When the amount of the hydrogenation catalyst is too large, the rate of hydrogenation reaction becomes high, but the use of too large an amount of the hydrogenation catalyst is disadvantageous from an economical point of view. In addition, when the amount of the hydrogenation catalyst is too large, the separation and recovery of the hydrogenation catalyst become difficult, leading to undesirable results, for example, adverse effects of the residual catalyst on the polymer.

In the method of the present invention, it is preferred that a solvent to be used for the hydrogenation reaction be inert to the hydrogenation catalyst and capable of well dissolving therein the polymer to be hydrogenated.

Examples of solvents to be used in the hydrogenation reaction include aliphatic hydrocarbons, such as n-pentane, n-hexane, n-heptane, n-octane, iso-octane, n-nonane and n-decane; alicyclic hydrocarbons, such as cyclopentane, methylcyclopentane, cyclohexane, methylcyclohexane, cycloheptane, cyclooctane, decalin, and norbornane; aromatic hydrocarbons, such as benzene, toluene, xylene, ethylbenzene and cumene; ethers, such as diethyl ether, diglyme, triglyme, tetrahydrofuran and tetrahydropyran; and hydrocarbon halogenides, such as methylene chloride, dichloroethane, chlorobenzene, dichlorobenzene and trichlorobenzene. These solvents may be used individually or in combination. Suitable solvents can be appropriately selected, depending on the properties of the copolymer to be hydrogenated or the hydrogenation reaction conditions.

From a commercial point of view, it is preferred to choose solvents to be used for the hydrogenation reaction from aliphatic hydrocarbons, alicyclic hydrocarbons, and aromatic hydrocarbons. Most preferred solvents are aliphatic hydrocarbons, alicyclic hydrocarbons, and a mixture of these solvents.

In the present invention, from a commercial point of view, it is advantageous that the polymerization reaction and the hydrogenation reaction be consecutively conducted. Therefore, it is preferred that the solvent to be used for the hydrogenation reaction be the same as the solvent used for the polymerization reaction.

In the present invention, there is no particular limitation with respect to the concentration of a polymer solution to be subjected to hydrogenation reaction. However, the polymer concentration of the polymer solution is preferably from 1 to 90 wt %, more preferably from 2 to 60 wt %, most preferably from 3 to 40 wt %.

When the polymer concentration of the polymer solution is lower than the above-mentioned range, the operation for hydrogenation reaction becomes inefficient and disadvantageous from an economic point of view. On the other hand, when the concentration of the polymer solution is higher than the above-mentioned range, the viscosity of the polymer solution becomes high, leading to a lowering of the reaction rate.

In the present invention, the reaction temperature for hydrogenation can be appropriately selected, but is generally from −78° to 500° C., preferably from −10° to 300° C., and more preferably from 20° to 250° C.

When the reaction temperature is lower than the above-mentioned range, a satisfactorily high reaction rate cannot be achieved. On the other hand, when the reaction temperature is higher than the above-mentioned range, disadvantages are likely to be caused such that not only is the hydrogenation catalyst deactivated, but also the polymer is deteriorated.

The pressure of the hydrogenation reaction system is generally from 0.1 to 500 kg/cm$^2$G, preferably from 1 to 400 kg/cm$^2$G, more preferably from 2 to 300 kg/cm$^2$G.

When the pressure of the hydrogenation reaction system is lower than the above-mentioned range, a satisfactorily high reaction rate cannot be achieved. When the pressure is higher than the above-mentioned range, the reaction rate becomes high, but an expensive pressure-resistant reaction apparatus is required, which is economically disadvantageous. Further, such a high pressure may cause hydrocracking of the polymer during the hydrogenation reaction.

The reaction time for hydrogenation is not particularly limited, and may vary depending on the type and amount of the hydrogenation catalyst, the concentration of the polymer solution, and the temperature and pressure of the reaction system. However, the reaction time for hydrogenation is generally from 5 minutes to 240 hours, preferably from 10 minutes to 100 hours, and more preferably from 30 minutes to 48 hours.

If desired, after completion of the hydrogenation reaction, the hydrogenation catalyst can be recovered from the resultant hydrogenation reaction mixture by a conventional method, such as adsorption-separation of the catalyst by means of an adsorbent, sedimentation separation, filtration separation, or removal of the catalyst by washing with water or a lower alcohol in the presence of an organic acid and/or an inorganic acid.

The separation and recovery of the hydrogenated cyclic conjugated diene polymer of the present invention from the hydrogenation reaction mixture can be conducted by a conventional method which is generally used for recovering a conventional polymer from a hydrogenation reaction mixture.

Examples of such conventional methods include a steam-coagulation method comprising directly contacting a hydrogenation reaction mixture with steam; a precipitation method comprising adding a poor solvent for a polymer to a hydrogenation reaction mixture, thereby precipitating the polymer; a method comprising heating a hydrogenation reaction mixture in a hydrogenation reactor, thereby distilling off the solvent; a method comprising contacting a hydrogenation reaction mixture with a heating roll, thereby distilling off the solvent; a method comprising extruding a hydrogenation reaction mixture using an extruder having a vent, while distilling off a solvent through the vent, thereby obtaining a pelletized polymer; and a method comprising placing a hydrogenation reaction mixture into hot water and, then, extruding the resultant mixture using an extruder having a vent, while distilling off a solvent and water through the vent, thereby obtaining a pelletized polymer. A most appropriate method can be selected depending on the properties of the cyclic conjugated diene copolymer to be hydrogenated and the solvent used.

BEST MODE FOR CARRYING OUT THE INVENTION

Hereinbelow, the present invention will be described in more detail with reference to the following Examples, Comparative Examples and Reference Examples, but they should not be construed as limiting the scope of the present invention.

In the Examples, Comparative Examples and Reference Examples, with respect to chemicals, those which have highest purity among the commercially available ones were used. With respect to solvents, commercially available solvents were treated by a conventional method before use. That is, the solvents were degassed, dehydrated under reflux over an activated metal in an atmosphere of an inert gas, and purified by distillation.

With respect to measurement of the number average molecular weight ($\overline{Mn}$) and molecular weight distribution ($\overline{Mw}/\overline{Mn}$ ratio, wherein $\overline{Mw}$ is the weight average molecular weight) of a polymer, the measurement was conducted by gel permeation chromatography (GPC), using a liquid chromatograph (HLC-8080) manufactured and sold by Tosoh Corp. Japan, and a column (Showdex: K805+K804+K802)

manufactured and sold by Showa Denko K.K., Japan. The number average molecular weight and $\overline{Mw}/\overline{Mn}$ ratio were obtained, using a calibration curve obtained with respect to a standard polystyrene.

The polymer chain structure of a polymer was analyzed using an NMR measuring device (JEOL α-400) manufactured and sold by JEOL LTD, Japan. The measurement frequencies were 400 MHz($^1$H) and 100 MHz ($^{13}$C).

The glass transition temperature (Tg) of a polymer was measured by the DSC (differential scanning calorimeter) method, using DSC200 manufactured and sold by Seiko Instruments Inc., Japan.

The conversion (mol %) of monomers in a polymerization reaction was calculated by the internal standard method from an absolute amount of monomers remaining in the polymerization reaction mixture using a gas chromatograph (GC14A) manufactured and sold by Shimadzu Corporation, Japan. Ethylbenzene was used as an internal standard substance.

Mechanical properties and thermal properties of a polymer were measured in accordance with the following methods.

(1) Tensile test (⅛ inch)

The tensile strength (TS), the tensile elongation (TE) and the tensile modulus (TM) of a ⅛-inch thick specimen of a polymer were measured in accordance with ASTM D638.

(2) Flexural test (⅛ inch)

The flexural strength (FS) and the flexural modulus (FM) of a ⅛-inch thick specimen of a polymer were measured in accordance with ASTM D790.

(3) Izod impact test

The Izod impact strength of a polymer was measured in accordance with ASTM D256 (at room temperature).

(4) Heat distortion temperature (HDT: °C.)

The heat distortion temperature of a polymer was measured under a load of 1.82 MPa (high load) and under a load of 0.46 MPa (low load) in accordance with ASTM D648.

In the above measurements, the following is to be noted.

1 MPa=10.20 kg·f/cm$^2$;

and

1 J/m=0.102 kg·cm/cm).

In the following Examples and Comparative Examples, for example, a polycyclohexadiene-polyisoprene diblock copolymer is shown simply as a "CHD-Ip diblock copolymer". Other block copolymers are also likewise shown.

REFERENCE EXAMPLE 1

(Preparation of complex No. 1 as a polymerization catalyst to be used in the present invention)

In an atmosphere of dried argon gas, a predetermined amount of N,N,N',N'-tetramethylethylenediamine (TMEDA) was dissolved in cyclohexane, to thereby obtain a 1.0M solution of TMEDA in cyclohexane.

Subsequently, the obtained cyclohexane solution of TMEDA was cooled to and maintained at −10° C. Then, in the atmosphere of dried argon gas, an n-hexane solution of n-butyllithium (n-BuLi) was gradually added to the cyclohexane solution of TMEDA in an amount such as would provide a Li (in n-BuLi)/TMEDA molar ratio of 4/1.

It was observed that, upon addition of the n-hexane solution of n-BuLi to the cyclohexane solution of TMEDA, a complex of n-BuLi with TMEDA was quickly formed.

The resultant mixture containing the complex of n-BuLi with TMEDA was heated to 70° C., thereby dissolving the complex, and then gradually cooled to −78° C. As a result, the complex was precipitated.

Subsequently, in an atmosphere of dried argon gas, the precipitated complex was separated by filtration. The separated complex was washed with cyclohexane several times, thereby obtaining complex No. 1.

The molar ratio of Li (in n-BuLi)/TMEDA in the complex No. 1 was 4/1 as measured by $^1$H-NMR.

REFERENCE EXAMPLE 2

(Preparation of complex No. 2 as a polymerization catalyst to be used in the present invention)

In an atmosphere of dried argon gas, a predetermined amount of TMEDA was dissolved in cyclohexane, to thereby obtain a 1.0M solution of TMEDA in cyclohexane.

Subsequently, the obtained cyclohexane solution of TMEDA was cooled to and maintained at −10° C. Then, in the atmosphere of dried argon gas, an n-hexane solution of n-BuLi was gradually added to the cyclohexane solution of TMEDA in an amount such as would provide a Li (in n-BuLi)/TMEDA molar ratio of 4/2.

It was observed that, upon addition of the n-hexane solution of n-BuLi to the cyclohexane solution of TMEDA, a complex of n-BuLi with TMEDA was quickly formed.

The resultant mixture containing the complex of n-BuLi with TMEDA was heated to 70° C., thereby dissolving the complex, and then gradually cooled to −78° C. As a result, the complex was precipitated.

Subsequently, in an atmosphere of dried argon gas, the precipitated complex was separated by filtration. The separated complex was washed with cyclohexane several times, thereby obtaining complex No. 2.

The molar ratio of Li (in n-BuLi)/TMEDA in the complex No. 2 was 4/2 as measured by $^1$H-NMR.

REFERENCE EXAMPLE 3

(Preparation of complex No. 3 as a polymerization catalyst to be used in the present invention)

In an atmosphere of dried argon gas, a predetermined amount of TMEDA was dissolved in cyclohexane, to thereby obtain a 1.0M solution of TMEDA in cyclohexane.

Subsequently, the obtained cyclohexane solution of TMEDA was cooled to and maintained at −10° C. Then, in the atmosphere of dried argon gas, an n-hexane solution of n-BuLi was gradually added to the cyclohexane solution of TMEDA in an amount such as would provide a Li (in n-BuLi)/TMEDA molar ratio of 2/2.

It was observed that, upon addition of the n-hexane solution of n-BuLi to the cyclohexane solution of TMEDA, a complex of n-BuLi with TMEDA was quickly formed.

The resultant mixture containing the complex of n-BuLi with TMEDA was heated to 70° C., thereby dissolving the complex, and then gradually cooled to −78° C. As a result, the complex was precipitated.

Subsequently, in an atmosphere of dried argon gas, the precipitated complex was separated by filtration. The separated complex was washed with cyclohexane several times, thereby obtaining complex No. 3.

The molar ratio of Li (in n-BuLi)/TMEDA in the complex No. 3 was 2/2 as measured by $^1$H-NMR.

Example 1

A well dried 100 ml Schlenk tube was purged with dried argon gas by a conventional method. 27.0 g of cyclohexane was charged in the Schlenk tube. While maintaining the temperature of the cyclohexane at room temperature, complex No. 1 [Li (in n-BuLi)/TMEDA molar ratio: 4/1], which was obtained in Reference Example 1, was added to and dissolved in the cyclohexane in an amount of 0.075 mmol in terms of the amount of lithium atom. The resultant mixture was heated to and maintained at 30° C.

Subsequently, 3.0 g of 1,3-cyclohexadiene (1,3-CHD) was added to the above mixture and, in an atmosphere of dried argon gas, a polymerization reaction was conducted at 30° C. for 6 hours.

After that period of time, dehydrated methanol was added to the polymerization reaction system in an equimolar amount to the amount of lithium atoms present in the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of a cyclohexadiene (CHD) homopolymer in a yield of 98.7 wt %.

With respect to the obtained CHD homopolymer, the number average molecular weight was 41,700. The $\overline{Mw}/\overline{Mn}$ ratio (which is used as a criterion for molecular weight distribution) was 1.36.

The glass transition temperature (Tg) of the obtained polymer was 128° C.

The tensile modulus (TM) of the obtained polymer was 4,285 MPa.

The heat distortion temperature (under 1.82 MPa) was 112° C.

A well dried 180 ml high-pressure autoclave having an electromagnetic induction agitator was purged with dried nitrogen gas by a conventional method. 2.5 g of the above-obtained polymer was charged in the autoclave.

In an atmosphere of dried nitrogen gas, 100 ml of cyclohexane was charged in the autoclave. The resultant mixture was agitated at 180° C. for 1 hour, to thereby dissolve the polymer in the cyclohexane.

The autoclave was cooled to room temperature. To the resultant polymer solution was added a catalyst solution, which was prepared by adding Co(acac)$_3$ and TIBAL (triisobutylaluminum) to cyclohexane [Co(acac)$_3$/TIBAL molar ratio: 1/6], as a hydrogenation catalyst, in an amount of 250 ppm, in terms of the amount of cobalt atom, based on the weight of the polymer.

The autoclave was purged with hydrogen gas. The temperature of the autoclave was elevated to 180° C. and then, a hydrogenation reaction was conducted under a hydrogen pressure of 40 kg/cm$^2$·G for 6 hours.

After that period of time, the autoclave was cooled to room temperature, and the pressure in the autoclave was lowered to atmospheric pressure. The autoclave was purged with nitrogen gas, and TIBAL was treated by adding dehydrated methanol to the resultant reaction mixture.

To the reaction mixture was added Irganox B215 (0037HX)(manufactured and sold by CIBA GEIGY, Switzerland) as a stabilizer and then, removal of the solvent was conducted by a conventional method, thereby obtaining a hydrogenated CHD homopolymer.

Results of the measurement by $^1$H-NMR show that the degree of hydrogenation of the cyclohexene rings in the polymeric molecular chain structure of the CHD homopolymer was 100 mol %.

The number average molecular weight of the obtained hydrogenated polymer (polycyclohexane) was 41,300. The $\overline{Mw}/\overline{Mn}$ ratio was 1.38.

The glass transition temperature (Tg) of the obtained hydrogenated polymer was 222° C.

The tensile modulus (TM) of the obtained hydrogenated polymer was 6,450 MPa.

The heat distortion temperature (under 1.82 MPa) was 182° C.

Example 2

A well dried 5-liter high-pressure autoclave having an electromagnetic induction agitator was purged with dried nitrogen gas by a conventional method. 2,800 g of cyclohexane and 400 g of 1,3-CHD were charged in the autoclave. While maintaining the temperature of the resultant solution at room temperature, complex No. 1 [Li (in n-BuLi)/TMEDA molar ratio: 4/1], which was obtained in Reference Example 1, was added to the autoclave in an amount of 8.00 mmol in terms of the amount of lithium atom, and a polymerization reaction was conducted at 35° C. for 8 hours.

After that period of time, dehydrated methanol was added to the polymerization reaction system in an equimolar amount to the amount of lithium atoms present in the polymerization reaction system, to thereby terminate the polymerization reaction.

To the resultant polymerization reaction mixture was added a catalyst solution, which was prepared by adding Co(acac)$_3$ and TIBAL (triisobutylaluminum) to cyclohexane [Co(acac)$_3$/TIBAL molar ratio: 1/6], as a hydrogenation catalyst, in an amount of 250 ppm, in terms of the amount of cobalt atom, based on the weight of the polymer.

The autoclave was purged with hydrogen gas. The temperature of the autoclave was elevated to 180° C. and then, a hydrogenation reaction was conducted under a hydrogen pressure of 40 kg/cm$^2$·G for 6 hours.

After that period of time, the autoclave was cooled to room temperature, and the pressure in the autoclave was lowered to atmospheric pressure. The autoclave was purged with nitrogen gas, and TIBAL was treated, using a conventional technique, by adding dehydrated methanol to the resultant reaction mixture.

To the reaction mixture was added Irganox B215 (0037HX)(manufactured and sold by CIBA GEIGY, Switzerland) as a stabilizer and then, removal of the solvent was conducted by a conventional method, thereby obtaining a hydrogenated CHD polymer.

Results of the measurement by $^1$H-NMR show that the degree of hydrogenation of the cyclohexene rings in the polymeric molecular chain structure of the CHD polymer was 100 mol %. That is, the above CHD homopolymer had a polymeric molecular chain structure which was comprised solely of cyclohexane ring.

The number average molecular weight of the obtained hydrogenated polymer (polycyclohexane) was 51,200. The $\overline{Mw}/\overline{Mn}$ ratio was 1.32.

The glass transition temperature (Tg) of the obtained hydrogenated polymer was 220° C.

The tensile modulus (TM) of the obtained hydrogenated polymer was 6,720 MPa.

The heat distortion temperature (under 1.82 MPa) was 185° C.

Example 3

A well dried 100 ml Schlenk tube was purged with dried argon gas by a conventional method. 20.0 g of cyclohexane and 3.00 g of 1,3-CHD were charged in the Schlenk tube.

While maintaining the temperature of the resultant solution at room temperature, complex No. 1 [Li (in n-BuLi)/TMEDA molar ratio: 4/1], which was obtained in Reference Example 1, was added to the Schlenk tube in an amount of 0.04 mmol in terms of the amount of lithium atom and, in an atmosphere of dried argon gas, a polymerization reaction was conducted at room temperature for 8 hours. The resultant polymer solution was transferred to a 200 ml metallic autoclave.

To the polymer solution was added a catalyst solution, which was prepared by adding $Co(acac)_3$ and TIBAL (triisobutylaluminum) to cyclohexane [$Co(acac)_3$/TIBAL molar ratio: 1/6], as a hydrogenation catalyst, in an amount of 250 ppm, in terms of the amount of cobalt atom, based on the weight of the polymer.

The autoclave was purged with hydrogen gas. The temperature of the autoclave was elevated to 180° C. and then, a hydrogenation reaction was conducted under a hydrogen pressure of 40 kg/cm$^2$·G for 6 hours.

After that period of time, the autoclave was cooled to room temperature, and the pressure in the autoclave was lowered to atmospheric pressure. The autoclave was purged with nitrogen gas, and TIBAL was treated, using a conventional technique, by adding dehydrated methanol to the resultant reaction mixture.

To the reaction mixture was added Irganox B215 (0037HX)(manufactured and sold by CIBA GEIGY, Switzerland) as a stabilizer and then, removal of the solvent was conducted by a conventional method, thereby obtaining a hydrogenated CHD polymer.

Results of the measurement by $^1$H-NMR show that the degree of hydrogenation of the cyclohexene rings in the polymeric molecular chain structure of CHD polymer was 100 mol %.

The number average molecular weight of the obtained hydrogenated polymer (polycyclohexane) was 89,100. The $\overline{Mw}/\overline{Mn}$ ratio was 1.32.

The glass transition temperature (Tg) of the obtained hydrogenated polymer was 225° C.

The tensile modulus (TM) of the obtained hydrogenated polymer was 6,720 MPa.

The heat distortion temperature (under 1.82 MPa) was 187° C.

Example 4

A well dried 100 ml Schlenk tube was purged with dried argon gas by a conventional method. 20.0 g of cyclohexane, 1.5 g of 1,3-CHD and 1.50 g of cyclooctadiene (COD) were charged in the Schlenk tube. While maintaining the temperature of the resultant solution at room temperature, complex No. 2 [Li (in n-BuLi)/TMEDA molar ratio: 4/2], which was obtained in Reference Example 2, was added to the Schlenk tube in an amount of 0.06 mmol in terms of the amount of lithium atom and, in an atmosphere of dried argon gas, a polymerization reaction was conducted at room temperature for 8 hours.

After that period of time, dehydrated methanol was added to the polymerization reaction system in an equimolar amount to the amount of lithium atoms present in the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of a CHD-cyclooctadiene (COD) copolymer in a yield of 87.0 wt %.

With respect to the obtained CHD-COD copolymer, the number average molecular weight was 43,400. The $\overline{Mw}/\overline{Mn}$ ratio was 1.38.

A well dried 180 ml high-pressure autoclave having an electromagnetic induction agitator was purged with dried nitrogen gas by a conventional method. 2.0 g of the above-obtained polymer was charged in the autoclave.

In an atmosphere of dried nitrogen gas, 100 ml of cyclohexane was charged in the autoclave. The resultant mixture was agitated at 180° C. for 1 hour, to thereby dissolve the polymer in the cyclohexane.

The autoclave was cooled to room temperature. To the resultant polymer solution was added a catalyst solution, which was prepared by adding $Co(acac)_3$ and TIBAL (triisobutylaluminum) to cyclohexane [$Co(acac)_3$/TIBAL molar ratio: 1/6], as a hydrogenation catalyst, in an amount of 250 ppm, in terms of the amount of cobalt atom, based on the weight of the polymer.

The autoclave was purged with hydrogen gas. The temperature of the autoclave was elevated to 180° C. and then, a hydrogenation reaction was conducted under a hydrogen pressure of 40 kg/cm$^2$·G for 4 hours.

After that period of time, the autoclave was cooled to room temperature, and the pressure in the autoclave was lowered to atmospheric pressure. The autoclave was purged with nitrogen gas, and TIBAL was treated, using a conventional technique, by adding dehydrated methanol to the resultant reaction mixture.

To the reaction mixture was added Irganox B215 (0037HX)(manufactured and sold by CIBA GEIGY, Switzerland) as a stabilizer and then, removal of the solvent was conducted by a conventional method, thereby obtaining a hydrogenated CHD-COD copolymer.

Results of the measurement by $^1$H-NMR show that with respect to both of the cyclohexene rings and the cyclooctene rings in the polymeric molecular chain structure of the copolymer, the degree of hydrogenation was 100 mol %.

The number average molecular weight of the obtained hydrogenated copolymer was 44,100. The $\overline{Mw}/\overline{Mn}$ ratio was 1.40.

Example 5

A well dried 100 ml Schlenk tube was purged with dried argon gas by a conventional method. 27.0 g of cyclohexane was charged in the Schlenk tube. While maintaining the temperature of the cyclohexane at room temperature, complex No. 1 [Li (in n-BuLi)/TMEDA molar ratio: 4/1], which was obtained in Reference Example 1, was added to and dissolved in the cyclohexane in an amount of 0.075 mmol in terms of the amount of lithium atom. The resultant mixture was heated to and maintained at 30° C.

Subsequently, 3.0 g of 1,3-CHD was added to the above mixture and, in an atmosphere of dried argon gas, a polymerization reaction was conducted at 30° C. for 6 hours.

After that period of time, dehydrated methanol was added to the polymerization reaction system in an equimolar amount to the amount of lithium atoms present in the polymerization reaction system, to thereby terminate the polymerization reaction.

The resultant polymer solution was transferred to a 180 ml metallic autoclave. To the polymer solution was added $RuHCl(CO)(PPh_3)_3$, as a hydrogenation catalyst, in an amount of 1,000 ppm, in terms of the amount of ruthenium atom, based on the weight of the polymer.

The autoclave was purged with hydrogen gas. The temperature of the autoclave was elevated to 160° C. and then, a hydrogenation reaction was conducted under a hydrogen pressure of 15 kg/cm$^2$·G for 4 hours.

After that period of time, the autoclave was cooled to room temperature, and the pressure in the autoclave was lowered to atmospheric pressure. The autoclave was purged with nitrogen gas.

To the resultant reaction mixture was added Irganox B215 (0037HX)(manufactured and sold by CIBA GEIGY, Switzerland) as a stabilizer and then, removal of the solvent was conducted by a conventional method, thereby obtaining a hydrogenated CHD polymer.

Results of the measurement by $^1$H-NMR show that the degree of hydrogenation of the cyclohexene rings in the polymeric molecular chain structure of the CHD homopolymer was 24.8 mol %. The resultant hydrogenated product had a polymeric molecular chain structure comprised of a cyclohexane ring and a cyclohexene ring, wherein the cyclohexane ring/cyclohexene ring molar ratio was 24.8/75.2.

The number average molecular weight of the obtained hydrogenated product was 43,100. The $\overline{Mw}/\overline{Mn}$ ratio was 1.29.

The glass transition temperature (Tg) of the obtained hydrogenated product was 165° C.

The tensile modulus (TM) of the obtained hydrogenated product was 5,740 MPa.

The heat distortion temperature (under 1.82 MPa) was 144° C.

Example 6

Substantially the same procedure as in Example 5 was repeated, except that RhCl(PPh$_3$)$_3$ was used as a hydrogenation catalyst in an amount of 1,000 ppm in terms of the amount of Rh atom, based on the weight of the polymer.

The number average molecular weight of the obtained hydrogenated product of the CHD homopolymer was 43,900. The $\overline{Mw}/\overline{Mn}$ ratio was 1.31.

Results of the measurement by $^1$H-NMR show that the degree of hydrogenation of the cyclohexene rings in the polymeric molecular chain structure of the CHD homopolymer was 58.6 mol %. The resultant hydrogenated product had a polymeric molecular chain structure comprised of a cyclohexane ring and a cyclohexene ring, wherein the cyclohexane ring/cyclohexene ring molar ratio was 58.6/41.4.

The glass transition temperature (Tg) of the hydrogenated product was 178° C.

The tensile modulus (TM) of the obtained hydrogenated product was 6,080 MPa.

The heat distortion temperature (under 1.82 MPa) was 156° C.

Example 7

Substantially the same procedure as in Example 5 was repeated, except that a 10 g of a solid catalyst, which comprised 5 wt % of palladium (Pd) supported by barium sulfate (BaSO$_4$) was used as the hydrogenation catalyst and that the hydrogen pressure was changed to 60 kg/cm$^2$G.

The number average molecular weight of the obtained hydrogenated product of the CHD homopolymer was 42,900. The $\overline{Mw}/\overline{Mn}$ ratio was 1.34.

Results of the measurement by $^1$H-NMR show that the degree of hydrogenation of the cyclohexene rings in the polymeric molecular chain structure of the CHD homopolymer was 100 mol %. That is, the above hydrogenated product had a polymeric molecular chain structure which was comprised solely of cyclohexane ring.

The glass transition temperature (Tg) of the hydrogenated product was 219° C.

Example 8

Substantially the same procedure as in Example 7 was repeated, except that a 10 g of a solid catalyst, which comprised 5 wt % of Pd supported by alumina (Al$_2$O$_3$) was used as the hydrogenation catalyst.

The number average molecular weight of the obtained hydrogenated product of the CHD homopolymer was 43,000. The $\overline{Mw}/\overline{Mn}$ ratio) was 1.37.

Results of the measurement by $^1$H-NMR show that the degree of hydrogenation of the cyclohexene rings in the polymeric molecular chain structure of the CHD homopolymer was 100 mol %. That is, the above hydrogenated product had a polymeric molecular chain structure which was comprised solely of cyclohexane ring.

The glass transition temperature (Tg) of the hydrogenated product was 219° C.

Example 9

A well dried 100 ml pressure-resistant glass bottle, provided with a sealing cap, was purged with dried argon gas by a conventional method. 4.0 g of 1,3-CHD and 4.0 g of toluene were charged in the glass bottle. Then, complex No. 3 [Li(in n-BuLi)/TMEDA molar ratio: 2/2], which was obtained in Reference Example 3, was added to the resultant toluene solution of 1,3-cyclohexadiene in an amount of 0.08 mmol in terms of the amount of lithium atom, and a polymerization reaction was conducted at room temperature for 5 hours.

After that period of time, a 10 wt % solution of BHT [2,6-bis(tert-butyl)-4-methylphenol] in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of a CHD homopolymer in a yield of 96.5 wt %.

The number average molecular weight of the obtained CHD homopolymer was 49,300. The $\overline{Mw}/\overline{Mn}$ ratio was 1.51.

A well dried 180 ml high-pressure autoclave having an electromagnetic induction agitator was purged with dried nitrogen gas by a conventional method. 1.0 g of the above-obtained polymer was charged in the autoclave.

In an atmosphere of dried nitrogen gas, 100 ml of cyclohexane was charged in the autoclave. The resultant mixture was heated to and maintained at 180° C., and was agitated for 1 hour, to thereby dissolve the polymer in the cyclohexane.

The autoclave was cooled to room temperature. To the resultant polymer solution was added a catalyst solution, which was prepared by adding Co(acac)$_3$ and DIBAL-H (diisobutylaluminum hydride) to cyclohexane [Co(acac)$_3$/DIBAL-H molar ratio: 1/6], as a hydrogenation catalyst, in an amount of 1,000 ppm, in terms of the amount of cobalt atom, based on the weight of the polymer.

The autoclave was purged with hydrogen gas. The temperature of the autoclave was elevated to 175° C. and then, a hydrogenation reaction was conducted under a hydrogen pressure of 15 kg/cm²·G for 4 hours.

After that period of time, the autoclave was cooled to room temperature, and the pressure in the autoclave was lowered to atmospheric pressure. The autoclave was purged with nitrogen gas, and DIBAL-H was treated, using a conventional technique, by adding dehydrated methanol to the resultant reaction mixture.

To the reaction mixture was added a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of a hydrogenated CHD polymer.

Results of the measurement by ¹H-NMR show that the degree of hydrogenation of the cyclohexene rings in the polymeric molecular chain structure of the CHD homopolymer was 98.0 mol %.

The number average molecular weight of the obtained hydrogenated product was 53,400. The $\overline{Mw}/\overline{Mn}$ ratio was 1.46.

The glass transition temperature (Tg) of the obtained hydrogenated product was 220° C.

Example 10

Substantially the same procedure as in Example 9 was repeated, except that the hydrogen pressure was changed to 40 kg/cm²G.

The number average molecular weight of the obtained hydrogenated product of the CHD homopolymer was 52,100. The $\overline{Mw}/\overline{Mn}$ ratio was 1.43.

Results of the measurement by ¹H-NMR show that the degree of hydrogenation of the cyclohexene rings in the polymeric molecular chain structure of the CHD homopolymer was 100 mol %. That is, the above hydrogenated product had a polymeric molecular chain structure which was comprised solely of cyclohexane ring.

The glass transition temperature (Tg) of the hydrogenated product was 221° C.

Example 11

Substantially the same procedure as in Example 9 was repeated, except that the hydrogen pressure was changed to 85 kg/cm²G.

The number average molecular weight of the obtained hydrogenated product of the CHD homopolymer was 53,900. The $\overline{Mw}/\overline{Mn}$ ratio was 1.43.

Results of the measurement by ¹H-NMR show that the degree of hydrogenation of the cyclohexene rings in the polymeric molecular chain structure of the CHD homopolymer was 100 mol %. That is, the above hydrogenated product had a polymeric molecular chain structure which was comprised solely of cyclohexane ring.

The glass transition temperature (Tg) of the hydrogenated product was 221° C.

Example 12

Substantially the same procedure as in Example 9 was repeated, except that a catalyst solution, which was prepared by adding titanocene dichloride (TC) and diisobutylaluminum hydride (DIBAL-H) to cyclohexane (TC/DIBAL-H molar ratio: 1/6), was used as the hydrogenation catalyst.

The number average molecular weight of the obtained hydrogenated product of the homopolymer was 50,300. The $\overline{Mw}/\overline{Mn}$ ratio was 1.45.

Results of the measurement by ¹H-NMR show that the degree of hydrogenation of the cyclohexene rings in the polymeric molecular chain structure of the CHD homopolymer was 100 mol %. That is, the above hydrogenated product had a polymeric molecular chain structure which was comprised solely of cyclohexane ring.

The glass transition temperature (Tg) of the hydrogenated product was 221° C.

Example 13

Substantially the same procedure as in Example 9 was repeated, except that RuHCl(CO)(PPh₃)₃ was used as the hydrogenation catalyst.

The number average molecular weight of the obtained hydrogenated product of the CHD homopolymer was 51,800. The $\overline{Mw}/\overline{Mn}$ ratio was 1.45.

Results of the measurement by ¹H-NMR show that the degree of hydrogenation of the cyclohexene rings in the polymeric molecular chain structure of the CHD homopolymer was 92.8 mol %.

The glass transition temperature (Tg) of the hydrogenated product was 216° C.

Example 14

A well dried 300 ml pressure-resistant glass bottle, provided with a sealing cap, was purged with dried argon gas by a conventional method. 30.0 g of cyclohexane and 30.0 g of 1,3-CHD were charged in the glass bottle. While maintaining the temperature of the cyclohexane at room temperature, complex No. 2 [Li (in n-BuLi)/TMEDA molar ratio: 4/2], which was obtained in Reference Example 2, was added to the glass bottle in an amount of 0.24 mmol in terms of the amount of lithium atom and, in an atmosphere of dried argon gas, a polymerization reaction was conducted at room temperature for 6 hours.

After that period of time, a 10 wt % solution of BHT in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of a CHD homopolymer in a yield of 98.5 wt %.

With respect to the obtained CHD homopolymer, the number average molecular weight was 121,800. The $\overline{Mw}/\overline{Mn}$ ratio was 1.31.

A well dried 4-liter high-pressure autoclave having an electromagnetic induction agitator was purged with dried nitrogen gas by a conventional method. 20.0 g of the above-obtained polymer was charged in the autoclave.

In an atmosphere of dried nitrogen gas, 2,000 g of cyclohexane was charged in the autoclave. The resultant mixture was agitated at 180° C. for 1 hour, to thereby dissolve the polymer in the cyclohexane.

The autoclave was cooled to room temperature. To the resultant polymer solution was added a catalyst solution, which was prepared by adding Co(acac)₃ and TIBAL (triisobutylaluminum) to cyclohexane [Co(acac)₃/TIBAL molar ratio: 1/6], as a hydrogenation catalyst, in an amount of 500 ppm, in terms of the amount of cobalt atom, based on the weight of the polymer.

The autoclave was purged with hydrogen gas. The temperature of the autoclave was elevated to 180° C. and then, a hydrogenation reaction was conducted under a hydrogen pressure of 30 kg/cm²·G for 6 hours.

After completion of the hydrogenation reaction, the autoclave was cooled to room temperature, and the pressure in the autoclave was lowered to atmospheric pressure. The autoclave was purged with nitrogen gas, and TIBAL was treated, using a conventional technique, by adding dehydrated methanol to the resultant reaction mixture.

The reaction mixture was added to a large amount of a 10 wt % solution of BHT in methanol, thereby separating a hydrogenated product of the CHD homopolymer formed therein.

The separated hydrogenated product was washed with methanol and then, dried at 80° C. in vacuo, thereby obtaining a hydrogenated product of the CHD homopolymer.

Results of the measurement by $^1$H-NMR show that the degree of hydrogenation of the cyclohexene rings in the polymeric molecular chain structure of the CHD homopolymer was 100 mol %.

The number average molecular weight of the obtained hydrogenated product was 128,500. The $\overline{Mw/Mn}$ ratio was 1.36.

The glass transition temperature (Tg) of the obtained hydrogenated product was 222° C.

The tensile modulus (TM) of the obtained hydrogenated product was 6,620 MPa.

The heat distortion temperature (under 1.82 MPa) was 188° C.

The hydrogenated product was molded at 320° C. to thereby obtain a molded article. The obtained molded article was colorless and transparent.

Comparative Example 1

Substantially the same procedure as in Example 1 was repeated, except that complex No. 1 was used as a polymerization catalyst in an amount of 0.75 mmol in terms of the amount of lithium atom, based on the weight of the polymer.

The number average molecular weight of the obtained hydrogenated product of a CHD homopolymer was 4,700. The $\overline{Mw/Mn}$ ratio was 1.23.

Results of the measurement by $^1$H-NMR show that the degree of hydrogenation of the cyclohexene rings in the polymeric molecular chain structure of the CHD homopolymer was 100 mol %.

The hydrogenated product having a small molecular weight was very brittle, so that it was impossible to produce a molded article from the hydrogenated product.

Example 15

A well dried 100 ml Schlenk tube was purged with dried argon gas by a conventional method. 27.0 g of cyclohexane was charged in the Schlenk tube. While maintaining the temperature of the cyclohexane at room temperature, 0.0375 mmol of TMEDA and 0.075 mmol of n-BuLi were added to the cyclohexane. The resultant mixture was heated to and maintained at 60° C., and was agitated for 10 minutes. Then, the resultant mixture was cooled to and maintained at room temperature.

3.0 g of 1,3-CHD was added to the above mixture and, in an atmosphere of dried argon gas, a polymerization reaction was conducted at room temperature for 7 hours.

After that period of time, dehydrated methanol was added to the polymerization reaction system in an equimolar amount to the amount of lithium atoms present in the polymerization reaction system, to thereby terminate the polymerization reaction.

The resultant polymerization reaction mixture was transferred to a 180 ml metallic autoclave. 10 g of a solid catalyst, which comprised 5 wt % of palladium (Pd) supported by barium sulfate (BaSO$_4$) was added to the polymerization reaction mixture. The temperature of the autoclave was elevated to 160° C. and then, a hydrogenation reaction was conducted under a hydrogen pressure of 60 kg/cm$^2$·G for 2 hours.

Results of the measurement by $^1$H-NMR show that the degree of hydrogenation of the cyclohexene rings in the polymeric molecular chain structure of the CHD homopolymer was 100 mol %.

With respect to the obtained hydrogenated product of the CHD homopolymer, the number average molecular weight was 41,900. The $\overline{Mw/Mn}$ ratio was 1.32.

Example 16

Substantially the same procedure as in Example 15 was repeated, except that n-BuLi was changed to t-BuLi and TMEDA was changed to 1,4-diazabicyclo|2,2,2|octane (DABCO).

The number average molecular weight of the obtained hydrogenated product of the CHD homopolymer was 41,100. The $\overline{Mw/Mn}$ ratio was 1.41.

Results of the measurement by $^1$H-NMR show that the degree of hydrogenation of the cyclohexene rings in the polymeric molecular chain structure of the CHD homopolymer was 100 mol %.

Example 17

Substantially the same procedure as in Example 16 was repeated, except that t-BuLi was changed to s-BuLi.

The number average molecular weight of the obtained hydrogenated product of the CHD homopolymer was 43,300. The $\overline{Mw/Mn}$ ratio was 1.44.

Results of the measurement by $^1$H-NMR show that the degree of hydrogenation of the cyclohexene rings in the polymeric molecular chain structure of the CHD homopolymer was 100 mol %.

Example 18

A well dried 5-liter high-pressure autoclave having an electromagnetic induction agitator was purged with dried nitrogen gas by a conventional method.

In an atmosphere of dried nitrogen gas, 900 g of cyclohexane was charged in the autoclave. The temperature of the cyclohexane was maintained at room temperature.

Then, n-BuLi was added to the autoclave in an amount of 7.50 mmol in terms of the amount of lithium atom. To the resultant cyclohexane solution of n-BuLi was added 3.75 mmol of TMEDA. The resultant mixture was agitated at room temperature for 10 minutes, and a reaction was conducted to thereby form a complex of n-BuLi with TMEDA.

The temperature of the autoclave was elevated to 40° C. and then, 600 g of 1,3-CHD was charged in the autoclave, and a polymerization reaction was conducted at 40° C. for 8 hours. After that period of time, the conversion of 1,3-CHD was 92.3 mol %.

The resultant polymerization reaction mixture was diluted with 2,000 g of cyclohexane, and heated to 80° C. The diluted polymerization reaction mixture was transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

1,000 g of the resultant polymer solution and 1,000 g of cyclohexane were charged in a 4-liter high-pressure autoclave having an electromagnetic induction agitator, which had been well dried by a conventional method.

In an atmosphere of dried nitrogen gas, the temperature of the autoclave was maintained at 70° C.

To the resultant polymer solution was added 20 g of a solid catalyst, which comprised 5 wt % of palladium (Pd) supported by barium sulfate ($BaSO_4$).

The autoclave was purged with hydrogen gas. The temperature of the autoclave was elevated to 160° C. and then, a hydrogenation reaction was conducted under a hydrogen pressure of 55 kg/$cm^2$·G for 6 hours.

After completion of the hydrogenation reaction, removal of the solvent was conducted by a conventional method, thereby obtaining a hydrogenated CHD polymer.

Results of the measurement by $^1$H-NMR show that the degree of hydrogenation of the cyclohexene rings in the polymeric molecular chain structure of the CHD homopolymer was 100 mol %.

The number average molecular weight was 84,700. The $\overline{Mw}/\overline{Mn}$ ratio was 1.45. The glass transition temperature (Tg) of the hydrogenated product was 224° C.

The flexural strength (FS) was 45.78 MPa and the flexural modulus (FM) was 6,780 MPa.

The heat distortion temperature (under 1.82 MPa) was 191° C.

REFERENCE EXAMPLE 4

A well dried 100 ml Schlenk tube was purged with dried argon gas by a conventional method. 20.0 g of cyclohexane and 3.0 g of 1,3-CHD were charged in the Schlenk tube. While maintaining the temperature of the resultant solution at room temperature, complex No. 2 [Li (in n-BuLi)/ TMEDA molar ratio: 4/2], which was obtained in Reference Example 2, was added to the Schlenk tube in an amount of 0.07 mmol in terms of the amount of lithium atom and, in an atmosphere of dried argon gas, a polymerization reaction was conducted at room temperature for 6 hours.

After that period of time, a 10 wt % of BHT in methanol was added to the polymerization reaction system in an equimolar amount to the amount of lithium atoms present in the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of a CHD homopolymer in a yield of 100 wt %.

With respect to the obtained CHD homopolymer, the number average molecular weight was 44,500. The $\overline{Mw}/\overline{Mn}$ ratio was 1.33.

Example 19

2.55 ml of 85% aqueous solution of phosphoric acid and 1.18 g of diphosphorus pentaoxide were charged in a 300 ml three neck flask having an agitator, condenser and thermometer. The resultant mixture was agitated at room temperature for 10 minutes. Subsequently, 6.25 g of potassium iodide (KI) was charged in the flask.

To the resultant mixture was added 100 ml of a 1 wt % solution of the polymer obtained in Reference Example 4 in cyclohexane. The resultant mixture was heated under reflux for 3 hours.

The resultant polymer solution was cooled to room temperature and then, 30 ml of water and 50 ml of cyclohexane were added to the solution. The resultant mixture was further agitated to thereby form a cyclohexane phase.

Subsequently, the cyclohexane phase was separated from the mixture and washed with an aqueous solution of sodium thiosulfate and a saturated aqueous solution of sodium chloride.

The resultant mixture was put in a large amount of acetone to thereby separate a polymer formed therein. The separated polymer was dried at 80° C. in vacuo to thereby obtain a halogenated polymer.

Results of the measurement by $^1$H-NMR show that the degree of halogenation of the cyclohexene rings in the polymeric molecular chain structure of the polymer obtained in Reference Example 4 (the amount of cyclohexene rings having addition-bonded thereto an iodine atom in the halogenated polymer, based on the total amount of cyclohexene rings in the halogenated polymer) was 89 wt %.

Example 20

A well dried 200 ml three neck flask having a reflux condenser was purged with dried argon gas by a conventional method. 100 ml of a 1 wt % solution of the polymer, which was obtained in Reference Example 4, in cyclohexane was charged in the flask. The temperature of the resultant mixture was maintained at room temperature.

In an atmosphere of dried argon gas, 11.60 ml of a 1.6M solution of t-BuLi in n-pentane was gradually added to the resultant mixture, and was heated under reflux for 24 hours.

In an atmosphere of dried argon gas, the resultant polymer solution was cooled to 0° C. and then, 1.0 ml of water was gradually added to the solution.

The resultant mixture was put in a large amount of acetone to thereby separate a polymer formed therein. The separated polymer was dried at 80° C. in vacuo to thereby obtain an alkylated polymer.

Results of the measurement by $^1$H-NMR show that the degree of alkylation of the cyclohexene rings in the polymeric molecular chain structure of the polymer obtained in Reference Example 4 (the amount of cyclohexene rings having addition-bonded thereto a t-butyl group added thereto in the alkylated polymer, based on the total amount of cyclohexene rings in the alkylated polymer) was 43 wt %.

REFERENCE EXAMPLE 5

A well dried 100 ml pressure-resistant glass bottle, provided with a sealing cap, was purged with dried argon gas by a conventional method. 2.31 g of isoprene (Ip) and 5.00 g of toluene were charged in the glass bottle. Then, complex No. 2, which was obtained in Reference Example 2, was added to the resultant toluene solution of Ip in an amount of 0.080 mmol in terms of the amount of lithium atom, and a polymerization reaction was conducted at room temperature for 4 hours.

Subsequently, 2.72 g of 1,3-CHD was added to the polymerization reaction system, and the polymerization reaction was further conducted at room temperature for 4 hours.

After that period of time, a 10 wt % solution of BHT in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white elastic form of an Ip-CHD diblock copolymer in a yield of 97.6 wt %. The number average molecular weight of the obtained polymer was 59,900 as measured by GPC. The obtained chromatogram exhibited a single peak. The $\overline{Mw}/\overline{Mn}$ ratio was 1.22.

The polymer chain structure of the copolymer was determined by $^1$H-NMR. It was confirmed that the polymer chain of the copolymer had substantially the same ratio of monomer units as the ratio of monomers charged in the glass bottle.

Example 21

A well dried 180 ml high-pressure autoclave having an electromagnetic induction agitator was purged with dried nitrogen gas by a conventional method. 1.0 g of the polymer obtained in Reference Example 5 was charged in the autoclave.

In an atmosphere of dried nitrogen gas, 100 ml of cyclohexane was charged in the autoclave. The resultant mixture was heated to and maintained at 180° C., and was agitated for 1 hour, to thereby dissolve the polymer in the cyclohexane.

The autoclave was cooled to room temperature. To the resultant polymer solution was added a catalyst solution, which was prepared by adding Co(acac)$_3$ and DIBAL-H (diisobutylaluminum hydride) to cyclohexane [Co(acac)$_3$/DIBAL-H molar ratio: 1/6], as a hydrogenation catalyst, in an amount of 1,000 ppm, in terms of the amount of cobalt atom, based on the weight of the polymer.

The autoclave was purged with hydrogen gas. The temperature of the autoclave was elevated to 175° C. and then, a hydrogenation reaction was conducted under a hydrogen pressure of 35 kg/cm$^2$·G for 4 hours.

After that period of time, the autoclave was cooled to room temperature, and the pressure in the autoclave was lowered to atmospheric pressure. The autoclave was purged with nitrogen gas, and DIBAL-H was treated, using a conventional technique, by adding dehydrated methanol to the resultant reaction mixture.

To the reaction mixture was added a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of a hydrogenated CHD polymer.

Results of the measurement by $^1$H-NMR show that the degrees of hydrogenation of the CHD polymer block and the Ip polymer block were 94.1 mol % and 97.4 mol %, respectively.

The number average molecular weight of the obtained hydrogenated product was 58,400. The $\overline{Mw}/\overline{Mn}$ ratio was 1.26.

Example 22

Substantially the same procedure as in Example 21 was repeated, except that a 10 g of a solid catalyst, which comprised 5 wt % of palladium (Pd) supported by barium sulfate (BaSO$_4$) was used as the hydrogenation catalyst, the hydrogenation temperature was changed to 160° C. and the hydrogen pressure was changed to 60 kg/cm$^2$G.

The number average molecular weight of the obtained hydrogenated CHD-Ip diblock copolymer was 60,900. The $\overline{Mw}/\overline{Mn}$ ratio was 1.21.

Results of the measurement by $^1$H-NMR show that with respect to both of the CHD polymer block and the Ip polymer block, the degree of hydrogenation was 100 mol %.

REFERENCE EXAMPLE 6

A well dried 5-liter high-pressure autoclave having an electromagnetic induction agitator was purged with dried nitrogen gas by a conventional method.

In an atmosphere of dried nitrogen gas, 2,400 g of cyclohexane was charged in the autoclave. The temperature of the cyclohexane was maintained at room temperature.

Then, n-BuLi was added to the autoclave in an amount of 15.0 mmol in terms of the amount of lithium atom. To the resultant cyclohexane solution of n-BuLi was added 7.5 mmol of TMEDA, and the resultant mixture was agitated at room temperature for 10 minutes. Then, the temperature of the autoclave was elevated to 40° C.

300 g of 1,3-CHD was mixed with 300 g of Ip. The resultant mixture was charged in the autoclave, and a polymerization reaction was conducted at 40° C. for 6 hours.

In the polymerization reaction system in which both 1,3-CHD and Ip were present, a polymerization reaction of Ip proceeded in preference to a polymerization reaction of 1,3-CHD. Upon consumption of nearly all of the Ip monomers present, a polymerization reaction of 1,3-CHD started. As a result, an Ip-CHD diblock copolymer containing portions in which Ip and 1,3-CHD are copolymerized in a tapered configuration was obtained.

The conversion of 1,3-CHD was 98.5 mol % as measured by gas chromatography.

The number average molecular weight of the obtained diblock copolymer was 40,100 as measured by GPC. The $\overline{Mw}/\overline{Mn}$ ratio was 1.50.

The tensile strength (TS) of the obtained diblock copolymer was 11.4 MPa. The tensile elongation (TE) was 31%. The flexural strength (FS) was 17.5 MPa and the flexural modulus (FM) was 795 MPa.

The Izod impact strength was N.B. (no break).

REFERENCE EXAMPLE 7

A polymerization reaction was conducted in substantially the same manner as in Reference Example 6, except that a monomer mixture of 480 g of 1,3-CHD and 120 g of Ip was used. The conversion of 1,3-CHD, as measured 6 hours after the initiation of the polymerization reaction, was 98.7 mol % as measured by gas chromatography.

Because the polymerization reaction system contained 1,3-CHD in a large amount, as compared to Ip, a polymerization reaction of 1,3-CHD also started at an early stage of the polymerization reaction of Ip, although the polymerization reaction of Ip proceeded in preference to the polymerization reaction of 1,3-CHD. As a result, a copolymer containing portions in which Ip and 1,3-CHD are randomly copolymerized was obtained.

The number average molecular weight of the obtained copolymer was 42,000 as measured by GPC. The $\overline{Mw}/\overline{Mn}$ ratio was 1.45.

The tensile strength (TS) of the obtained copolymer was 40.8 MPa. The tensile elongation (TE) was 5%. The flexural strength (FS) was 86.4 MPa and the flexural modulus (FM) was 3,035 MPa.

The Izod impact strength was 79.8 J/m.

Example 23

A well dried 5-liter high-pressure autoclave having an electromagnetic induction agitator was purged with dried nitrogen gas by a conventional method.

In an atmosphere of dried nitrogen gas, 1,500 g of cyclohexane was charged in the autoclave. The temperature of the cyclohexane was maintained at 70° C.

1,500 g of a 10 wt % cyclohexane solution of the diblock copolymer obtained in Reference Example 6 was added to the autoclave. To the polymer solution was added a catalyst solution, which was prepared by adding titanocene dichloride (TC) and diisobutylaluminum hydride (DIBAL-H) to cyclohexane (TC/DIBAL-H molar ratio: 1/6), as a hydrogenation catalyst, in an amount of 290 ppm, in terms of the amount of titanium atom, based on the weight of the polymer.

The autoclave was purged with hydrogen gas. The temperature of the autoclave was elevated to 160° C. and then, a hydrogenation reaction was conducted under a hydrogen pressure of 35 kg/cm$^2$·G for 6 hours.

After completion of the hydrogenation reaction, removal of the solvent was conducted by a conventional method, thereby obtaining a hydrogenated Ip-CHD diblock copolymer.

Results of the measurement by $^1$H-NMR show that the respective degrees of hydrogenation of the Ip polymer block and the CHD polymer block were 100 mol % and 96 mol %.

The number average molecular weight of the obtained hydrogenated product of the diblock copolymer was 41,400. The $\overline{Mw}/\overline{Mn}$ ratio was 1.48.

The tensile strength (TS) of the obtained copolymer was 14.1 MPa. The tensile elongation (TE) was 35%. The flexural strength (FS) was 18.7 MPa and the flexural modulus (FM) was 865 MPa.

The Izod impact strength was N.B. (no break).

Example 24

Substantially the same procedure as in Example 23 was repeated, except that the polymer obtained in Reference Example 7 was used.

After completion of the hydrogenation reaction, removal of the solvent was conducted by a conventional method, thereby obtaining a hydrogenated Ip-CHD diblock copolymer.

The number average molecular weight of the obtained hydrogenated copolymer was 41,400. The $\overline{Mw}/\overline{Mn}$ ratio was 1.43.

Results of the measurement by $^1$H-NMR show that the degrees of hydrogenation of the Ip polymer block and the CHD polymer block were 100 mol % and 92 mol %, respectively.

The tensile strength (TS) of the obtained hydrogenated copolymer was 43.7 MPa. The tensile elongation (TE) was 3%. The flexural strength (FS) was 88.7 MPa and the flexural modulus (FM) was 4,980 MPa.

The Izod impact strength was 65.5 J/m.

Example 25

A well dried 4-liter high-pressure autoclave having an electromagnetic induction agitator was purged with dried nitrogen gas by a conventional method.

In an atmosphere of dried nitrogen gas, 1,000 g of cyclohexane was charged in the autoclave. The temperature of the cyclohexane was maintained at 70° C.

1,000 g of a 10 wt % cyclohexane solution of the diblock copolymer obtained in Reference Example 6 was added to the autoclave. To the polymer solution was added a 10 g of a solid catalyst, which comprised 5 wt % of Pd supported by BaSO$_4$ as a hydrogenation catalyst.

The autoclave was purged with hydrogen gas. The temperature of the autoclave was elevated to 160° C. and then, a hydrogenation reaction was conducted under a hydrogen pressure of 55 kg/cm$^2$·G for 6 hours.

After completion of the hydrogenation reaction, removal of the solvent was conducted by a conventional method, thereby obtaining a hydrogenated Ip-CHD diblock copolymer.

Results of the measurement by $^1$H-NMR show that with respect to both of the Ip polymer block and the CHD polymer block, the degree of hydrogenation was 100 mol %.

The number average molecular weight of the obtained hydrogenated diblock copolymer was 41,900. The $\overline{Mw}/\overline{Mn}$ ratio was 1.45.

The tensile strength (TS) of the obtained copolymer was 14.0 MPa. The tensile elongation (TE) was 36%. The flexural strength (FS) was 18.4 MPa and the flexural modulus (FM) was 882 MPa.

The Izod impact strength was N.B. (no break).

REFERENCE EXAMPLE 8

A well dried 5-liter high-pressure autoclave having an electromagnetic induction agitator was purged with dried nitrogen gas by a conventional method.

In an atmosphere of dried nitrogen gas, 2,400 g of cyclohexane was charged in the autoclave. The temperature of the cyclohexane was maintained at room temperature.

Then, n-BuLi was added to the autoclave in an amount of 15.0 mmol in terms of the amount of lithium atom. To the resultant cyclohexane solution of n-BuLi was added 7.5 mmol of TMEDA, to thereby form a complex of n-BuLi with TMEDA. Then, the temperature of the autoclave was elevated to 40° C.

300 g of 1,3-CHD was mixed with 300 g of St. The resultant mixture was charged in the autoclave, and a polymerization reaction was conducted at 40° C. for 7 hours.

In the polymerization reaction system in which both 1,3-CHD and St were present, a polymerization reaction of St proceeded in preference to a polymerization reaction of 1,3-CHD. Upon consumption of nearly all of the St monomers present, a polymerization reaction of 1,3-CHD started. As a result, an St-CHD diblock copolymer was obtained.

The conversion of 1,3-CHD was 97.4 mol % as measured by gas chromatography.

7 Hours after the initiation of the polymerization reaction, the temperature of the autoclave was elevated to 70° C. The resultant polymerization reaction mixture was transferred by pressure to another 5-liter high-pressure autoclave having an electromagnetic induction agitator, which had been well dried by a conventional method.

Dehydrated n-heptanol was added to the polymerization reaction system in an equimolar amount to the amount of lithium atoms present in the polymerization reaction system, to thereby terminate the polymerization reaction.

The number average molecular weight of the obtained diblock copolymer was 41,080 as measured by GPC. The $\overline{Mw}/\overline{Mn}$ ratio was 1.39.

The flexural strength (FS) was 17.9 MPa and the flexural modulus (FM) was 5,330 MPa.

The heat distortion temperature (under 1.82 MPa) was 72° C.

Example 26

A hydrogenation reaction was conducted in substantially the same manner as in Example 25, except that the polymer obtained in Reference Example 7 was used.

After completion of the hydrogenation reaction, removal of the solvent was conducted by a conventional method, thereby obtaining a hydrogenated Ip-CHD diblock copolymer.

With respect to both of the CHD polymer block and Ip polymer block, the degree of hydrogenation was 100 mol % as determined by $^1$H-NMR.

The number average molecular weight was 43,500. The $\overline{Mw}/\overline{Mn}$ ratio was 1.47.

The tensile strength (TS) was 43.3 MPa and the tensile elongation (TE) was 3%.

The flexural strength (FS) was 87.5 MPa and the flexural modulus (FM) was 5,050 MPa.

The Izod impact strength was 60.5 J/m.

Example 27

A well dried 5-liter high-pressure autoclave having an electromagnetic induction agitator was purged with dried nitrogen gas by a conventional method.

In an atmosphere of dried nitrogen gas, 1,500 g of cyclohexane was charged in the autoclave. The temperature of the cyclohexane was maintained at 70° C.

1,500 g of a 10 wt % cyclohexane solution of the diblock copolymer obtained in Reference Example 8 was added to the autoclave. To the polymer solution was added a catalyst solution, which was prepared by adding titanocene dichloride (TC) and diisobutylaluminum hydride (DIBAL-H) to cyclohexane (TC/DIBAL-H molar ratio: 1/6), as a hydrogenation catalyst, in an amount of 290 ppm, in terms of the amount of titanium atom, based on the weight of the polymer.

The autoclave was purged with hydrogen gas. The temperature of the autoclave was elevated to 160° C. and then, a hydrogenation reaction was conducted under a hydrogen pressure of 35 kg/cm$^2$·G for 10 hours.

After completion of the hydrogenation reaction, removal of the solvent was conducted by a conventional method, thereby obtaining a hydrogenated St-CHD diblock copolymer.

Results of the measurement by $^1$H-NMR show that the degree of hydrogenation of the CHD polymer block was 100 mol %. The St polymer block was not hydrogenated.

The number average molecular weight of the obtained hydrogenated diblock copolymer was 41,400. The $\overline{Mw}/\overline{Mn}$ ratio was 1.39.

The glass transition temperature (Tg) of the CHD polymer block was 220° C. as measured by DSC method. The flexural strength (FS) was 21.3 MPa and the flexural modulus (FM) was 5,510 MPa.

The heat distortion temperature (under 1.82 MPa) was 80° C.

Example 28

A well dried 4-liter high-pressure autoclave having an electromagnetic induction agitator was purged with dried nitrogen gas by a conventional method.

In an atmosphere of dried nitrogen gas, 1,000 g of cyclohexane was charged in the autoclave. The temperature of the cyclohexane was maintained at 70° C.

1,000 g of a 10 wt % cyclohexane solution of the diblock copolymer obtained in Reference Example 8 was added to the autoclave. To the polymer solution was added a 50 g of a solid catalyst, which comprised 5 wt % of Pd supported by BaSO$_4$ as a hydrogenation catalyst.

The autoclave was purged with hydrogen gas. The temperature of the autoclave was elevated to 160° C. and then, a hydrogenation reaction was conducted under a hydrogen pressure of 55 kg/cm$^2$·G for 6 hours.

After completion of the hydrogenation reaction, removal of the solvent was conducted by a conventional method, thereby obtaining a hydrogenated St-CHD diblock copolymer.

Results of the measurement by $^1$H-NMR show that with respect to both of the St polymer block and the CHD polymer block, the degree of hydrogenation was 100 mol %.

The number average molecular weight of the obtained hydrogenated diblock copolymer was 41,800. The $\overline{Mw}/\overline{Mn}$ ratio was 1.33.

The glass transition temperatures (Tg) of the hydrogenated CHD polymer block and the hydrogenated St polymer block were 220° C. and 146° C., respectively.

The flexural strength (FS) was 26.6 MPa and the flexural modulus (FM) was 5,900 MPa.

The heat distortion temperature (under 1.82 MPa) was 128° C.

Example 29

A well dried 5-liter high-pressure autoclave having an electromagnetic induction agitator was purged with dried nitrogen gas by a conventional method.

In an atmosphere of dried nitrogen gas, 2,560 g of cyclohexane was charged in the autoclave. The temperature of the cyclohexane was maintained at room temperature.

Then, n-BuLi was added to the autoclave in an amount of 7.5 mmol in terms of the amount of lithium atom. Subsequently, 3.75 mmol of TMEDA was added to the autoclave. The resultant mixture was agitated at room temperature for 10 minutes. Then, the temperature of the autoclave was elevated to 40° C.

240 g of 1,3-CHD was charged in the autoclave, and a polymerization reaction was conducted at 40° C. for 7 hours, to thereby form a CHD homopolymer.

Subsequently, 200 g of a 30 wt % solution of Bd in cyclohexane (Bd: 60 g) was charged in the autoclave, and a polymerization reaction was further conducted at 30° C. for 2 hours, to thereby obtain a CHD-Bd diblock copolymer.

To the resultant polymer solution was added dehydrated n-heptanol in an equimolar amount to the amount of lithium atoms present in the polymer solution, to thereby terminate the polymer solution.

To the polymer solution was added a catalyst solution, which was prepared by adding titanocene dichloride (TC) and diisobutylaluminum hydride (DIBAL-H) to cyclohexane (TC/DIBAL-H molar ratio: 1/6), as a hydrogenation catalyst, in an amount of 270 ppm, in terms of the amount of titanium atom, based on the weight of the polymer.

The autoclave was purged with hydrogen gas. The temperature of the autoclave was elevated to 160° C. and then, a hydrogenation reaction was conducted under a hydrogen pressure of 35 kg/cm$^2$·G for 10 hours.

After completion of the hydrogenation reaction, removal of the solvent was conducted by a conventional method, thereby obtaining a hydrogenated CHD-Bd diblock copolymer.

Results of the measurement by $^1$H-NMR show that the respective degrees of hydrogenation of the Bd polymer block and the CHD polymer block were 100 mol % and 94 mol %.

The number average molecular weight of the obtained hydrogenated product of the diblock copolymer was 41,700. The $\overline{\text{Mw}}/\overline{\text{Mn}}$ ratio was 1.36.

The glass transition temperature (Tg) of the CHD polymer block was 220° C as measured by DSC method. The flexural strength (FS) was 48.3 MPa and the flexural modulus (FM) was 4,850 MPa.

The Izod impact strength was 67.5 J/m.

Example 30

A well dried 5-liter high-pressure autoclave having an electromagnetic induction agitator was purged with dried nitrogen gas by a conventional method.

In an atmosphere of dried nitrogen gas, 2,000 g of cyclohexane was charged in the autoclave. The temperature of the cyclohexane was maintained at room temperature.

Then, n-BuLi was added to the autoclave in an amount of 15.36 mmol in terms of the amount of lithium atom. To the resultant cyclohexane solution of n-BuLi was added 7.68 mmol of TMEDA, and the resultant mixture was stirred at room temperature for 10 minutes.

The temperature of the autoclave was elevated to 40° C. Then, 154 g of 1,3-CHD was charged in the autoclave, and a polymerization reaction was conducted at 40° C. for 2 hours, to thereby form a CHD homopolymer.

Subsequently, 1,087 g of a 30 wt % solution of Bd in cyclohexane (Bd: 326 g) was added to the resultant polymerization reaction mixture containing the CHD homopolymer, and a polymerization reaction was further conducted at 30° C. for 2 hours, to thereby form a CHD-Bd diblock copolymer.

To the resultant polymerization reaction mixture containing the CHD-Bd diblock copolymer was added 7.68 mmol of dimethyldichlorosilane (Me$_2$SiCl$_2$), and a coupling reaction was conducted at 60° C. for 30 minutes, to thereby form a CHD-Bd-CHD triblock copolymer.

After that period of time, dehydrated n-heptanol was added to the polymerization reaction mixture in an equimolar amount to the amount of lithium atoms present in the polymerization reaction mixture, to thereby terminate the polymerization reaction.

To the polymer solution was added a catalyst solution, which was prepared by adding titanocene dichloride (TC) and diisobutylaluminum hydride (DIBAL-H) to cyclohexane (TC/DIBAL-H molar ratio: 1/6), as a hydrogenation catalyst, in an amount of 270 ppm, in terms of the amount of titanium atom, based on the weight of the polymer.

The autoclave was purged with hydrogen gas. The temperature of the autoclave was elevated to 160° C. and then, a hydrogenation reaction was conducted under a hydrogen pressure of 35 kg/cm$^2$·G for 10 hours. After completion of the hydrogenation reaction, removal of the solvent was conducted by a conventional method, thereby obtaining an elastic form of a hydrogenated CHD-Bd-CHD triblock copolymer.

Results of the measurement by $^1$H-NMR show that the degrees of hydrogenation of the CHD polymer block and the Bd polymer block were 92 mol % and 100 mol %, respectively.

The number average molecular weight of the obtained triblock copolymer was 73,200. The $\overline{\text{Mw}}/\overline{\text{Mn}}$ ratio was 1.36.

The tensile strength (TS) of the obtained triblock copolymer was 24.7 MPa. The tensile elongation (TE) was 780%.

The Izod impact strength was N.B. (no break).

Example 31

A well dried 5-liter high-pressure autoclave having an electromagnetic induction agitator was purged with dried nitrogen gas by a conventional method.

In an atmosphere of dried nitrogen gas, 2,000 g of cyclohexane and 154 g of 1,3-CHD were charged in the autoclave. The temperature of the resultant mixture was maintained at 40° C.

Then, complex No. 2 obtained in Reference Example 2 was added to the autoclave in an amount of 15.36 mmol in terms of the amount of lithium atom, and a polymerization reaction was conducted at 40° C. for 5 hours, to thereby form a CHD homopolymer.

Subsequently, 1,087 g of a 30 wt % solution of Bd in cyclohexane (Bd: 326 g) was added to the resultant polymerization reaction mixture containing the CHD homopolymer, and a polymerization reaction was further conducted at 40° C. for 2 hours, to thereby form a CHD-Bd diblock copolymer.

To the resultant polymerization reaction mixture containing the CHD-Bd diblock copolymer was added 7.68 mmol of dimethyldichlorosilane (Me$_2$SiCl$_2$), and a coupling reaction was conducted at 65° C. for 1 hour, to thereby form a CHD-Bd-CHD triblock copolymer.

The resultant polymerization reaction solution was charged in a 200 ml high-pressure autoclave. To the polymer solution was added a catalyst solution, which was prepared by adding Co(acac)$_3$ and triisobutylaluminum (TIBAL) to cyclohexane [Co(acac)$_3$/TIBAL molar ratio: 1/6], as a hydrogenation catalyst, in an amount of 1000 ppm, in terms of the amount of cobalt atom, based on the weight of the polymer.

The autoclave was purged with hydrogen gas. The temperature of the autoclave was elevated to 90° C. and then, a hydrogenation reaction was conducted under a hydrogen pressure of 8 kg/cm$^2$·G for 4 hour.

After completion of the hydrogenation reaction, the autoclave was cooled to room temperature, and the pressure in the autoclave was lowered to atmospheric pressure. The autoclave was purged with nitrogen gas, and TIBAL was treated, using a conventional technique, by adding dehydrated methanol to the resultant reaction mixture.

To the reaction mixture was added Irganox B215 (0037HX)(manufactured and sold by CIBA GEIGY, Switzerland) as a stabilizer and then, removal of the solvent was conducted by a conventional method, thereby obtaining a hydrogenated CHD-Bd-CHD triblock copolymer.

Results of the measurement by $^1$H-NMR show that the degree of hydrogenation of the cyclohexene rings in the polymeric molecular chain structure of the triblock copolymer was 40.1 mol %. With respect to the 1,2-vinyl bond of the Bd polymer block, the degree of hydrogenation was 94.5 mol %. With respect to the 1,4-cis bond and 1,4-trans bond of the Bd polymer block, the degree of hydrogenation was 68.6 mol %.

The number average molecular weight of the obtained hydrogenated triblock copolymer was 75,100. The $\overline{\text{Mw}}/\overline{\text{Mn}}$ ratio was 1.40.

The tensile strength (TS) of the obtained hydrogenated triblock copolymer was 21.2 MPa. The tensile elongation (TE) was 700%.

Example 32

A polymerization reaction and a hydrogenation reaction were conducted in substantially the same manner as in Example 31, except that titanocene dichloride (TC) and triisobutylaluminum hydride (TIBAL-H) (TC/TIBAL-H molar ratio: 1/6) was used as a hydrogenation catalyst in an amount of 1,000 ppm, in terms of the amount of titanium atom, based on the weight of the polymer, instead of Co(acac)$_3$ and triisobutylaluminum.

Results of the measurement by $^1$H-NMR show that the degree of hydrogenation of the cyclohexene rings in the polymeric molecular chain structure of the obtained triblock copolymer was 10.3 mol %. With respect to the 1,2-vinyl bond of the Bd polymer block, the degree of hydrogenation was 78.5 mol %. With respect to the 1,4-cis bond and 1,4-trans bond of the Bd polymer block, the degree of hydrogenation was 27.9 mol %.

Example 33

A well dried 5-liter high-pressure autoclave having an electromagnetic induction agitator was purged with dried nitrogen gas by a conventional method.

In an atmosphere of dried nitrogen gas, 2,000 g of cyclohexane and 120 g of 1,3-CHD were charged in the autoclave. The temperature of the resultant mixture was maintained at 40° C.

Then, the complex No. 2 obtained in Reference Example 2 was added to the autoclave in an amount of 13.56 mmol in terms of the amount of lithium atom, and a polymerization reaction was conducted at 40° C. for 1 hour, to thereby form a CHD homopolymer.

Subsequently, 933 g of a 30 wt % solution of Bd in cyclohexane (Bd: 280 g) was added to the resultant polymerization reaction mixture containing the CHD homopolymer, and a polymerization reaction was further conducted at 40° C. for 1 hour, to thereby form a CHD-Bd diblock copolymer.

To the resultant polymerization reaction mixture containing the CHD-Bd diblock copolymer was added 3.39 mmol of silicon tetrachloride (SiCl$_4$), and a coupling reaction was conducted at 60° C. for 30 minutes, to thereby form a CHD-Bd-CHD triblock copolymer.

The resultant polymerization reaction solution was charged in a 200 ml high-pressure autoclave. To the polymer solution was added a catalyst solution, which was prepared by adding Co(acac)$_3$ and triisobutylaluminum (TIBAL) to cyclohexane [Co(acac)$_3$/TIBAL molar ratio: 1/6], as a hydrogenation catalyst, in an amount of 1,000 ppm, in terms of the amount of cobalt atom, based on the weight of the polymer.

The autoclave was purged with hydrogen gas. The temperature of the autoclave was elevated to 80° C. and then, a hydrogenation reaction was conducted under a hydrogen pressure of 10 kg/cm$^2$·G for 4 hours.

After completion of the hydrogenation reaction, the autoclave was cooled to room temperature, and the pressure in the autoclave was lowered to atmospheric pressure. The autoclave was purged with nitrogen gas, and TIBAL was treated, using a conventional technique, by adding dehydrated methanol to the resultant reaction mixture.

To the reaction mixture was added Irganox B215 (0037HX) (manufactured and sold by CIBA GEIGY, Switzerland) as a stabilizer and then, removal of the solvent was conducted by a conventional method, thereby obtaining a hydrogenated CHD-Bd-CHD triblock copolymer.

Results of the measurement by $^1$H-NMR show that the degree of hydrogenation of the cyclohexene rings in the polymeric molecular chain structure of the triblock copolymer was 73.4 mol %. With respect to the 1,2-vinyl bond of the Bd polymer block, the degree of hydrogenation was 90.7 mol %. With respect to the 1,4-cis bond and 1,4-trans bond of the Bd polymer block, the degree of hydrogenation was 71.5 mol %.

The number average molecular weight of the obtained hydrogenated triblock copolymer was 110,600. The $\overline{Mw}/\overline{Mn}$ ratio was 1.41.

The tensile strength (TS) of the obtained hydrogenated triblock copolymer was 17.5 MPa. The tensile elongation (TE) was 720%.

Example 34

A polymerization reaction and a hydrogenation reaction were conducted in substantially the same manner as in Example 33, except that RuHCl(CO)(PPh$_3$)$_3$ was used as a hydrogenation catalyst in an amount of 1,000 ppm, in terms of the amount of ruthenium atom, based on the weight of the polymer, instead of Co(acac)$_3$ and triisobutylaluminum.

Results of the measurement by $^1$H-NMR show that the degree of hydrogenation of the cyclohexene rings in the polymeric molecular chain structure of the triblock copolymer was 23.4 mol %. With respect to the 1,2-vinyl bond of the Bd polymer block, the degree of hydrogenation was 45.6 mol %. With respect to the 1,4-cis bond and 1,4-trans bond of the Bd polymer block, the degree of hydrogenation was 20.3 mol %.

Example 35

A polymerization reaction and a hydrogenation reaction were conducted in substantially the same manner as in Example 33, except that PhCl(PPh$_3$)$_3$ was used as a hydrogenation catalyst in an amount of 1,000 ppm, in terms of the amount of rhodium atom, based on the weight of the polymer, instead of Co(acac)$_3$ and triisobutylaluminum.

Results of the measurement by $^1$H-NMR show that the degree of hydrogenation of the cyclohexene rings in the polymeric molecular chain structure of the triblock copolymer was 57.9 mol %. With respect to the 1,2-vinyl bond of the Bd polymer block, the degree of hydrogenation was 23.6 mol %. With respect to the 1,4-cis bond and 1,4-trans bond of the Bd polymer block, the degree of hydrogenation was 18.2 mol %.

Example 36

A well dried 5-liter high-pressure autoclave having an electromagnetic induction agitator was purged with dried nitrogen gas by a conventional method.

In an atmosphere of dried nitrogen gas, 2,000 g of cyclohexane and 1,333 g of a 30 wt % solution of Bd in cyclohexane (Bd: 400 g) were charged in the autoclave. The temperature of the resultant mixture was maintained at 40° C.

Then, complex No. 2, which was obtained in Reference Example 2, was added to the autoclave in an amount of 20.0 mmol in terms of the amount of lithium atom, and a polymerization reaction was conducted at 60° C. for 1 hour.

400 g of 1,3-CHD was charged in the autoclave, and a polymerization reaction was further conducted at 40° C. for 6 hours.

After that period of time, dehydrated n-heptanol was added to the polymerization reaction mixture in an equimolar amount to the amount of lithium atoms present in the polymerization reaction mixture, to thereby terminate the polymerization reaction.

100 ml of the resultant polymer solution was transferred to 200 ml high-pressure autoclave. To the polymer solution was added 10 g of a solid catalyst which comprised 5 wt % of Pd supported by $BaSO_4$, as a hydrogenation catalyst.

The autoclave was purged with hydrogen gas. The temperature of the autoclave was elevated to 160° C. and then, a hydrogenation reaction was conducted under a hydrogen pressure of 55 kg/cm$^2$·G for 6 hours.

After that period of time, removal of the solvent was conducted by a conventional method, thereby obtaining a hydrogenated Bd-CHD di-block copolymer.

Results of the measurement by $^1$H-NMR show that the degree of hydrogenation of each of the CHD polymer block and the Bd polymer block was 100 mol %.

Example 37

A well dried 100 ml Schlenk tube was purged with dried argon gas by a conventional method. 1.50 g of 1,3-CHD, 18.0 g of cyclohexane and 2.0 g of n-hexane were charged in the Schlenk tube.

While maintaining the temperature of the resultant mixture at room temperature, complex No. 2, which was obtained in Reference Example 2, was added to the mixture in an amount of 0.07 mmol in terms of the amount of lithium atom, and, in an atmosphere of dried argon gas, a polymerization reaction was conducted at room temperature for 3 hours, to thereby form a CHD homopolymer.

After that period of time, the resultant polymerization reaction mixture containing the CHD homopolymer was cooled to –10° C.

Subsequently, 1.50 g of methyl methacrylate (MMA) was charged in the Schlenk tube, and a polymerization reaction was further conducted at –10° C. for 3 hours, to thereby form a CHD-MMA diblock copolymer.

After that period of time, a 10 wt % solution of BHT in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of the CHD-MMA diblock copolymer in a yield of 81 wt %.

The number average molecular weight of the obtained diblock copolymer was 34,500. The $\overline{Mw/Mn}$ ratio was 1.89.

100 ml of cyclohexane and 1.0 g of the obtained diblock copolymer were charged in a 200 ml high-pressure autoclave. Then, 2.0 g of a solid catalyst which comprised 5 wt % of Pd supported by $BaSO_4$ was added to the autoclave, as a hydrogenation catalyst.

The autoclave was purged with hydrogen gas. The temperature of the autoclave was elevated to 160° C. and then, a hydrogenation reaction was conducted under a hydrogen pressure of 55 kg/cm$^2$·G for 6 hours.

After that period of time, removal of the solvent was conducted by a conventional method, thereby obtaining a hydrogenated CHD-MMA diblock copolymer.

Results of the measurement by $^1$H-NMR show that the degree of hydrogenation of the CHD polymer block was 100 mol %.

Example 38

A well dried 5-liter high-pressure autoclave having an electromagnetic induction agitator was purged with dried nitrogen gas by a conventional method.

In an atmosphere of dried nitrogen gas, 2,400 g of cyclohexane was charged in the autoclave. The temperature of the cyclohexane was maintained at room temperature.

Then, n-BuLi was added to the autoclave in an amount of 15.0 mmol in terms of the amount of lithium atom. To the resultant cyclohexane solution of n-BuLi was added 7.50 mmol of TMEDA, and the resultant mixture was agitated at room temperature for 10 minutes.

Further, the temperature of the autoclave was elevated to 40° C. and then, the autoclave was purged with ethylene (Et) gas. A polymerization reaction was conducted under an ethylene pressure of 40 kg/cm$^2$·G at 40° C. for 1 hour.

Then, the ethylene gas was evacuated and replaced by dried nitrogen gas. 400 g of 1,3-CHD was charged in the autoclave, and a polymerization reaction was conducted at 40° C. for 8 hours, to thereby form an Et-CHD diblock copolymer. After that period of time, dehydrated n-heptanol was added to the polymerization reaction mixture in an equimolar amount to the amount of lithium atoms present in the polymerization reaction mixture, to thereby terminate the polymerization reaction. The conversion of 1,3-CHD was 97.6 mol % as measured by gas chromatography.

The Et content of the obtained diblock copolymer, as measured by $^1$H-NMR, was 10 wt %. The number average molecular weight of the obtained diblock copolymer was 30,500. The $\overline{Mw/Mn}$ ratio was 1.78.

100 ml of cyclohexane and 1.0 g of the obtained diblock copolymer were charged in a 200 ml high-pressure autoclave. Then, 2.0 g of a solid catalyst, which comprised 5 wt % of Pd supported on $BaSO_4$, was added to the autoclave, as a hydrogenation catalyst.

The autoclave was purged with hydrogen gas. The temperature of the autoclave was elevated to 160° C. and then, a hydrogenation reaction was conducted under a hydrogen pressure of 55 kg/cm$^2$·G for 6 hours.

After that period of time, removal of the solvent was conducted by a conventional method, thereby obtaining a hydrogenated CHD-Et diblock copolymer.

Results of the measurement by $^1$H-NMR show that the degree of hydrogenation of the CHD polymer block was 100 mol %.

Example 39

A well dried 5-liter high-pressure autoclave having an electromagnetic induction agitator was purged with dried nitrogen gas by a conventional method.

In an atmosphere of dried nitrogen gas, 2,400 g of cyclohexane was charged in the autoclave. The temperature of the cyclohexane was maintained at room temperature.

Then, n-BuLi was added to the autoclave in an amount of 15.0 mmol in terms of the amount of lithium atom. To the resultant cyclohexane solution of n-BuLi was added 7.5 mmol of TMEDA, and the resultant mixture was agitated at room temperature for 10 minutes.

Further, the temperature of the autoclave was elevated to 40° C. and then, the above-obtained mixture was agitated for 10 minutes.

The autoclave was purged with ethylene (Et) gas. A polymerization reaction was conducted under an ethylene pressure of 40 kg/cm$^2$·G at 40° C. for 1 hour.

Then, the ethylene gas was evacuated and replaced by dried nitrogen gas. 200 g of 1,3-CHD, 200 g of Ip and 200 g of St were mixed together. The resultant mixture was charged in the autoclave, and a polymerization reaction was conducted at 35° C. for 10 hours. After that period of time, the conversion of 1,3-CHD was 96.8 mol % as measured by gas chromatography.

In the polymerization reaction system in which 1,3-CHD, Ip and St were present, a polymerization reaction of St proceeded in preference to a polymerization reaction of 1,3-CHD and a polymerization reaction of Ip. Upon consumption of nearly all of the St monomers present, a polymerization reaction of Ip started, because a polymerization reaction of Ip proceeded in preference to a polymerization reaction of 1,3-CHD. Upon consumption of nearly all of the Ip monomers present, a polymerization reaction of 1,3-CHD started. As a result, an Et-St-Ip-CHD tetrablock copolymer was obtained.

Further, 100 g of MMA was charged in the autoclave, and a polymerization reaction was further conducted for 3 hours. As a result, an Et-St-Ip-CHD-MMA pentablock copolymer was obtained.

The resultant polymerization reaction mixture was heated to 70° C., and transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained pentablock copolymer was 44,900. The $\overline{Mw}/\overline{Mn}$ ratio was 1.64. The composition (in terms of wt %) of the pentablock copolymer was 3.5(Et)/29.6(St)/28.4(Ip)/27.8(CHD)/10.7 (MMA), as measured by $^1$H-NMR.

100 ml of cyclohexane and 1.0 g of the obtained pentablock copolymer were charged in a 200 ml high-pressure autoclave. Then, 2.0 g of a solid catalyst which comprises 5 wt % of Pd supported on BaSO$_4$ was added to the autoclave, as a hydrogenation catalyst.

The autoclave was purged with hydrogen gas. The temperature of the autoclave was elevated to 160° C. and then, a hydrogenation reaction was conducted under a hydrogen pressure of 55 kg/cm$^2$·G for 6 hours.

After that period of time, removal of the solvent was conducted by a conventional method, thereby obtaining a hydrogenated Et-St-Ip-CHD-MMA pentablock copolymer.

Results of the measurement by $^1$H-NMR show that the degree of hydrogenation of each of St polymer block and the Ip polymer block and the CHD polymer block was 100 mol %.

REFERENCE EXAMPLE 9

A well dried 5-liter high-pressure autoclave having an electromagnetic induction agitator was purged with dried nitrogen gas by a conventional method.

In an atmosphere of dried nitrogen gas, 2,400 g of cyclohexane was charged in the autoclave. The temperature of the cyclohexane was maintained at room temperature.

Then, n-BuLi was added to the autoclave in an amount of 15.0 mmol in terms of the amount of lithium atom. To the resultant cyclohexane solution of n-BuLi was added 7.50 mmol of TMEDA, and the temperature of the autoclave was elevated to 40° C.

300 g of 1,3-CHD was charged in the autoclave, and a polymerization reaction was conducted at 40° C. for 20 minutes. After that period of time, the conversion of 1,3-CHD was 47.8 mol % as measured by gas chromatography.

Subsequently, 300 g of Ip was charged in the autoclave, and a polymerization reaction was conducted at 40° C. for 5 hours.

In the polymerization reaction system in which both 1,3-CHD and Ip were present, a polymerization reaction of Ip proceeded in preference to a polymerization reaction of 1,3-CHD. Upon consumption of nearly all of the Ip monomers present, a polymerization reaction of 1,3-CHD started. As a result, a CHD-Ip-CHD triblock copolymer was obtained.

The resultant polymerization reaction mixture was transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained triblock copolymer was 41,900. The $\overline{Mw}/\overline{Mn}$ ratio was 1.43.

The tensile strength (TS) of the obtained diblock copolymer was 25.8 MPa. The tensile elongation (TE) was 159%. The flexural strength (FS) was 22.0 MPa and the flexural modulus (FM) was 2,900 MPa.

The Iaod impact strength was N.B. (no break).

REFERENCE EXAMPLE 10

A well dried 5-liter high-pressure autoclave having an electromagnetic induction agitator was purged with dried nitrogen gas by a conventional method.

In an atmosphere of dried nitrogen gas, 1,800 g of cyclohexane was charged in the autoclave. The temperature of the cyclohexane was maintained at room temperature.

Then, n-BuLi was added to the autoclave in an amount of 10.0 mmol in terms of the amount of lithium atom. To the resultant cyclohexane solution of n-BuLi was added 5.0 mmol of TMEDA, and the temperature of the autoclave was elevated to 40° C. 200 g of 1,3-CHD was charged in the autoclave, and a polymerization reaction was conducted at 40° C. for 20 minutes. After that period of time, the conversion of 1,3-CHD was 48.7 mol % as measured by gas chromatography.

Then, 400 g of Ip was added to the autoclave, and a polymerization reaction was further conducted at 40° C. for 6 hours.

In the polymerization reaction system in which both 1,3-CHD and Ip were present, a polymerization reaction of Ip proceeded in preference to a polymerization reaction of 1,3-CHD. Upon consumption of nearly all of the Ip monomers present, a polymerization reaction of 1,3-CHD started. As a result, a CHD-Ip-CHD triblock copolymer was obtained.

The resultant polymerization reaction mixture was diluted with 1,000 g of cyclohexane and heated to 70° C. Then, the mixture was transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

73

The number average molecular weight of the obtained triblock copolymer was 61,800. The $\overline{Mw}/\overline{Mn}$ ratio was 1.48. The glass transition temperature (Tg) of the obtained polymer was 137° C. The tensile strength (TS) was 19.0 MPa. The tensile elongation (TE) was 700%.

Example 40

A well dried 5-liter high-pressure autoclave having an electromagnetic induction agitator was purged with dried nitrogen gas by a conventional method.

In an atmosphere of dried nitrogen gas, 1,500 g of cyclohexane was charged in the autoclave. The temperature of the cyclohexane was maintained at 70° C.

1,500 g of a 10 wt % cyclohexane solution of the triblock copolymer obtained in Reference Example 9 was added to the autoclave. To the polymer solution was added a catalyst solution, which was prepared by adding titanocene dichloride (TC) and diisobutyl aluminum hydride (DIBAL-H) to cyclohexane (TC/DIBAL-H molar ratio: 1/4), as a hydrogenation catalyst, in an amount of 290 ppm, in terms of the amount of titanium atom, based on the weight of the polymer.

The autoclave was purged with hydrogen gas. The temperature of the autoclave was elevated to 160° C. and then, a hydrogenation reaction was conducted under a hydrogen pressure of 35 kg/cm²·G for 6 hours.

After that period of time, removal of the solvent was conducted by a conventional method, thereby obtaining a hydrogenated CHD-Ip-CHD triblock copolymer.

Results of the measurement by ¹H-NMR show that the degree of hydrogenation of the Ip polymer block was 100 mol %, and the degree of hydrogenation of the CHD polymer block was 96 mol %.

The number average molecular weight of the obtained hydrogenated triblock copolymer was 42,700. The $\overline{Mw}/\overline{Mn}$ ratio was 1.48. The glass transition temperature (Tg) of the hydrogenated CHD polymer block was 210° C.

The tensile strength (TS) of the obtained triblock copolymer was 30.1 MPa. The tensile elongation (TE) was 350%. The flexural strength (FS) was 28.5 MPa and the flexural modulus (FM) was 3,010 MPa.

The Izod impact strength was N.B. (no break).

Example 41

A hydrogenation reaction was conducted in substantially the same manner as in Example 40, except that the polymer obtained in Reference Example 10 was used.

After completion of the hydrogenation reaction, removal of the solvent was conducted by a conventional method, thereby obtaining a hydrogenated CHD-Ip-CHD triblock copolymer.

With respect to the Ip polymer block and the CHD polymer block, the degrees of hydrogenation were 100 mol % and 92 mol %, respectively, as determined by ¹H-NMR.

The number average molecular weight was 63,100. The $\overline{Mw}/\overline{Mn}$ ratio was 1.45. The glass transition temperature (Tg) of the hydrogenated CHD polymer block was 220° C., as measured in accordance with the DSC method.

The tensile strength (TS) of the copolymer was 23.6 MPa, and the tensile elongation (TE) was 700%.

Example 42

A well dried 4-liter high-pressure autoclave having an electromagnetic induction agitator was purged with dried nitrogen gas by a conventional method.

74

In an atmosphere of dried nitrogen gas, 1,000 g of cyclohexane was charged in the autoclave. The temperature of the cyclohexane was maintained at 70° C.

1,000 g of a 10 wt % cyclohexane solution of the polymer obtained in Reference Example 9 was added to the autoclave. To the resultant polymer solution was added 10 g of a solid catalyst, which comprised 5 wt % of Pd supported by alumina BaSO₄.

The autoclave was purged with hydrogen gas. The temperature of the autoclave was elevated to 160° C. and then, a hydrogenation reaction was conducted under a hydrogen pressure of 55 kg/cm²·G for 6 hours.

After completion of the hydrogenation reaction, removal of the solvent was conducted by a conventional method, thereby obtaining a hydrogenated CHD-Ip-CHD triblock copolymer.

With respect to both of the CHD polymer block and the Ip polymer block, the degree of hydrogenation was 100 mol % as determined by ¹H-NMR.

The number average molecular weight of the copolymer was 41,500. The $\overline{Mw}/\overline{Mn}$ ratio was 1.42.

The tensile strength (TS) of the obtained hydrogenated triblock copolymer was 29.8 MPa. The tensile elongation (TE) was 305%. The flexural strength (FS) was 27.6 MPa and the flexural modulus (FM) was 3,050 MPa.

The Izod impact strength was N.B. (no break).

Example 43

A hydrogenation reaction was conducted in substantially the same manner as in Example 42, except that the polymer obtained in Reference Example 10 was used.

After completion of the hydrogenation reaction, removal of the solvent was conducted by a conventional method, thereby obtaining a hydrogenated CHD-Ip-CHD triblock copolymer.

With respect to both of the CHD polymer block and Ip polymer block, the degree of hydrogenation was 100 mol % as determined by ¹H-NMR.

The number average molecular weight was 62,300. The $\overline{Mw}/\overline{Mn}$ ratio was 1.49.

The tensile strength (TS) was 25.2 MPa and the tensile elongation (TE) was 660%.

REFERENCE EXAMPLE 11

A well dried 5-liter high-pressure autoclave having an electromagnetic induction agitator was purged with dried nitrogen gas by a conventional method.

In an atmosphere of dried nitrogen gas, 2,400 g of cyclohexane was charged in the autoclave. The temperature of the cyclohexane was maintained at room temperature.

Then, n-BuLi was added to the autoclave in an amount of 15.0 mmol in terms of the amount of lithium atom. To the resultant cyclohexane solution of n-BuLi was added 7.50 mmol of TMEDA, and the temperature of the autoclave was elevated to 40° C.

300 g of 1,3-CHD was charged in the autoclave, and a polymerization reaction was conducted at 40° C. for 20 minutes. After that period of time, the conversion of 1,3-CHD was 47.9 mol % as measured by gas chromatography.

Subsequently, 300 g of styrene (St) was charged in the autoclave, and a polymerization reaction was further conducted at 40° C. for 5 hours.

Upon addition of St to the polymerization reaction system of 1,3-CHD, interruption of the polymerization reaction of 1,3-CHD occurred because a polymerization reaction of St proceeded in preference to a polymerization reaction of 1,3-CHD. Upon consumption of nearly all of the St monomers added, a polymerization reaction of 1,3-CHD started again. As a result, a CHD-St-CHD triblock copolymer was obtained.

The resultant polymerization reaction mixture containing the CHD-St-CHD-triblock copolymer was transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained triblock copolymer was 41,100. The $\overline{Mw/Mn}$ ratio was 1.44.

The flexural strength (FS) of the obtained triblock copolymer was 32.5 MPa. The flexural modulus (FM) was 2,910 MPa.

The heat distortion temperature (HDT, under 1.82 MPa) was 87° C.

Example 44

A well dried 5-liter high-pressure autoclave having an electromagnetic induction agitator was purged with dried nitrogen gas by a conventional method.

In an atmosphere of dried nitrogen gas, 1,500 g of cyclohexane was charged in the autoclave. The temperature of the cyclohexane was maintained at 70° C.

1,500 g of a 10 wt % cyclohexane solution of the polymer obtained in Reference Example 11 was added to the autoclave. To the resultant polymer solution was added a catalyst solution, which was prepared by adding titanocene dichloride (TC) and diisobutylaluminum hydride (DIBAL-H) to cyclohexane (TC/DIBAL-H molar ratio: 1/4), as a hydrogenation catalyst, in an amount of 290 ppm, in terms of the amount of titanium atom, based on the weight of the polymer.

The autoclave was purged with hydrogen gas. The temperature of the autoclave was elevated to 160° C. and then, a hydrogenation reaction was conducted under a hydrogen pressure of 35 kg/cm$^2$·G for 10 hours.

After completion of the hydrogenation reaction, removal of the solvent was conducted by a conventional method, thereby obtaining a hydrogenated CHD-St-CHD triblock copolymer.

The respective degrees of hydrogenation of the CHD polymer block and the St polymer block were 97 mol % and 0 mol %, as determined by $^1$H-NMR.

The number average molecular weight was 42,300. The $\overline{Mw/Mn}$ ratio was 1.41. The glass transition temperature (Tg) of the hydrogenated CHD polymer block was 221° C. as measured in accordance with the DSC method.

The flexural strength (FS) of the obtained triblock copolymer was 38.4 MPa. The flexural modulus (FM) was 4,020 MPa. The heat distortion temperature (HDT, under 1.82 MPa) was 90° C.

Example 45

A well dried 4-liter high-pressure autoclave having an electromagnetic induction agitator was purged with dried nitrogen gas by a conventional method.

In an atmosphere of dried nitrogen gas, 1,000 g of cyclohexane was charged in the autoclave. The temperature of the cyclohexane was maintained at 70° C.

1,000 g of a 10 wt % cyclohexane solution of the polymer obtained in Reference Example 11 was added to the autoclave. To the resultant polymer solution was added 50 g of a solid catalyst, which comprised 5 wt % of Pd supported on BaSO$_4$.

The autoclave was purged with hydrogen gas. The temperature of the autoclave was elevated to 160° C. and then, a hydrogenation reaction was conducted under a hydrogen pressure of 55 kg/cm$^2$·G for 6 hours.

After completion of the hydrogenation reaction, removal of the solvent was conducted by a conventional method, thereby obtaining a hydrogenated CHD-St-CHD triblock copolymer.

With respect to both of the CHD polymer block and St polymer block, the degree of hydrogenation was 100 mol % as determined by $^1$H-NMR.

The number average molecular weight of the hydrogenated copolymer was 41,900. The $\overline{Mw/Mn}$ ratio was 1.39. The respective glass transition temperatures (Tg) of the hydrogenated CHD polymer block and the hydrogenated St polymer block were 224° C. and 147° C., as measured in accordance with the DSC method.

The flexural strength (FS) of the obtained hydrogenated triblock copolymer was 41.8 MPa and the flexural modulus (FM) was 5,010 MPa. The heat distortion temperature (HDT, under 1.82 MPa) was 128° C.

REFERENCE EXAMPLE 12

A well dried 300 ml pressure-resistant glass bottle was purged with dried argon gas by a conventional method. 120.0 g of cyclohexane was charged in the glass bottle. While maintaining the temperature of the cyclohexane at room temperature, a 1.6M solution of n-BuLi in n-hexane was added to the cyclohexane in an amount of 3.0 mmol in terms of the amount of lithium atom. The resultant mixture was agitated for 10 minutes.

Subsequently, a 1.0M solution of TMEDA in cyclohexane was added to the above mixture so as to provide a Li (in n-BuLi)/TMEDA molar ratio of 4/2, and a reaction was conducted to thereby form a complex of n-BuLi with TMEDA. The resultant mixture containing the complex of n-BuLi with TMEDA was heated to and maintained at 40° C., to thereby obtain a complex solution.

In an atmosphere of dried argon gas, 4.5 g of 1,3-CHD was added to the obtained complex solution, and a polymerization reaction was conducted at 40° C. for 1 hour.

To the resultant polymerization reaction mixture was added 21.0 g of Ip in an atmosphere of dried argon gas, and a polymerization reaction was further conducted at 40° C. for 1 hour, to thereby form a CHD-Ip diblock copolymer.

To the resultant polymerization reaction mixture containing the CHD-Ip diblock copolymer was added 4.5 g of 1,3-CHD in an atmosphere of dried argon gas, and a polymerization reaction was further conducted at 40° C. for 2 hours to thereby form a CHD-Ip-CHD triblock copolymer.

To the resultant polymerization reaction mixture was added a 10 wt % solution of BHT in methanol, to thereby terminate the polymerization reaction. Then, a large amount of a mixed solvent of methanol and hydrochloric acid was added to the polymerization reaction mixture containing the CHD-Ip-CHD triblock copolymer, to thereby separate the triblock copolymer. The separated triblock copolymer was washed with methanol and then, dried at 60° C. in vacuo to thereby obtain a viscous form of the CHD-Ip-CHD triblock copolymer in a yield of 100 wt %.

The obtained CHD-Ip-CHD triblock copolymer had a number average molecular weight as high as 9,690 and an $\overline{Mw}/\overline{Mn}$ ratio of 1.08.

The polymer chain structure of the copolymer was determined by $^1$H-NMR. It was confirmed that the polymer chain of the copolymer had substantially the same ratio of monomer units as the ratio of monomers charged in the glass bottle.

REFERENCE EXAMPLE 13

A well dried 300 ml pressure-resistant glass bottle was purged with dried argon gas by a conventional method. 120.0 g of cyclohexane was charged in the glass bottle. While maintaining the temperature of the cyclohexane at room temperature, a 1.1M solution of s-BuLi in n-hexane was added to the cyclohexane in an amount of 3.0 mmol in terms of the amount of lithium atom. The resultant mixture was agitated for 10 minutes.

Subsequently, a 1.0M solution of TMEDA in cyclohexane was added to the above mixture so as to provide a Li (in s-BuLi)/TMEDA molar ratio of 4/2, and a reaction was conducted to thereby form a complex of s-BuLi with TMEDA. The resultant mixture containing the complex of s-BuLi with TMEDA was heated to and maintained at 40° C., to thereby obtain a complex solution.

To the obtained complex solution, which had a blue color, was added 1.5 mmol of m-diisopropenylbenzene (m-DIPB) to thereby obtain a mixture. After the blue color of the mixture, which indicates the presence of radicals, changed to orange, which indicates the absence of radicals, 21.0 g of Ip was added to the above mixture, and a polymerization reaction was conducted at 40° C. for 1 hour, to thereby form an Ip-containing copolymer.

To the resultant polymerization reaction mixture containing the Ip-containing copolymer was added 9.0 g of 1,3-CHD in an atmosphere of dried argon gas, and a polymerization reaction was further conducted at 40° C. for 2 hours to thereby form a CHD-Ip-CHD triblock copolymer.

To the resultant polymerization reaction mixture was added a 10 wt % solution of BHT in methanol, to thereby terminate the polymerization reaction. Then, a large amount of a mixed solvent of methanol and hydrochloric acid was added to the polymerization reaction mixture containing the CHD-Ip-CHD triblock copolymer, thereby separating the triblock copolymer. The separated triblock copolymer was washed with methanol and then, dried at 60° C. in vacuo, thereby obtaining an elastic form of the CHD-Ip-CHD triblock copolymer in a yield of 100 wt %.

The obtained CHD-Ip-CHD triblock copolymer had a number average molecular weight as high as 20,190 and an $\overline{Mw}/\overline{Mn}$ ratio of 1.44.

The polymer chain structure of the triblock copolymer was determined by $^1$H-NMR. It was confirmed that the polymer chain of the triblock copolymer had substantially the same ratio of monomer units as the ratio of monomers charged in the glass bottle.

REFERENCE EXAMPLE 14

A well dried 5-liter high-pressure autoclave having an electromagnetic induction agitator was purged with dried nitrogen gas by a conventional method.

In an atmosphere of dried nitrogen gas, 2,700 g of cyclohexane was charged in the autoclave. The temperature of the cyclohexane was maintained at room temperature.

Then, n-BuLi was added to the autoclave in an amount of 30.0 mmol in terms of the amount of lithium atom. To the resultant cyclohexane solution of n-BuLi was added 15.0 mmol of TMEDA to thereby form a complex, and the temperature of the autoclave was elevated to 40° C.

45 g of 1,3-CHD was charged in the autoclave, and a polymerization reaction was conducted at 40° C. for 1 hour.

Subsequently, 700 g of a 30 wt % solution of Bd in cyclohexane (Bd: 210 g) was charged in the autoclave, and a polymerization reaction was further conducted at 40° C. for 1 hour, to thereby form a CHD-Bd diblock copolymer.

To the resultant polymerization reaction mixture containing the CHD-Bd diblock copolymer was added 45 g of 1,3-CHD, and a polymerization reaction was further conducted at 40° C. for 3 hours, to thereby form a CHD-Bd-CHD triblock copolymer.

The resultant polymerization reaction mixture was transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained triblock copolymer was 10,300. The $\overline{Mw}/\overline{Mn}$ ratio was 1.07.

Example 46

A well dried 180 ml high-pressure autoclave having an electromagnetic induction agitator was purged with dried nitrogen gas by a conventional method.

100 g of a 10 wt % cyclohexane solution of the polymer obtained in Reference Example 12 was added to the autoclave. To the resultant polymer solution was added 5 g of a solid catalyst, which comprised 5 wt % of Pd supported by $BaSO_4$.

The autoclave was purged with hydrogen gas. The temperature of the autoclave was elevated to 160° C. and then, a hydrogenation reaction was conducted under a hydrogen pressure of 55 kg/cm$^2$·G for 6 hours.

After completion of the hydrogenation reaction, removal of the solvent was conducted by a conventional method, thereby obtaining a hydrogenated CHD-Ip-CHD triblock copolymer.

With respect to both of the CHD polymer block and the Ip polymer block, the degree of hydrogenation was 100%, as determined by $^1$H-NMR.

Example 47

A well dried 180 ml high-pressure autoclave having an electromagnetic induction agitator was purged with dried nitrogen gas by a conventional method.

A hydrogenation reaction was conducted in substantially the same manner as in Example 46 except that the polymer obtained in Reference Example 13 was used.

With respect to both of the CHD polymer block and the Ip polymer block, the degree of hydrogenation was 100%, as determined by $^1$H-NMR.

Example 48

A well dried 180 ml high-pressure autoclave having an electromagnetic induction agitator was purged with dried nitrogen gas by a conventional method.

A hydrogenation reaction was conducted in substantially the same manner as in Example 46, except that the polymer obtained in Reference Example 14 was used.

With respect to both of the CHD polymer block and the Bd polymer block, the degree of hydrogenation was 100%, as determined by $^1$H-NMR.

REFERENCE EXAMPLE 15

A well dried 5-liter high-pressure autoclave having an electromagnetic induction agitator was purged with dried nitrogen gas by a conventional method.

In an atmosphere of dried nitrogen gas, 1,333 g of cyclohexane was charged in the autoclave. The temperature of the cyclohexane was maintained at room temperature.

Then, n-BuLi was added to the autoclave in an amount of 10.0 mmol in terms of the amount of lithium atom. To the resultant cyclohexane solution of n-BuLi was added 2.5 mmol of TMEDA to thereby form a complex, and the temperature of the autoclave was elevated to 40° C.

100 g of 1,3-CHD was charged in the autoclave, and a polymerization reaction was conducted at 40° C. for 2 hours, to thereby form a CHD homopolymer.

Subsequently, 667 g of a 30 wt % solution of Bd in cyclohexane (Bd: 200 g) was charged in the autoclave, and a polymerization reaction was further conducted at 40° C. for 2 hours, to thereby form a CHD-Bd diblock copolymer.

To the resultant polymerization reaction mixture containing the CHD-Bd diblock copolymer was added 100 g of 1,3-CHD, and a polymerization reaction was further conducted at 40° C. for 5 hours, to thereby form a CHD-Bd-CHD triblock copolymer.

The resultant polymerization reaction mixture was transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained triblock copolymer was 40,500. The $\overline{Mw}/\overline{Mn}$ ratio was 1.19. The 1,2-vinyl bond content of the Bd polymer block was 62 mol %.

The tensile strength (TS) of the obtained triblock copolymer was 14.0 MPa. The tensile elongation (TE) was 128%. The flexural strength (FS) was 14.9 MPa and the flexural modulus (FM) was 2,945 MPa.

The Izod impact strength was N.B. (no break).

REFERENCE EXAMPLE 16

A well dried 5-liter high-pressure autoclave having an electromagnetic induction agitator was purged with dried nitrogen gas by a conventional method.

In an atmosphere of dried nitrogen gas, 1,467 g of cyclohexane was charged in the autoclave. The temperature of the cyclohexane was maintained at room temperature.

Then, n-BuLi was added to the autoclave in an amount of 10.0 mmol in terms of the amount of lithium atom. To the resultant cyclohexane solution of n-BuLi was added 5.0 mmol of TMEDA to thereby form a complex, and the temperature of the autoclave was elevated to 40° C.

100 g of 1,3-CHD was charged in the autoclave, and a polymerization reaction was conducted at 40° C. for 2 hours, to thereby form a CHD homopolymer.

Subsequently, 1,333 g of a 30 wt % solution of Bd in cyclohexane (Bd: 400 g) was charged in the autoclave, and a polymerization reaction was further conducted at 40° C. for 2 hours, to thereby form a CHD-Bd diblock copolymer.

To the resultant polymerization reaction mixture containing the CHD-Bd diblock copolymer was added 100 g of 1,3-CHD, and a polymerization reaction was further conducted at 40° C. for 5 hours, to thereby form a CHD-Bd-CHD triblock copolymer.

The resultant polymerization reaction mixture was heated to 70° C., and transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained triblock copolymer was 62,500. The $\overline{Mw}/\overline{Mn}$ ratio was 1.19. The 1,2-vinyl bond content of the Bd polymer block was 68 mol %.

The tensile strength (TS) of the obtained triblock copolymer was 19.1 MPa. The tensile elongation (TE) was 800%.

Example 49

A well dried 5-liter high-pressure autoclave having an electromagnetic induction agitator was purged with dried nitrogen gas by a conventional method.

In an atmosphere of dried nitrogen gas, 1,500 g of cyclohexane was charged in the autoclave. The temperature of the cyclohexane was maintained at 70° C.

1,500 g of a 10 wt % cyclohexane solution of the triblock copolymer obtained in Reference Example 15 was added to the autoclave. To the resultant polymer solution was added a catalyst solution, which was prepared by adding titanocene dichloride (TC) and diisobutylaluminum hydride (DIBAL-H) to cyclohexane (TC/DIBAL-H molar ratio: 1/4), as a hydrogenation catalyst, in an amount of 290 ppm, in terms of the amount of titanium atom, based on the weight of the polymer.

The autoclave was purged with hydrogen gas. The temperature of the autoclave was elevated to 160° C. and then, a hydrogenation reaction was conducted under a hydrogen pressure of 35 kg/cm$^2$·G for 10 hours.

After completion of the hydrogenation reaction, removal of the solvent was conducted by a conventional method, thereby obtaining a hydrogenated CHD-Bd-CHD triblock copolymer.

Results of the measurement by $^1$H-NMR show that the degrees of hydrogenation of the CHD polymer block and the Bd polymer block were 91 mol % and 97 mol %, respectively.

The number average molecular weight of the obtained triblock copolymer was 41,900. The $\overline{Mw}/\overline{Mn}$ ratio was 1.21.

The tensile strength (TS) of the obtained triblock copolymer was 19.6 MPa. The tensile elongation (TE) was 155%. The flexural strength (FS) was 16.8 MPa and the flexural modulus (FM) was 3,054 MPa.

The Izod impact strength was N.B. (no break).

Example 50

A hydrogenation reaction was conducted in substantially the same manner as in Example 49, except that the polymer obtained in Reference Example 16 was used.

After completion of the hydrogenation reaction, removal of the solvent was conducted by a conventional method, thereby obtaining a hydrogenated CHD-Bd-CHD triblock copolymer.

The results of the measurement by $^1$H-NMR show that the degrees of the CHD polymer block and the Bd polymer block were 98 mol % and 100 mol %, respectively.

The number average molecular weight of the obtained hydrogenated triblock copolymer was 62,800. The $\overline{Mw}/\overline{Mn}$ ratio was 1.18. The glass transition temperature (Tg) of the hydrogenated CHD polymer block of the copolymer was 221° C. as measured in accordance with the DSC method.

The tensile strength (TS) of the obtained hydrogenated triblock copolymer was 23.9 MPa. The tensile elongation (TE) was 820%.

Example 51

A well dried 4-liter high-pressure autoclave having an electromagnetic induction agitator was purged with dried nitrogen gas by a conventional method.

In an atmosphere of dried nitrogen gas, 1,000 g of cyclohexane was charged in the autoclave. The temperature of the cyclohexane was maintained at 70° C.

1,000 g of a 10 wt % cyclohexane solution of the polymer obtained in Reference Example 15 was added to the autoclave. To the resultant polymer solution was added 10 g of a solid catalyst, which comprised 5 wt % of Pd supported by $Al_2O_3$.

The autoclave was purged with hydrogen gas. The temperature of the autoclave was elevated to 160° C. and then, a hydrogenation reaction was conducted under a hydrogen pressure of 55 kg/cm$^2$·G for 6 hours.

After completion of the hydrogenation reaction, removal of the solvent was conducted by a conventional method, thereby obtaining a hydrogenated CHD-Bd-CHD triblock copolymer.

With respect to both of the CHD polymer block and the butadiene (Bd) polymer block, the degree of hydrogenation was 100%, as determined by $^1$H-NMR.

The number average molecular weight of the obtained hydrogenated triblock copolymer was 40,900. The $\overline{Mw}/\overline{Mn}$ ratio was 1.18. The glass transition temperature (Tg) of the hydrogenated CHD polymer block of the copolymer was 222° C. as measured in accordance with the DSC method.

The tensile strength (TS) of the obtained hydrogenated triblock copolymer was 21.0 MPa. The tensile elongation (TE) was 149%. The flexural strength (FS) was 19.0 MPa and the flexural modulus (FM) was 3,349 MPa.

The Izod impact strength was N.B. (no break).

Example 52

A hydrogenation reaction was conducted in substantially the same manner as in Example 51, except that the polymer obtained in Reference Example 16 was used.

After completion of the hydrogenation reaction, removal of the solvent was conducted by a conventional method, thereby obtaining a hydrogenated CHD-Bd-CHD triblock copolymer.

With respect to both of the CHD polymer block and the Bd polymer block, the degree of hydrogenation was 100%, as determined by $^1$H-NMR.

The number average molecular weight was 61,900. The $\overline{Mw}/\overline{Mn}$ ratio was 1.18. The glass transition temperature (Tg) of the hydrogenated CHD polymer block of the copolymer was 224° C. as measured in accordance with the DSC method.

The tensile strength (TS) of the obtained triblock copolymer was 24.9 MPa. The tensile elongation (TE) was 820%.

Example 53

A well dried 300 ml pressure-resistant glass bottle, provided with a sealing cap, was purged with dried argon gas by a conventional method. 2.72 g of 1,3-CHD and 20.0 g of cyclohexane were charged in the glass bottle. Then, complex No. 2, which was obtained in Reference Example 2, was added to the resultant cyclohexane solution of 1,3-CHD in an amount of 0.20 mmol in terms of the amount of lithium atom, and a polymerization reaction was conducted at 40° C. for 1 hour. After that period of time, the conversion of 1,3-CHD was 97.9 mol % as measured by gas chromatography.

Subsequently, 3.53 g of styrene (St) was added to the polymerization reaction system, and the polymerization reaction was further conducted at 40° C. for 1 hour. After that period of time, the conversion of St was 99.0 mol % as measured by gas chromatography.

To the resultant polymerization reaction mixture was added 25.0 g of Ip, and a polymerization reaction was further conducted at 40° C. for 3 hours, to thereby form a CHD-St-Ip triblock copolymer.

The number average molecular weight of the obtained triblock copolymer was 133,000 as measured by GPC. The obtained chromatogram exhibited a single peak. The $\overline{Mw}/\overline{Mn}$ ratio was 1.43.

The polymer chain structure of the copolymer was determined by $^1$H-NMR. It was confirmed that the polymer chain of the copolymer had substantially the same ratio of monomer units as the ratio of monomers charged in the glass bottle.

100 ml of cyclohexane and 1.0 g of the obtained triblock copolymer were charged in a 200 ml high-pressure autoclave. Then, 2.0 g of a solid catalyst, which comprised 5 wt % of Pd supported on $BaSO_4$, was added to the autoclave, as a hydrogenation catalyst.

The autoclave was purged with hydrogen gas. The temperature of the autoclave was elevated to 160° C. and then, a hydrogenation reaction was conducted under a hydrogen pressure of 55 kg/cm$^2$·G for 6 hours.

After that period of time, removal of the solvent was conducted by a conventional method, thereby obtaining a hydrogenated CHD-St-Ip triblock copolymer.

Results of the measurement by $^1$H-NMR show that the degree of hydrogenation of each of the CHD polymer block, the St polymer block and the Ip polymer block was 100 mol %.

Industrial applicability

The novel polymer of the present invention has a cyclic olefin monomer unit introduced to the polymeric chain thereof, so that the polymer has not only excellent thermal and mechanical properties, but also a high molecular weight sufficient for the polymer to be used as a molded article, which therefore can be advantageously used in various fields as industrial materials.

The novel polymer of the present invention can be provided in the form of a copolymer of a cyclic olefin monomer with a comonomer copolymerizable with the cyclic olefin monomer, wherein the content of comonomer and the configuration of copolymer can be appropriately selected so that the copolymer can have desired thermal and mechanical properties. Therefore, the molecular structure of the polymer of the present invention can be appropriately selected, depending on the intended use thereof, so as to obtain the polymer in the form of, for example, a highly heat-resistant plastic, a highly rigid plastic, or a highly heat-resistant elastomer.

I claim:
1. A polymer containing a cyclic olefin monomer unit, comprising a main chain represented by the following formula (I):

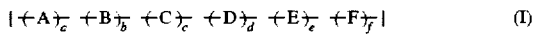 (I)

wherein A to F are monomer units constituting said main chain in which monomer units A to F are arranged in any order, and a to f are, respectively, weight percentages of monomer units A to F, based on the total weight of monomer units A to F;
wherein:

A is selected from the class consisting of cyclic olefin monomer units each being independently represented by the following formula (IV):

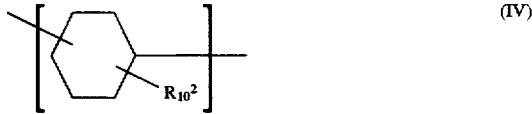 (IV)

wherein each $R^2$ independently represents a hydrogen atom a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, B is selected from the class consisting of cyclic conjugated diene monomer units each being independently represented by the following formula (V):

 (V)

wherein each $R^2$ is as defined for formula (IV),

C is selected from the class consisting of chain conjugated diene monomer units, D is selected from the class consisting of vinyl aromatic monomer units, E is selected from the class consisting of polar monomer units, and F is selected from the class consisting of an ethylene monomer unit and α-olefin monomer units; and
wherein
a to f satisfy the following requirements:
a+b+c+d+e+f=100,
$0.001 \leq a \leq 100$,
$0 \leq b < 100$,
$0 \leq c < 100$,
$0 \leq d < 100$,
$0 \leq e < 100$, and
$0 \leq f < 100$, with the proviso that said monomer unit A is present in an amount of from 0.1 to 100 mole %, based on the total number of moles of the monomer units A and B; and wherein at least one A monomer unit is bonded in said main chain by a 1,4-bond, with the proviso that when a=100 and said A monomer units are comprised of cyclic olefin monomer units which are the same, said polymer has a number average molecular weight of from 10,000 to 5,000,000, that when a=100 and said A monomer units are comprised of cyclic olefin monomer units which are different, said polymer has a number average molecular weight of from 1,000 to 5,000,000, and that when $0.001 \leq a+b < 100$, said polymer is a block copolymer which contains at least one polymer block containing a contiguous arrangement of at least two A monomer units and which has a number average molecular weight of from 500 to 5,000,000.

2. The polymer according to claim 1, which is a block copolymer having at least one polymer block containing a contiguous arrangement of at least five A monomer units.

3. The polymer according to claim 1, which is a block copolymer having at least one polymer block containing a contiguous arrangement of at least ten A monomer units.

4. The polymer according to claim 1, wherein a+b=100 and 0<b, and wherein said A monomer units are comprised of cyclic olefin monomer units which are the same or different, and said B monomer units are comprised of cyclic conjugated diene monomer units which are the same or different.

5. The polymer according to claim 1, wherein a=100, and wherein said A monomer units are comprised of cyclic olefin monomer units which are the same or different.

6. The polymer according to claim 1, wherein $0.001 \leq (a+b) < 100$ and $0.001 \leq a < 100$, and wherein said A monomer units are comprised of cyclic olefin monomer units which are the same or different, and said B monomer units are comprised of cyclic conjugated diene monomer units which are the same or different.

7. The polymer according to claim 1, wherein said polymer block further contains at least one B monomer unit.

8. The polymer according to claim 7, wherein said polymer block consists of a contiguous arrangement of at least two A monomer units and at least one B monomer unit.

9. The polymer according to claim 1, which is an at least-tri-block copolymer.

10. The polymer according to claim 1, which is a block copolymer having at least two polymer blocks each containing a contiguous arrangement of at least two A monomer units.

11. The polymer according to claim 1, which is a block copolymer having at least two polymer blocks each containing a contiguous arrangement of at least two A monomer units and at least one B monomer unit.

12. The polymer according to claim 1, which is a block copolymer having at least two polymer blocks each consisting of at least two A monomer units.

13. The polymer according to claim 1, which is a block copolymer having at least two polymer blocks each consisting of a contiguous arrangement of at least two A monomer units and at least one B monomer unit.

14. The polymer according to claim 1, which is an at least-di-block copolymer comprising at least one X polymer block containing a contiguous arrangement of at least two A monomer units, and at least one Y polymer block comprised mainly of monomer units of at least one type selected from said C to said F, wherein the weight ratio of said X block to said Y block is from 1/99 to 99/1.

15. The polymer according to claim 1, which is an at least-tri-block copolymer comprising at least two X blocks each containing a contiguous arrangement of at least two A monomer units, and at least one Y block comprised mainly of monomer units of at least one type selected from said C to said F, wherein the weight ratio of said at least two X blocks to said at least one Y block is from 1/99 to 99/1.

16. The polymer according to claim 1, which is a triblock copolymer comprising two X blocks each containing a contiguous arrangement of at least two A monomer units, and one Y block comprised mainly of monomer units of at least one type selected from said C to said F, wherein the weight ratio of said at least two X blocks to said at least one Y block is from 1/99 to 99/1.

17. The polymer according to claim 15, wherein said at least-tri-block copolymer has a configuration represented by a formula selected from the group consisting of X—(Y—X)$_p$, (X—Y)$_q$, Y—(X—Y)$_q$, [(X—Y)$_p$]$_q$, [(Y—X)$_p$]$_q$, [(X—Y)$_p$—X]$_q$, and [(Y—X)$_p$—Y]$_q$ in which X and Y are as defined above, p is an integer of 1 or more, and q is an integer of 2 or more.

* * * * *